US010163265B2

(12) United States Patent
Miller et al.

(10) Patent No.: US 10,163,265 B2
(45) Date of Patent: Dec. 25, 2018

(54) SELECTIVE LIGHT TRANSMISSION FOR AUGMENTED OR VIRTUAL REALITY

(71) Applicant: Magic Leap, Inc., Dania Beach, FL (US)

(72) Inventors: Samuel A. Miller, Hollywood, FL (US); Rony Abovitz, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 14/702,707

(22) Filed: May 2, 2015

(65) Prior Publication Data
US 2015/0235429 A1 Aug. 20, 2015

Related U.S. Application Data

(63) Continuation of application No. 14/205,126, filed on Mar. 11, 2014.

(60) Provisional application No. 61/776,771, filed on Mar. 11, 2013.

(51) Int. Cl.
G06T 19/00 (2011.01)
G02B 27/01 (2006.01)
G06T 7/00 (2017.01)

(52) U.S. Cl.
CPC .......... G06T 19/006 (2013.01); G02B 27/017 (2013.01); G06T 7/0042 (2013.01); G06T 2207/30201 (2013.01)

(58) Field of Classification Search
CPC ............................. G06F 3/013; G02B 27/017
See application file for complete search history.

(56) References Cited

U.S. PATENT DOCUMENTS 3,632,865 A 1/1972 Haskell et al.
4,204,742 A 5/1980 Johnson
(Continued)

FOREIGN PATENT DOCUMENTS

JP 2006293604 A 10/2006
JP 2011175439 A 9/2011

OTHER PUBLICATIONS

Final Rejection dated Feb. 12, 2016 for U.S. Appl. No. 14/703,854, filed May 4, 2015 (20 pages).
(Continued)

Primary Examiner — Nitin Patel
Assistant Examiner — Robert M Stone
(74) Attorney, Agent, or Firm — Vista IP Law Group LLP

(57) ABSTRACT

One embodiment is directed to a system for enabling two or more users to interact within a virtual world comprising virtual world data, comprising a computer network comprising one or more computing devices, the one or more computing devices comprising memory, processing circuitry, and software stored at least in part in the memory and executable by the processing circuitry to process at least a portion of the virtual world data; wherein at least a first portion of the virtual world data originates from a first user virtual world local to a first user, and wherein the computer network is operable to transmit the first portion to a user device for presentation to a second user, such that the second user may experience the first portion from the location of the second user, such that aspects of the first user virtual world are effectively passed to the second user.

20 Claims, 25 Drawing Sheets

(56) References Cited

U.S. PATENT DOCUMENTS

| | | | |
|---|---|---|---|
| 4,984,179 A * | 1/1991 | Waldern | G02B 27/0093 340/980 |
| 5,138,555 A | 8/1992 | Albrecht | |
| 5,271,093 A | 12/1993 | Hata | |
| 5,311,879 A | 5/1994 | Yamada | |
| 5,311,897 A | 5/1994 | Yamada | |
| 5,422,653 A | 6/1995 | Maguire, Jr. | |
| 5,526,042 A | 6/1996 | Ozawa et al. | |
| 5,742,264 A | 4/1998 | Inagaki et al. | |
| 5,933,125 A | 8/1999 | Fernie et al. | |
| 6,011,526 A | 1/2000 | Toyoshima et al. | |
| 6,151,179 A | 11/2000 | Poss | |
| 6,441,811 B1 | 8/2002 | Sawada | |
| 6,947,219 B1 * | 9/2005 | Ou | G02B 27/017 345/7 |
| 7,023,536 B2 | 4/2006 | Zhang et al. | |
| 7,038,846 B2 | 5/2006 | Mandella | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,386,799 B1 | 6/2008 | Clanton et al. | |
| 7,474,809 B2 | 1/2009 | Carl et al. | |
| 7,729,515 B2 | 6/2010 | Mandella et al. | |
| 7,826,641 B2 | 11/2010 | Mandella et al. | |
| 7,961,909 B2 | 6/2011 | Mandella et al. | |
| 8,223,024 B1 | 7/2012 | Petrou | |
| 8,508,830 B1 | 8/2013 | Wang | |
| 8,542,219 B2 | 9/2013 | Carl et al. | |
| 8,553,935 B2 | 10/2013 | Mandella et al. | |
| 8,730,129 B2 | 5/2014 | Solomon | |
| 8,757,812 B2 | 6/2014 | Melville et al. | |
| 8,831,278 B2 | 9/2014 | Fedorovskaya | |
| 8,832,233 B1 | 9/2014 | Brin et al. | |
| 8,879,155 B1 | 11/2014 | Teller | |
| 8,897,494 B2 | 11/2014 | Mandella et al. | |
| 8,970,709 B2 | 3/2015 | Gonzalez-Banos et al. | |
| 9,189,856 B1 | 11/2015 | Gonzalez-Banos et al. | |
| 9,229,540 B2 | 1/2016 | Mandella et al. | |
| 9,235,934 B2 | 1/2016 | Mandella et al. | |
| 2001/0035870 A1 | 11/2001 | Takeuchi | |
| 2003/0014212 A1 | 1/2003 | Ralston | |
| 2003/0137449 A1 | 7/2003 | Vashisth et al. | |
| 2003/0156253 A1 | 8/2003 | Watanabe et al. | |
| 2003/0158654 A1 | 8/2003 | Morita | |
| 2004/0119715 A1 | 6/2004 | Everett et al. | |
| 2004/0130520 A1 | 7/2004 | Maeda et al. | |
| 2004/0178894 A1 | 9/2004 | Janssen | |
| 2004/0258314 A1 | 12/2004 | Hashimoto | |
| 2005/0046953 A1 | 3/2005 | Repetto et al. | |
| 2005/0110732 A1 | 5/2005 | Kim | |
| 2005/0148388 A1 | 7/2005 | Vayra | |
| 2005/0248852 A1 | 11/2005 | Yamasaki | |
| 2005/0253055 A1 | 11/2005 | Sprague | |
| 2005/0254135 A1 * | 11/2005 | Ou | G02B 27/017 359/630 |
| 2006/0007056 A1 * | 1/2006 | Ou | G02B 27/017 345/8 |
| 2006/0109280 A1 | 5/2006 | Dawson | |
| 2006/0132915 A1 | 6/2006 | Yang et al. | |
| 2006/0214911 A1 | 9/2006 | Miller | |
| 2006/0226231 A1 | 10/2006 | Johnston | |
| 2006/0227151 A1 | 10/2006 | Bannai et al. | |
| 2006/0256110 A1 | 11/2006 | Okuno et al. | |
| 2006/0267889 A1 | 11/2006 | Kimura | |
| 2006/0284791 A1 * | 12/2006 | Chen | G06F 3/011 345/8 |
| 2007/0086668 A1 | 4/2007 | Ackley et al. | |
| 2008/0005702 A1 | 1/2008 | Skourup et al. | |
| 2008/0058629 A1 | 3/2008 | Seibel | |
| 2008/0059578 A1 | 3/2008 | Albertson et al. | |
| 2008/0062131 A1 | 3/2008 | Chan | |
| 2008/0071559 A1 | 3/2008 | Arrasvuori | |
| 2008/0186255 A1 | 8/2008 | Cohen et al. | |
| 2008/0199049 A1 | 8/2008 | Daley | |
| 2008/0215974 A1 | 9/2008 | Harrison et al. | |
| 2008/0215975 A1 | 9/2008 | Harrison et al. | |
| 2008/0215994 A1 | 9/2008 | Harrison et al. | |
| 2008/0276178 A1 | 11/2008 | Fadell | |
| 2008/0278480 A1 | 11/2008 | Katano | |
| 2009/0003662 A1 | 1/2009 | Joseph et al. | |
| 2009/0066690 A1 | 3/2009 | Harrison | |
| 2009/0089685 A1 | 4/2009 | Mordecai | |
| 2009/0164916 A1 | 6/2009 | Jeong | |
| 2009/0177042 A1 | 7/2009 | Johnston | |
| 2009/0187389 A1 | 7/2009 | Dobbins | |
| 2009/0213114 A1 | 8/2009 | Dobbins | |
| 2009/0222424 A1 | 9/2009 | Van | |
| 2009/0225001 A1 | 9/2009 | Biocca | |
| 2009/0285484 A1 | 11/2009 | Mallinson et al. | |
| 2009/0316116 A1 | 12/2009 | Melville et al. | |
| 2009/0322671 A1 | 12/2009 | Scott et al. | |
| 2010/0020216 A1 | 1/2010 | Christian et al. | |
| 2010/0060647 A1 | 3/2010 | Brown et al. | |
| 2010/0085462 A1 | 4/2010 | Sako et al. | |
| 2010/0110368 A1 | 5/2010 | Chaum | |
| 2010/0137684 A1 | 6/2010 | Shibasaki | |
| 2010/0141555 A1 | 6/2010 | Rorberg | |
| 2010/0149073 A1 * | 6/2010 | Chaum et al. | 345/8 |
| 2010/0197390 A1 * | 8/2010 | Craig | G06K 9/00369 463/30 |
| 2010/0260426 A1 | 10/2010 | Huang et al. | |
| 2010/0287500 A1 | 11/2010 | Whitlow | |
| 2011/0075902 A1 | 3/2011 | Song | |
| 2011/0096337 A1 * | 4/2011 | Hirose | A61B 3/102 356/491 |
| 2011/0227812 A1 | 9/2011 | Haddick et al. | |
| 2011/0234879 A1 | 9/2011 | Kashitani | |
| 2011/0246908 A1 | 10/2011 | Akram | |
| 2011/0267361 A1 | 11/2011 | Kurozuka | |
| 2011/0313653 A1 | 12/2011 | Lindner | |
| 2012/0050140 A1 | 3/2012 | Border et al. | |
| 2012/0068913 A1 * | 3/2012 | Bar-Zeev | G02B 26/026 345/8 |
| 2012/0089949 A1 | 4/2012 | Chen et al. | |
| 2012/0092328 A1 | 4/2012 | Flaks | |
| 2012/0113092 A1 * | 5/2012 | Bar-Zeev et al. | 345/419 |
| 2012/0120103 A1 | 5/2012 | Border | |
| 2012/0127062 A1 | 5/2012 | Bar-Zeev et al. | |
| 2012/0127136 A1 | 5/2012 | Schneider | |
| 2012/0127284 A1 * | 5/2012 | Bar-Zeev | G02B 27/017 348/53 |
| 2012/0154277 A1 | 6/2012 | Bar-Zeev et al. | |
| 2012/0154557 A1 | 6/2012 | Perez | |
| 2012/0169752 A1 | 7/2012 | Kurozuka | |
| 2012/0183137 A1 * | 7/2012 | Laughlin | 380/200 |
| 2012/0188148 A1 | 7/2012 | DeJong | |
| 2012/0194554 A1 | 8/2012 | Kaino | |
| 2012/0200600 A1 | 8/2012 | Demaine | |
| 2012/0206452 A1 | 8/2012 | Geisner et al. | |
| 2012/0212399 A1 * | 8/2012 | Border et al. | 345/8 |
| 2012/0218301 A1 | 8/2012 | Miller | |
| 2012/0236262 A1 | 9/2012 | Johansson | |
| 2012/0242560 A1 | 9/2012 | Nakada | |
| 2012/0244939 A1 | 9/2012 | Braun | |
| 2012/0249586 A1 | 10/2012 | Wither et al. | |
| 2012/0249797 A1 | 10/2012 | Haddick et al. | |
| 2012/0327116 A1 | 12/2012 | Liu et al. | |
| 2013/0021373 A1 | 1/2013 | Vaught et al. | |
| 2013/0042296 A1 * | 2/2013 | Hastings | G06F 21/10 726/1 |
| 2013/0044128 A1 * | 2/2013 | Liu | G09G 5/00 345/633 |
| 2013/0050186 A1 | 2/2013 | Large et al. | |
| 2013/0050260 A1 | 2/2013 | Reitan | |
| 2013/0050642 A1 | 2/2013 | Lewis et al. | |
| 2013/0083173 A1 | 4/2013 | Geisner et al. | |
| 2013/0117377 A1 | 5/2013 | Miller | |
| 2013/0120706 A1 * | 5/2013 | Kakinuma | G02B 27/2264 351/158 |

(56) References Cited

U.S. PATENT DOCUMENTS

| | | | |
|---|---|---|---|
| 2013/0141419 A1* | 6/2013 | Mount | G06F 3/011 345/419 |
| 2013/0156266 A1 | 6/2013 | Horii | |
| 2013/0194164 A1 | 8/2013 | Sugden et al. | |
| 2013/0215230 A1 | 8/2013 | Miesnieks et al. | |
| 2013/0249946 A1 | 9/2013 | Kimura | |
| 2013/0257748 A1 | 10/2013 | Ambrus et al. | |
| 2013/0293468 A1* | 11/2013 | Perez et al. | 345/158 |
| 2013/0307875 A1 | 11/2013 | Anderson | |
| 2013/0342564 A1 | 12/2013 | Kinnebrew et al. | |
| 2013/0342569 A1 | 12/2013 | Karkkainen | |
| 2014/0002496 A1 | 1/2014 | Lamb | |
| 2014/0064557 A1 | 3/2014 | Hara | |
| 2014/0071163 A1 | 3/2014 | Kinnebrew | |
| 2014/0098137 A1 | 4/2014 | Fein et al. | |
| 2014/0098425 A1 | 4/2014 | Schon et al. | |
| 2014/0132484 A1 | 5/2014 | Pandey et al. | |
| 2014/0139551 A1 | 5/2014 | McCulloch | |
| 2014/0145997 A1 | 5/2014 | Tiruvuru | |
| 2014/0192085 A1 | 7/2014 | Kim | |
| 2014/0218361 A1 | 8/2014 | Abe | |
| 2014/0222432 A1 | 8/2014 | Ahn | |
| 2014/0267402 A1 | 9/2014 | Hing | |
| 2014/0354685 A1 | 12/2014 | Lazarow et al. | |
| 2014/0368532 A1* | 12/2014 | Keane | G02B 27/017 345/619 |
| 2015/0254793 A1 | 9/2015 | Hastings et al. | |
| 2016/0063706 A1 | 3/2016 | Gonzalez-Banos et al. | |

OTHER PUBLICATIONS

Final Rejection dated Feb. 16, 2016 for U.S. Appl. No. 14/205,126, filed Mar. 11, 2014 (20 pages).
Response to non-final rejection dated Jul. 7, 2015, response submitted Jan. 7, 2016, for U.S. Appl. No. 14/205,126 (10 pages).
Response to Non-Final Rejection dated Jul. 8, 2015, response submitted on Jan. 8, 2016 for U.S. Appl. No. 14/702,709, filed May 2, 2015 (13 pages).
Response to Non-Final Rejection dated Jul. 2, 2015, response submitted on Nov. 2, 2015 for U.S. Appl. No. 14/703,854, filed May 4, 2015 (8 pages).
Response to Non-final office action for U.S. Appl. No. 14/703,863, dated Jul. 2, 2015, response submitted Nov. 2, 2015 (12 pages).
Response to Non-Final Rejection dated Jul. 6, 2015 for U.S. Appl. No. 14/703,867, response submitted Jan. 6, 2016 (12 pages).
Response to Non-Final Rejection dated Jun. 11, 2015 for U.S. Appl. No. 14/703,871, response submitted on Dec. 11, 2015 (9 pages).
Response to Non-Final Rejection dated Jul. 8, 2015 for U.S. Appl. No. 14/702,710, response filed Jan. 8, 2016 (10 pages).
Non-Final Rejection dated Oct. 30, 2015 for U.S. Appl. No. 14/212,961, filed Mar. 14, 2014 (56 pages).
Non-Final Rejection dated Oct. 30, 2015 for U.S. Appl. No. 14/702,734, filed May 3, 2015 (21 pages).
Non-Final Rejection dated Dec. 15, 2015 for U.S. Appl. No. 14/704,975, filed May 6, 2015 (17 pages).
Non-Final Rejection dated Nov. 17, 2015 for U.S. Appl. No. 14/702,739, filed May 3, 2015 (21 pages).
International Search Report and Written Opinion dated Nov. 3, 2014 in International Application No. PCT/US14/28977 filed Mar. 14, 2014 (14 pages).
Aronoff et al. "Collaborative Augmented Reality for Better Standards"; Complex Systems Concurrent Engineering; Publication [online], Aug. 15, 2007, [retrieved Apr. 16, 2014], Retrieved from the Internet: <URL: http://www.nist.gov/customcf/get_pdf.cfm?pub_id-32632> pp. 479-486.
Freeman et al. "Scanned Laser Pico-Projectors: Seeing the Big Picture with a Small Device"; Optics and Photonics News, vol. 20, Issue 5; Publication [online]. May 2009. [Retrieved Sep. 4, 2014]. Retrieved from the Internet; URL: http://www.microvision.com/wp-content/uploads/2014/07/OPN_Article.pdf> pp. 28-34.
International Search Report and Written Opinion dated Sep. 9, 2014 in International Application No. PCT/US14/23739 filed Mar. 11, 2014 (15 pages).
Non-Final Rejection dated Jul. 7, 2015 for U.S. Appl. No. 14/205,126, filed Mar. 3, 2014 (14 pages).
Non-Final Rejection dated Jul. 8, 2015 for U.S. Appl. No. 14/702,709, filed May 2, 2015 (12 pages).
Non-Final Rejection datd Jul. 2, 2015 for U.S. Appl. No. 14/703,854, filed May 4, 2015 (9 pages).
Final office action for U.S. Appl. No. 14/703,863, dated Dec. 11, 2015 (15 pages).
Non-final office action for U.S. Appl. No. 14/703,863, dated Jul. 2, 2015 (9 pages).
Non-Final Rejection dated Jul. 6, 2015 for U.S. Appl. No. 14/703,867, filed May 4, 2015 (11 pages).
Non-Final Rejection dated Jun. 11, 2015 for U.S. Appl. No. 14/703,871, filed May 4, 2015 (10 pages).
Non-Final Rejection dated Jul. 8, 2015 for U.S. Appl. No. 14/702,710, filed May 2, 2015 (11 pages).
Amendment Response filed Feb. 29, 2016 for the Non-Final Rejection dated Oct. 30, 2015 for U.S. Appl. No. 14/212,961, filed Mar. 14, 2014 (8 pages).
Amendment Response filed Feb. 29, 2016 for the Non-Final Rejection dated Oct. 30, 2015 for U.S. Appl. No. 14/702,734, filed May 3, 2015 (8 pages).
Response filed Feb. 12, 2016 for Final office action dated Dec. 11, 2015 for U.S. Appl. No. 14/703,863, (10 pages).
Response filed Mar. 17, 2016 for Non-Final Rejection dated Nov. 17, 2015 for U.S. Appl. No. 14/702,739, (10 pages).
Final Rejection dated Apr. 22, 2016 for U.S. Appl. No. 14/702,709, filed May 2, 2015 (14 pages).
Non-Final Rejection dated Feb. 26, 2016 for U.S. Appl. No. 14/703,863, filed May 4, 2015 (30 pages).
Final Rejection dated Mar. 24, 2016 for U.S. Appl. No. 14/703,871, filed May 4, 2015 (15 pages).
Final Rejection dated Apr. 4, 2016 for U.S. Appl. No. 14/702,739, filed May 3, 2015 (25 pages).
Notice of Allowance dated Mar. 28, 2016 for U.S. Appl. No. 14/212,961, filed Mar. 14, 2014 (19 pages).
Notice of Allowance dated Apr. 6, 2016 for U.S. Appl. No. 14/702,734, filed May 3, 2015 (27 pages).
Final Rejection dated May 12, 2016 for U.S. Appl. No. 14/702,710, filed May 2, 2015 (13 pages).
Response filed May 12, 2016 for Final Rejection dated Feb. 12, 2016 for U.S. Appl. No. 14/703,854, filed May 4, 2015 (9 pages).
Response filed May 16, 2016 for Non-Final Rejection dated Dec. 15, 2015 for U.S. Appl. No. 14/704,975, filed May 6, 2015 (15 pages).
Response filed May 16, 2016 for Final Rejection dated Feb. 16, 2016 for U.S. Appl. No. 14/205,126, filed Mar. 11, 2014 (11 pages).
Final Rejection dated May 20, 2016 for U.S. Appl. No. 14/703,867, filed May 4, 2015 (21 pages).
Final Rejection dated Jun. 13, 2016 for U.S. Appl. No. 14/704,975, filed May 6, 2015 (16 pages).
Non Final Rejection dated Jun. 16, 2016 for U.S. Appl. No. 14/205,126, filed Mar. 11, 2014 (17 pages).
Non-Final Rejection dated Jun. 16, 2016 for U.S. Appl. No. 14/703,854, filed May 4, 2015 (16 pages).
Response filed May 26, 2016 to Non-Final Rejection dated Feb. 26, 2016 for U.S. Appl. No. 14/703,863, filed May 4, 2015 (14 pages).
Response filed Jul. 5, 2016 for Final Rejection dated Apr. 4, 2016 for U.S. Appl. No. 14/702,739, filed May 3, 2015 (12 pages).
Non-final Rejection dated Jul. 12, 2016 for U.S. Appl. No. 14/704,979, filed May 6, 2015 (25 pages).
Response filed Aug. 10, 2016 to Final Rejection dated May 12, 2016 for U.S. Appl. No. 14/702,710 (10 pages).
Response filed Jul. 25, 2016 to Final Rejection dated Mar. 24, 2016 for U.S. Appl. No. 14/703,871, filed May 4, 2015 (10 pages).
Final rejection dated Jul. 29, 2016 for U.S. Appl. No. 14/703,863, filed May 4, 2015 (15 pages).
Non-final rejection dated Aug. 1, 2016 for U.S. Appl. No. 14/702,739, filed May 3, 2015, (22 pages).

(56) References Cited

OTHER PUBLICATIONS

Response filed Jul. 22, 2016 to Final Rejection dated Apr. 22, 2016 for U.S. Appl. No. 14/702,709, filed May 2, 2015 (11 pages).
Non-final rejection dated Aug. 23, 2016 for U.S. Appl. No. 14/704,976, filed May 6, 2015, (20 pages).
Non-final rejection dated Aug. 30, 2016 for U.S. Appl. No. 14/704,971, (21 pages).
Communication Pursuant to Rule 164(1) EPC for EP Application No. 14764114.6, based on PCT/US2014/028977, dated Sep. 7, 2016 (6 pages).
Non-Final rejection dated Sep. 9, 2016 for U.S. Appl. No. 14/703,871 (23 pages).
Non-Final rejection dated Sep. 13, 2016 for U.S. Appl. No. 14/707,981 (25 pages).
Non-Final rejection dated Aug. 26, 2016 for U.S. Appl. No. 14/702,710 (13 pages).
Response to Final Rejection filed Sep. 28, 2016 for U.S. Appl. No. 14/703,863 (14 pages).
Non-Final rejection dated Sep. 22, 2016 for U.S. Appl. No. 14/702,709 (18 pages).
Response filed Oct. 5, 2016 for Non Final Rejection for U.S. Appl. No. 14/205,126, (13 pages).
Non-Final rejection dated Oct. 4, 2016 for U.S. Appl. No. 14/704,974 (18 pages).
Response filed Oct. 10, 2016 to to Non-Final Rejection for U.S. Appl. No. 14/703,854, (9 pages).
Response filed Oct. 12, 2016 to Non-final Rejection for U.S. Appl. No. 14/704,979, (10 pages).
Communication pursuant to Rule 164(1) EPC and partial supplementary European Search Report dated Oct. 4, 2016 for EP application No. 14778352.6, Applicant Magic Leap, Inc., (8 pages).
Non-Final Rejection dated Oct. 21, 2016 for U.S. Appl. No. 14/703,867, (23 pages).
Response filed Oct. 31, 2016 to Non-final rejection for U.S. Appl. No. 14/702,739, (10 pages).
Final Rejection dated Oct. 31, 2016 for U.S. Appl. No. 14/704,979, (21 pages).
Response to Final Rejection filed with RCE on Oct. 31, 2016 for U.S. Appl. No. 14/703,863 (12 pages).
Non final rejection dated Nov. 3, 2016 for U.S. Appl. No. 14/702,736 (31 pages).
Response to final rejection filed with RCE on Oct. 13, 2016 for Final Rejection for U.S. Appl. No. 14/704,975, (9 pages).
Final Rejection dated Nov. 7, 2016 for U.S. Appl. No. 14/205,126, (17 pages).
Response to Final Rejection filed with RCE on Oct. 5, 2016 for U.S. Appl. No. 14/703,867 (14 pages).
Supplemental response filed Nov. 15, 2016 for U.S. Appl. No. 14/702,739 (10 pages).
Non final office action dated Nov. 21, 2016 for U.S. Appl. No. 14/703,863, (14 pages).
Response to Non-final office action filed Nov. 22, 2016 for U.S. Appl. No. 14/704,976, (17 pages).
Final office action dated Nov. 28, 2016 for U.S. Appl. No. 14/702,739 (27 pages).
Response to Non-Final rejection filed Dec. 21, 2016 for U.S. Appl. No. 14/702,709 (12 pages).
Final rejection dated Dec. 27, 2016 for U.S. Appl. No. 14/704,976, (24 pages).
Final rejection dated Jan. 13, 2017 for U.S. Appl. No. 14/703,854 (18 pages).
Extended European Search Report for European Application No. 14778352.6, Applicant Magic Leap, Inc., dated Jan. 11, 2017 (13 pages).
Roscher, Low cost projection device with a 2-dimensional resonant micro scanning mirror, MOEMS Display and Imaging Systems II, edited by Hakan Urey, David L. Dickensheets, Proceedings of SPIE vol. 5348, pp. 22-31,2004.
Response to Non-Final rejection filed Jan. 9, 2017 for U.S. Appl. No. 14/703,871, 8 pages.
Response to Non final office action filed Jan. 25, 2017 for U.S. Appl. No. 14/702,710 11 pages.
Response to Non-final Office action filed Feb. 6, 2017 for U.S. Appl. No. 14/704,974 29 pages.
Response to Non-final Office action filed Jan. 31, 2017 for U.S. Appl. No. 14/704,979 10 pages.
Non-final office action for U.S. Appl. No. 14/704,975, dated Feb. 8, 2017 22 pages.
Response to Non-final office action filed May 8, 2017 for U.S. Appl. No. 14/704,975.
Response to Non-final Office action filed Feb. 13, 2017 for U.S. Appl. No. 14/704,981.
Response to Non-final Office action filed Feb. 21, 2017 for U.S. Appl. No. 14/703,867.
Response to Non-Final Office action filed Feb. 28, 2017 for U.S. Appl. No. 14/704,971 29 pages.
Response to Non-Final Office action filed Mar. 2, 2017 for U.S. Appl. No. 14/702,736 29 pages.
Response to Non-Final Office action filed Mar. 7, 2017 for U.S. Appl. No. 14/205,126 18 pages.
Response to Non-Final Office action filed Mar. 20, 2017 for U.S. Appl. No. 14/703,863 13 pages.
Final Office Action for U.S. Appl. No. 14/704,974, dated Mar. 20, 2017 13 pages.
Response to Final Office action filed Mar. 24, 2017 for U.S. Appl. No. 14/703,976 30 pages.
Response to Final Office action filed Mar. 28, 2017 for U.S. Appl. No. 14/702,739 12 pages.
Non-Final Office Action dated Mar. 30, 2017 for U.S. Appl. No. 14/205,126 18 pages.
Final Office action dated Mar. 29, 2017 for U.S. Appl. No. 14/704,981 41 pages.
Final rejection dated Apr. 7, 2017 for U.S. Appl. No. 14/703,863, 15 pages.
Final Rejection dated Apr. 21, 2017 for U.S. Appl. No. 14/702,709, 30 pages.
Final Rejection dated May 1, 2017 for U.S. Appl. No. 14/704,971, 46 pages.
Response to Final Office action filed May 22, 2017 for U.S. Appl. No. 14/704,974 13 pages.
Advisory Action dated Jun. 1, 2017 for U.S. Appl. No. 14/704,974 12 pages.
Non-final Office Action dated May 4, 2017 for U.S. Appl. No. 14/703,871, 15 pages.
Final Rejection dated May 19, 2017 for U.S. Appl. No. 14/704,975, 16 pages.
Non-final Rejection dated May 31, 2017 for U.S. Appl. No. 14/704,979, 26 pages.
Final Rejection dated May 18, 2017 for U.S. Appl. No. 14/702,710, 14 pages.
Response to Final office action filed Apr. 12, 2017 for U.S. Appl. No. 14/703,854 10 pages.
Non-Final office action dated May 4, 2017 for U.S. Appl. No. 14/703,854 18 pages.
Final office action dated May 4, 2017 for U.S. Appl. No. 14/702,736 42 pages.
Response to Final Office Action filed Jun. 19, 2017 for U.S. Appl. No. 14/702,709, 10 pages.
Final office action dated Jun. 16, 2017 for U.S. Appl. No. 14/703,867, 27 pages.
Response to Final office action filed with RCE on Jun. 26, 2017 for U.S. Appl. No. 14/704,974, 32 pages.
Response to Non final office action filed Jun. 29, 2017 for U.S. Appl. No. 14/205,126, 12 pages.
Response to Final office action filed Jul. 5, 2017 for U.S. Appl. No. 14/702,736, 27 pages.
Response to Final office action filed with RCE on Jul. 3, 2017 for U.S. Appl. No. 14/704,971, 23 pages.
Response to Final office action filed with RCE on Jul. 7, 2017 for U.S. Appl. No. 14/703,863, 13 pages.
Advisory Action dated Oct. 6, 2016 for U.S. Appl. No. 14/703,863 4 pages.

(56) References Cited

OTHER PUBLICATIONS

Response to Final office action filed Jul. 19, 2017 for U.S. Appl. No. 14/704,975, 8 pages.
Non-Final Office Action filed Jun. 23, 2017 for U.S. Appl. No. 14/702,739, 28 pages.
Non-Final Office Action filed Jul. 12, 2017 for U.S. Appl. No. 14/704,976, 43 pages.
Response to Office Action with RCE filed Jun. 28, 2017 for U.S. Appl. No. 14/704,981.
Advisory Action dated Jul. 31, 2017 for U.S. Appl. No. 14/704,975.
Response to Office Action filed Aug. 4, 2017 for U.S. Appl. No. 14/703,854.
Response to Office Action with AFCE filed Aug. 16, 2017 for U.S. Appl. No. 14/703,867.
Advisory Action dated Aug. 11, 2017 for U.S. Appl. No. 14/702,736.
Response to Office Action filed Aug. 31, 2017 for U.S. Appl. No. 14/704,979.
Response to Office Action with RCE filed Sep. 5, 2017 for U.S. Appl. No. 14/702,736.
Non Final Office action dated Aug. 24, 2017 for U.S. Appl. No. 14/702,709.
Response to Office Action with RCE filed Sep. 22, 2017 for U.S. Appl. No. 14/703,867.
Non Final Office Action dated Sep. 25, 2017 for U.S. Appl. No. 14/703,563.
Advisory Action dated Sep. 22, 2017 for U.S. Appl. No. 14/703,867.
Response to Non final office action filed Oct. 12, 2017 for U.S. Appl. No. 14/704,976, 20 pages.
Non Final Office Action dated Sep. 27, 2017 for U.S. Appl. No. 14/704,794.
Final Office Action dated Sep. 27, 2017 for U.S. Appl. No. 14/704,979.
Non Final Office Action dated Oct. 12, 2017 for U.S. Appl. No. 14/704,981.
Non Final Office Action dated Nov. 2, 2017 for U.S. Appl. No. 14/702,710.
Non Final Office Action dated Oct. 26, 2017 for U.S. Appl. No. 14/704,971.
Final Office Action dated Oct. 25, 2017 for U.S. Appl. No. 14/702,739.
Response to Non Final Office Action filed Nov. 22, 2017 for U.S. Appl. No. 14/702,709, 21 pages.
Final office action dated Nov. 16, 2017 for U.S. Appl. No. 14/205,125, 18 pages.
Non-Final office action dated Nov. 16, 2017 for U.S. Appl. No. 14/703,867, 28 pages.
Final Office Action dated Nov. 30, 2017 for U.S. Appl. No. 14/703,854, 19 pages.
Final Office Action dated Nov. 30, 2017 for U.S. Appl. No. 14/703,871, 18 pages.
Final office action dated Dec. 1, 2017 for U.S. Appl. No. 14/704,976, 48 pages.
Non-Final office action dated Dec. 21, 2017 for U.S. Appl. No. 14/704,975, 28 pages.
Response to Non final office action filed Dec. 22, 2017 for U.S. Appl. No. 14/703,863, 12 pages.
Amendment and Response to Non-Final Office Action dated Sep. 27, 2017 for U.S. Appl. No. 14/704,974, filed Dec. 27, 2017, 27 pages.
Amendment and Response to Final Office Action for U.S. Appl. No. 14/704,979, filed Dec. 27, 2017, 9 pages.
Non final office action dated Dec. 28, 2017 for U.S. Appl. No. 14/702,736.
Advisory Action for U.S. Appl. No. 14/704,979 dated Jan. 11, 2018.
Response to Non Final Office Action filed Jan. 11, 2018 for U.S. Appl. No. 14/704,981.
Office action for Japanese Patent Application No. 2016-501326 dated Dec. 15, 2017, in Japanese with translation provided by Foreign Associate.
Non final office action dated Jan. 11, 2018 for U.S. Appl. No. 14/702,709.
Response to Final Office Action filed Jan. 19, 2018 for U.S. Appl. No. 14/702,739.
Response to Non Final Office Action filed Jan. 25, 2018 for U.S. Appl. No. 14/704,971.
Amendment RCE and Response to Final Office Action for U.S. Appl. No. 14/704,979, filed Jan. 29, 2018.
Response to Office Action filed Jan. 29, 2018 for U.S. Appl. No. 14/703,854.
Final office action dated Feb. 6, 2018 for U.S. Appl. No. 14/704,974.
Final office action dated Feb. 12, 2018 for U.S. Appl. No. 14/704,981.
Response to Office Action filed Feb. 15, 2018 for U.S. Appl. No. 14/703,867.
Notice of Appeal filed Feb. 28, 2018 for U.S. Appl. No. 14/703,854.
Response to Office Action filed Mar. 2, 2018 for U.S. Appl. No. 14/702,710.
Final Office Action dated Mar. 14, 2018 for U.S. Appl. No. 14/704,971.
Non-Final Office Action dated Mar. 14, 2018 for U.S. Appl. No. 14/704,979.
Response to Non-final office action filed Mar. 21, 2018 for U.S. Appl. No. 14/704,975.
Non-final office action dated Mar. 15, 2018 for U.S. Appl. No. 14/702,739.
Non-final office action dated Mar. 28, 2018 for U.S. Appl. No. 14/205,126.
Response to Office Action filed Mar. 28, 2018 for U.S. Appl. No. 14/702,736.
Response to Final Office Action for U.S. Appl. No. 14/703,871 dated Mar. 30, 2018.
Response to Final Office Action for U.S. Appl. No. 14/704,976, filed Apr. 2, 2018.
Response to Non-final office action filed Apr. 11, 2018 for U.S. Appl. No. 14/702,709.
Final office action dated Apr. 24, 2018 for U.S. Appl. No. 14/704,975.
Final office action dated May 2, 2018 for U.S. Appl. No. 14/702,710.
Response to Final Office Action for U.S. Appl. No. 14/704,974 dated May 7, 2018.
Response to Final office action and RCE filed May 14, 2018 U.S. Appl. No. 14/704,981.
Final office action dated May 18, 2018 for U.S. Appl. No. 14/702,736.
Notice of Appeal filed Jun. 6, 2018 for U.S. Appl. No. 14/704,974.
Advisory Action dated Jun. 6, 2018 for U.S. Appl. No. 14/704,974.
Non-Final Offive Action dated Jun. 7, 2018 for U.S. Appl. No. 14/704,976.
Response to Final Office Action and RCE for U.S. Appl. No. 14/702,736 dated Aug. 20, 2018.
RCE and Amendment After Final for U.S. Appl. No. 14/704,975, dated Aug. 24, 2018.
Non-Final rejection dated Aug. 10, 2018 for U.S. Appl. No. 14/703,854 14 pages.
Non-Final Office Action dated Aug. 28, 2018 for U.S. Appl. No. 14/704,971.
Response to Final Office Action and RCE for U.S. Appl. No. 14/702,710 dated Sep. 4, 2018.
Response to Final Office Action and RCE for U.S. Appl. No. 14/704,971 dated Jun. 14, 2018.
Response to Non-final office action for U.S. Appl. No. 14/704,979, filed Jun. 14, 2018 (12 pages).
Response to Non-final office action filed Jun. 15, 2018 for U.S. Appl. No. 14/702,739.
Response to Non-Final Office Action filed Jun. 28, 2018 for U.S. Appl. No. 14/205,126.
Notice of Allowance dated Jul. 10, 2018 for U.S. Appl. No. 14/703,867.
Non final office action dated Jul. 13, 2018 for U.S. Appl. No. 14/704,974.
Final Office Action dated Jun. 26, 2018 for U.S. Appl. No. 14/703,863.
EP Examination Report dated Jul. 25, 2018 for EP Appln. No. 14778352.6.
Non-Final office action dated Aug. 2, 2018 for U.S. Appl. No. 14/707,981 44 pages.
Final Office Action dated Aug. 2, 2018 for U.S. Appl. No. 14/704,979.

(56) References Cited

OTHER PUBLICATIONS

Notice of Allowance dated Aug. 1, 2018 for U.S. Appl. No. 14/702,739.
Notice of Allowance dated Aug. 6, 2018 for U.S. Appl. No. 14/702,709.
Office action for Australian Patent Application No. 2014248874, dated Jul. 25, 2018, 3 pages.
Office action for Japanese Patent Application No. 2016-501326, dated Jul. 18, 2018, including English translation provided by Japanese Associate, 10 pages.
Examination Report dated Sep. 28, 2018 for New Zealand Application No. 735747.
Examination Report dated Oct. 2, 2018 for New Zealand Application No. 735751.
Examination Report dated Oct. 2, 2018 for New Zealand Application No. 735752.
Examination Report dated Oct. 4, 2018 for New Zealand Application No. 735754.
Examination Report dated Oct. 8, 2018 for New Zealand Application No. 735755.
Response to Non-Final Office Action filed Sep. 7, 2018 for U.S. Appl. No. 14/704,976.
Amendment after Final Office Action filed Oct. 2, 2018 for U.S. Appl. No. 14/704,979.
Final Office Action dated Sep. 27, 2018 for U.S. Appl. No. 14/704,976.
Non Final Office Action dated Sep. 27, 2018 for U.S. Appl. No. 14/704,975.
Non Final Office Action dated Oct. 1, 2018 for U.S. Appl. No. 14/702,736.
Notice of Allowance dated Oct. 3, 2018 for U.S. Appl. No. 14/702,709.
Response to Non-Final Office Action filed Oct. 15, 2018 for U.S. Appl. No. 14/704,9764.
Advisory Action dated Oct. 16, 2018 for U.S. Appl. No. 14/704,979.
Response to Non-Final Office Action filed Nov. 1, 2018 for U.S. Appl. No. 14/704,981.

\* cited by examiner

SELECTIVE LIGHT TRANSMISSION FOR AUGMENTED OR VIRTUAL REALITY

RELATED APPLICATION

The present application is a continuation of U.S. application Ser. No. 14/205,126, filed on Mar. 11, 2014, which claims the benefit under 35 U.S.C. § 119 to U.S. Provisional Application No. 61/776,771, filed on Mar. 11, 2013. The foregoing applications are hereby incorporated by reference into the present application in their entirety.

FIELD OF THE INVENTION

The present invention generally relates to systems and methods configured to facilitate interactive virtual or augmented reality environments for one or more users.

BACKGROUND

Virtual and augmented reality environments are generated by computers using, in part, data that describes the environment. This data may describe, for example, various objects with which a user may sense and interact with. Examples of these objects include objects that are rendered and displayed for a user to see, audio that is played for a user to hear, and tactile (or haptic) feedback for a user to feel. Users may sense and interact with the virtual and augmented reality environments through a variety of visual, auditory and tactical means.

SUMMARY

Embodiments of the present invention are directed to devices, systems and methods for facilitating virtual reality and/or augmented reality interaction for one or more users.

One embodiment is directed to a user display device comprising a housing frame mountable on a head of a user, a first pair of cameras coupled to the housing frame to track a movement of the user's eyes and to estimate a depth of focus based on the tracked eye movements, a projection module having a light generating mechanism to generate and modify, based on the estimated depth of focus, a projected light associated with a display object such that the display object appears to be in focus, a lens mounted on the housing frame, and—a processor communicatively coupled to the projection module to communicate data associated with the display image to the projection module. The lens may comprise at least one transparent mirror positioned in front of the user's eyes to bounce the projected light into the user's eyes. The at least one transparent mirror may selectively allow a transmission of light from the local environment.

The user display device may further comprise a second pair of cameras mountable on the housing frame to capture a field-of-view image of an eye corresponding to each of the second pair of cameras. The processor may calculate a head pose of the user based on the captured field-of-view images.

The projection module may comprise a scanned laser arrangement to modify the projected light beam associated with the display object based on the estimated depth of focus. The diameter of the projected light beam may be less than 0.7 mm.

In one embodiment, the first pair of cameras may comprise infrared cameras paired with infrared light sources to track a movement of each of the user's eyes. The user display device may further comprise a sensor assembly comprising at least one sensor to sense at least one of a movement of the user, a location of the user, a direction of the user and an orientation of the user. The at least one sensor may be an accelerometer, a compass or a gyroscope. The processor may estimate a head pose of the user based on the at least one of the movement of the user, the location of the user, the direction of the user, and the orientation of the user. The user display device may comprise a GPS system. The user display device may further comprise a haptic interface device communicatively coupled to the projection module to provide tactile feedback. 20. The user display device may further comprise an environment sensing system to digitally reconstruct an environment of the user.

The processor may be communicatively coupled to a computer network to transmit at least a portion of a virtual world data, and receive another portion of the virtual world data.

The user display device may comprise an audio speaker module mountable on the head frame to output sounds. The user display device may further comprise a microphone mountable on the housing frame to capture sounds local to the user.

The projection module may modify another projected light associated with another object that is not the display object such that the other object appears blurred. The processor may render frames of the display object at a rate of at least 60 frames per second.

The display object may be at least one of a virtual object, a rendered physical object, an image and a video.

In another embodiment, a method comprises tracking a movement of a user's eyes, estimating a depth of focus of the user's eyes based on the tracked eye movement, modifying a light beam associated with a display object based on the estimated depth of focus such that the display object appears in focus, and projecting the modified light beam into the user's eyes. The diameter of the projected light beam projected to the user's eyes may be less than 0.7 mm.

The method may further comprise selectively allowing a transmission of light from a local environment of the user based on a visualization mode of the display object. The visualization mode may be one of an augmented reality mode, a virtual reality mode, and a combination of augmented and virtual reality modes.

The method may further comprise capturing a field-of-view image of each of the user's eyes. The captured field of view image may be used to estimate a head pose of the user. The captured field-of-view image may be used to convert at least one physical object to a physically rendered virtual object, and to display the physically rendered virtual object to the user.

The method may further comprise extracting a set of points in the captured field-of-view image, and creating a fiducial for at least one physical object in the captured field-of-view image based on the extracted set of points. The method may further comprise transmitting the at least one of the extracted set of points and the created fiducial to a cloud computer, and tagging the at least one of the extracted set of points and the created fiducial to a type of object. The method may further comprise recognizing a different physical object as belonging to the type of object based on at least one of the tagged set of points associated with the type of object and the tagged created fiducial associated with the type of object.

The method may further comprise sensing at least one of a movement of the user, a location of the user, a direction of the user and an orientation of the user, and calculating a pose of the user based on the at least one sensed movement, sensed location, sensed direction and sensed orientation. The sensor may be at least one of an accelerometer, a compass and a gyroscope.

The method may further comprise processing a virtual world data associated with the display object to a cloud network, and transmitting at least a portion of the virtual world data associated with the display object to a second user located at a second location such that the second user may experience the at least portion of the virtual world data associated with the display object at the second location.

The method may further comprise sensing a physical object, and modifying, based on a predetermined relationship with the sensed physical object, at least a portion of the virtual world data associated with the display object. The method further comprises presenting the modified virtual world data to the second user.

The method may further comprise modifying another light associated with another object that is not the display object such that the other object appears blurred.

The method may further comprise receiving user input through a user interface, and modifying the display object based on the received user input. The user interface may be at least one of a haptic interface device, a keyboard, a mouse, a joystick, a motion capture controller, an optical tracking device and an audio input device. The display object may be at least one of a virtual object, a rendered physical object, an image and a video.

In another embodiment, a method comprises interacting with a virtual world comprising virtual world data through a head-mounted user display device, wherein the head-mounted user display device renders a display image associated with at least a portion of the virtual world data to a user based on an estimated depth of focus of the user's eyes, creating an additional virtual world data originating from at least one of the interaction of the head-mounted user device with the virtual world and an interaction with a physical environment of the user, and transmitting the additional virtual world data to a computer network. The virtual world may be presented in a two-dimensional format or a three-dimensional format.

The method may further comprise transmitting, for presentation the additional virtual world data to a second user at a second location such that the second user can experience the additional virtual world data from the second location. The additional virtual world data may be associated with a field-of-view image captured through the head-mounted user display device. The additional virtual world data may be associated with at least one a sensed movement of the user, a sensed location of the user, a sensed direction of the user and a sensed orientation of the user. The additional virtual world data may be associated with a physical object sensed by the head-mounted user display device. The additional virtual world data may be associated with the display object having a predetermined relationship with the sensed physical object.

The method may further comprise selecting, based on user input, an interface for enabling interaction between the user and the head-mounted user display device, and rendering the display object associated with at least the portion of the virtual world data based on the selected interface. The selected interface may be one of a virtual reality mode, an augmented reality mode, a blended reality mode, and a combination of the virtual reality and augmented reality modes.

In another embodiment a method enabling two or more users to interact with a virtual world comprising virtual world data comprises displaying the virtual world through a first user display device in a first visualization mode of a first user, transmitting at least a portion of the virtual world data, through a computer network, to a second user display, and displaying the virtual world associated with the transmitted portion of the virtual world data in a second visualization mode at the second user display device of a second user. The first visualization mode may be different from the second visualization mode. The first and visualization modes may be at least one of an augmented reality mode, a virtual reality mode, a blended reality mode, and a combination of the virtual reality and augment reality modes.

In another embodiment, a method, comprises processing at least one of a rendered physical image data associated with an image of a real physical object and a virtual image data associated with a virtual display object based on a selection of a user, and selectively displaying to a user the selected combination of a real physical object as seen by the user in real-time, a rendered physical-virtual object, rendered based on the real physical object as seen by the user in real-time, and the virtual display object. The at least one of a real physical object, the rendered physical-virtual object and the virtual display object may be selectively displayed based on user input of a visualization mode. The visualization mode may be at least one of an augmented reality mode, a virtual reality mode, a blended reality mode, and a combination of the virtual and augmented reality modes.

The method further comprises receiving an image data associated with another display object through a computer network and converting the image data to a data format compatible with the selected visualization mode such that the user can view the other display object in the selected visualization mode.

The method further comprises selectively allowing, based on the selected visualization mode, a transmission of light from an outside environment such that the user can view the real physical object.

In another embodiment, a method, comprises selectively allowing, through a lens of a head-mounted user display device, a transmission of light from an outside environment, wherein the head-mounted user display device is configured for displaying either entirely virtual objects, entirely physical objects or a combination of virtual objects and physical objects.

The selective allowance of transmission of light may be based on a desired visualization mode, wherein the desired visualization mode is one of an augmented reality mode, a virtual reality mode, a blended reality mode, and a combination of augmented and virtual reality modes.

The method may further comprise allowing a complete transmission of light from the outside environment when the head-mounted user display device is turned off, such that the user only views the entirely physical objects.

The method may further comprise projecting a light beam associated with at least one display object having a particular shape into the user's eyes, and selectively allowing the transmission of light from the outside environment based on the particular shape of the at least one display object such that the user views the display object along with physical objects in the outside environment. The method may further comprise preventing the transmission of light from the outside environment such that the user only views the entirely virtual objects.

In another embodiment, a method enabling two or more users to interact within a virtual world comprising virtual world data comprises creating a remote avatar for a first user accessing the virtual world through a first user device at a first location, placing, the remote avatar of the first user, at a real geographical location, such that the first user can experience the real geographical location through the first user device at the first location, and interacting with a second user accessing the virtual world through a second user device at the real geographical location through the remote avatar placed at the real geographical location. The first location may be different from the real geographical location, or the first location may be substantially the same as the real geographical location.

The remote avatar may have a predetermined relationship to a physical object at the real geographical location. The remote avatar may respond to an environmental cue at the real geographical location. The movement of the remote avatar may controlled by the first user. The remote avatar may interact with a second user at the real geographical location.

In another embodiment, a method comprises capturing, through a head-mounted user display device, a field of view image of each of the user's eyes, extracting a set of points in the captured field-of-view image, associating the extracted set of points to a particular object, and recognizing a different object based on the associated set of points of the particular object.

Another embodiment is directed to a system for enabling two or more users to interact within a virtual world comprising virtual world data, comprising a computer network comprising one or more computing devices, the one or more computing devices comprising memory, processing circuitry, and software stored at least in part in the memory and executable by the processing circuitry to process at least a portion of the virtual world data; wherein at least a first portion of the virtual world data originates from a first user virtual world local to a first user, and wherein the computer network is operable to transmit the first portion to a user device for presentation to a second user, such that the second user may experience the first portion from the location of the second user, such that aspects of the first user virtual world are effectively passed to the second user. The first and second users may be in different physical locations or in substantially the same physical location. At least a portion of the virtual world may be configured to change in response to a change in the virtual world data. At least a portion of the virtual world may be configured to change in response to a physical object sensed by the user device. The change in virtual world data may represent a virtual object having a predetermined relationship with the physical object. The change in virtual world data may be presented to a second user device for presentation to the second user according to the predetermined relationship. The virtual world may be operable to be rendered by at least one of the computer servers or a user device. The virtual world may be presented in a two-dimensional format. The virtual world may be presented in a three-dimensional format. The user device may be operable to provide an interface for enabling interaction between a user and the virtual world in an augmented reality mode. The user device may be operable to provide an interface for enabling interaction between a user and the virtual world in a virtual reality mode. The user device may be operable to provide an interface for enabling interaction between a user and the virtual world a combination of augmented and virtual reality mode. The virtual world data may be transmitted over a data network. The computer network may be operable to receive at least a portion of the virtual world data from a user device. At least a portion of the virtual world data transmitted to the user device may comprise instructions for generating at least a portion of the virtual world. At least a portion of the virtual world data may be transmitted to a gateway for at least one of processing or distribution. At least one of the one or more computer servers may be operable to process virtual world data distributed by the gateway.

Another embodiment is directed to a system for virtual and/or augmented user experience wherein remote avatars are animated based at least in part upon data on a wearable device with optional input from voice inflection and facial recognition software.

Another embodiment is directed to a system for virtual and/or augmented user experience wherein a camera pose or viewpoint position and vector may be placed anywhere in a world sector.

Another embodiment is directed to a system for virtual and/or augmented user experience wherein worlds or portions thereof may be rendered for observing users at diverse and selectable scales.

Another embodiment is directed to a system for virtual and/or augmented user experience wherein features, such as points or parametric lines, in addition to pose tagged images, may be utilized as base data for a world model from which software robots, or object recognizers, may be utilized to create parametric representations of real-world objects, tagging source features for mutual inclusion in segmented objects and the world model.

Additional and other objects, features, and advantages of the invention are described in the detail description, figures and claims.

DETAILED DESCRIPTION

Figure 1:
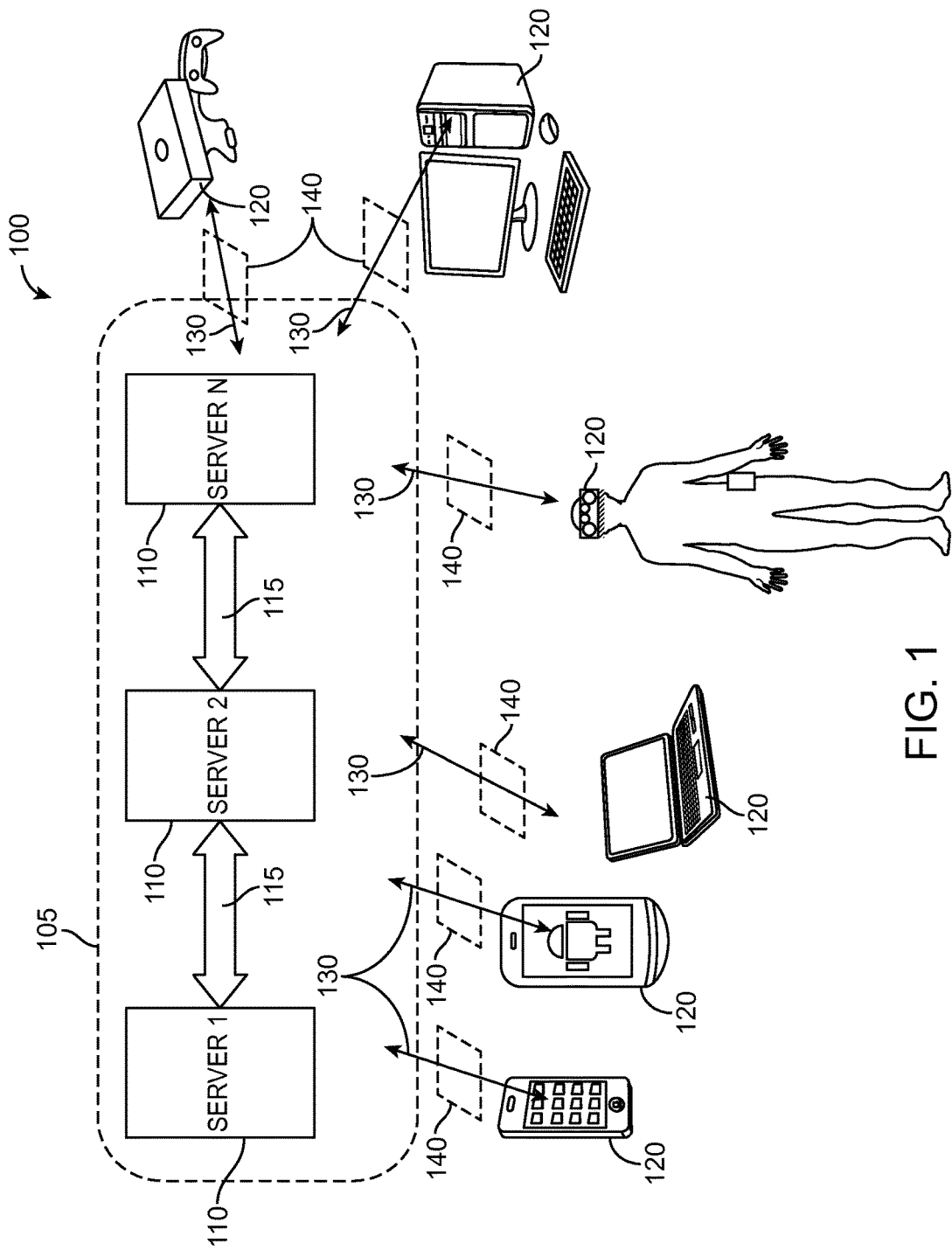
FIG. 1 illustrates a representative embodiment of the disclosed system for facilitating interactive virtual or augmented reality environments for multiple users.

Referring to FIG. 1, system 100 is representative hardware for implementing processes described below. This representative system comprises a computing network 105 comprised of one or more computer servers 110 connected through one or more high bandwidth interfaces 115. The servers in the computing network need not be co-located. The one or more servers 110 each comprise one or more processors for executing program instructions. The servers also include memory for storing the program instructions and data that is used and/or generated by processes being carried out by the servers under direction of the program instructions.

The computing network 105 communicates data between the servers 110 and between the servers and one or more user devices 120 over one or more data network connections 130. Examples of such data networks include, without limitation, any and all types of public and private data networks, both mobile and wired, including for example the interconnection of many of such networks commonly referred to as the Internet. No particular media, topology or protocol is intended to be implied by the figure.

User devices are configured for communicating directly with computing network 105, or any of the servers 110. Alternatively, user devices 120 communicate with the remote servers 110, and, optionally, with other user devices locally, through a specially programmed, local gateway 140 for processing data and/or for communicating data between the network 105 and one or more local user devices 120.

As illustrated, gateway 140 is implemented as a separate hardware component, which includes a processor for executing software instructions and memory for storing software instructions and data. The gateway has its own wired and/or wireless connection to data networks for communicating with the servers 110 comprising computing network 105. Alternatively, gateway 140 can be integrated with a user device 120, which is worn or carried by a user. For example, the gateway 140 may be implemented as a downloadable software application installed and running on a processor included in the user device 120. The gateway 140 provides, in one embodiment, one or more users access to the computing network 105 via the data network 130.

Servers 110 each include, for example, working memory and storage for storing data and software programs, microprocessors for executing program instructions, graphics processors and other special processors for rendering and generating graphics, images, video, audio and multi-media files. Computing network 105 may also comprise devices for storing data that is accessed, used or created by the servers 110.

Software programs running on the servers and optionally user devices 120 and gateways 140, are used to generate digital worlds (also referred to herein as virtual worlds) with which users interact with user devices 120. A digital world is represented by data and processes that describe and/or define virtual, non-existent entities, environments, and conditions that can be presented to a user through a user device 120 for users to experience and interact with. For example, some type of object, entity or item that will appear to be physically present when instantiated in a scene being viewed or experienced by a user may include a description of its appearance, its behavior, how a user is permitted to interact with it, and other characteristics. Data used to create an environment of a virtual world (including virtual objects) may include, for example, atmospheric data, terrain data, weather data, temperature data, location data, and other data used to define and/or describe a virtual environment. Additionally, data defining various conditions that govern the operation of a virtual world may include, for example, laws of physics, time, spatial relationships and other data that may be used to define and/or create various conditions that govern the operation of a virtual world (including virtual objects).

The entity, object, condition, characteristic, behavior or other feature of a digital world will be generically referred to herein, unless the context indicates otherwise, as an object (e.g., digital object, virtual object, rendered physical object, etc.). Objects may be any type of animate or inanimate object, including but not limited to, buildings, plants, vehicles, people, animals, creatures, machines, data, video, text, pictures, and other users. Objects may also be defined in a digital world for storing information about items, behaviors, or conditions actually present in the physical world. The data that describes or defines the entity, object or item, or that stores its current state, is generally referred to herein as object data. This data is processed by the servers 110 or, depending on the implementation, by a gateway 140 or user device 120, to instantiate an instance of the object and render the object in an appropriate manner for the user to experience through a user device.

Programmers who develop and/or curate a digital world create or define objects, and the conditions under which they are instantiated. However, a digital world can allow for others to create or modify objects. Once an object is instantiated, the state of the object may be permitted to be altered, controlled or manipulated by one or more users experiencing a digital world.

For example, in one embodiment, development, production, and administration of a digital world are generally provided by one or more system administrative programmers. In some embodiments, this may include development, design, and/or execution of story lines, themes, and events in the digital worlds as well as distribution of narratives through various forms of events and media such as, for example, film, digital, network, mobile, augmented reality, and live entertainment. The system administrative programmers may also handle technical administration, moderation, and curation of the digital worlds and user communities associated therewith, as well as other tasks typically performed by network administrative personnel.

Users interact with one or more digital worlds using some type of a local computing device, which is generally designated as a user device 120. Examples of such user devices include, but are not limited to, a smart phone, tablet device, heads-up display (HUD), gaming console, or any other device capable of communicating data and providing an interface or display to the user, as well as combinations of such devices. In some embodiments, the user device 120 may include, or communicate with, local peripheral or input/output components such as, for example, a keyboard, mouse, joystick, gaming controller, haptic interface device, motion capture controller, an optical tracking device such as those available from Leap Motion, Inc., or those available from Microsoft under the trade name Kinect®, audio equipment, voice equipment, projector system, 3D display, and holographic 3D contact lens.

Figure 2:
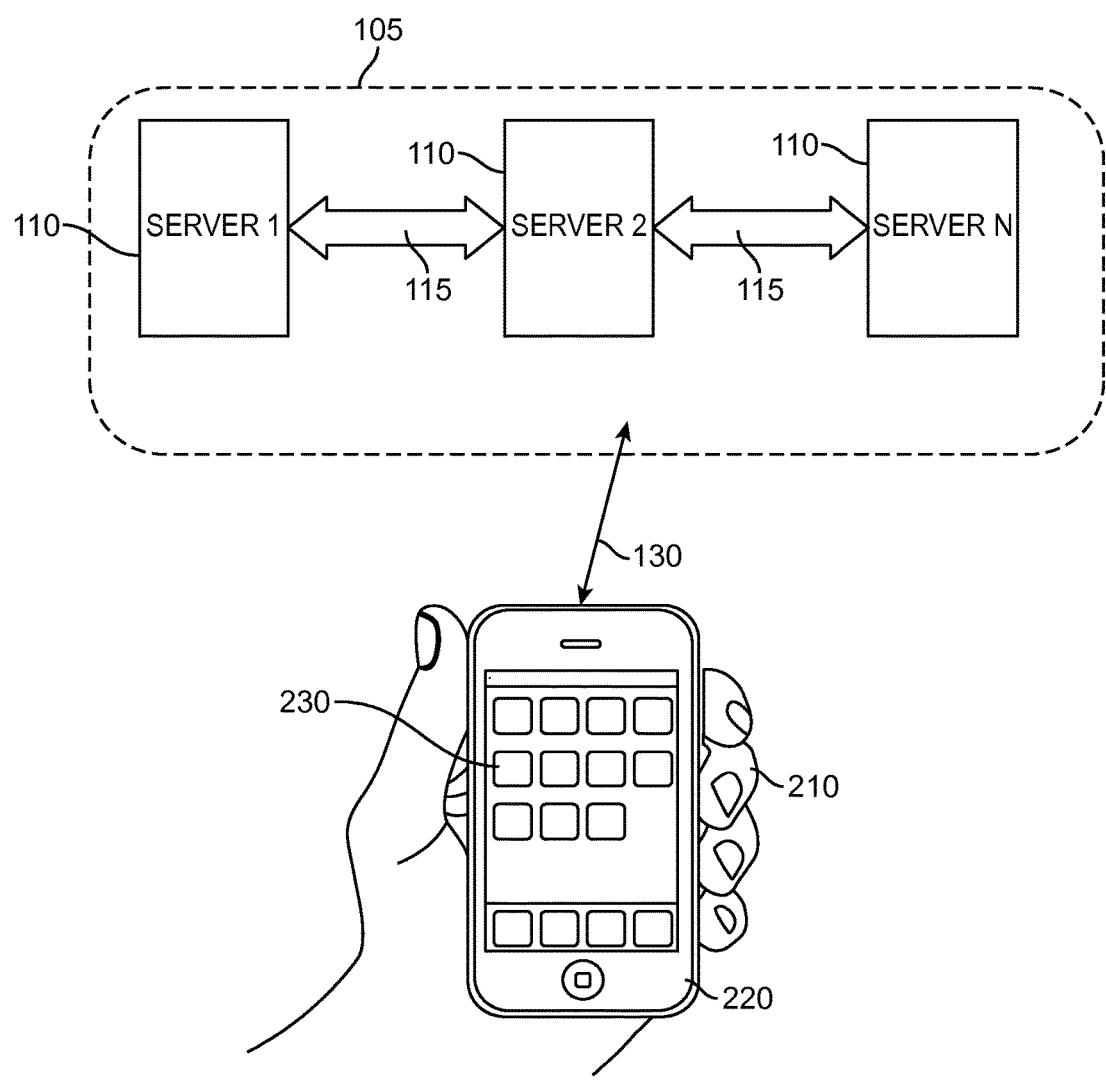
FIG. 2 illustrates an example of a user device for interacting with the system illustrated in FIG. 1.

An example of a user device 120 for interacting with the system 100 is illustrated in FIG. 2. In the example embodiment shown in FIG. 2, a user 210 may interface one or more digital worlds through a smart phone 220. The gateway is implemented by a software application 230 stored on and running on the smart phone 220. In this particular example, the data network 130 includes a wireless mobile network connecting the user device (i.e., smart phone 220) to the computer network 105.

In one implementation of preferred embodiment, system 100 is capable of supporting a large number of simultaneous users (e.g., millions of users), each interfacing with the same digital world, or with multiple digital worlds, using some type of user device 120.

The user device provides to the user an interface for enabling a visual, audible, and/or physical interaction between the user and a digital world generated by the servers 110, including other users and objects (real or virtual) presented to the user. The interface provides the user with a rendered scene that can be viewed, heard or otherwise sensed, and the ability to interact with the scene in real-time. The manner in which the user interacts with the rendered scene may be dictated by the capabilities of the user device. For example, if the user device is a smart phone, the user interaction may be implemented by a user contacting a touch screen. In another example, if the user device is a computer or gaming console, the user interaction may be implemented using a keyboard or gaming controller. User devices may include additional components that enable user interaction such as sensors, wherein the objects and information (including gestures) detected by the sensors may be provided as input representing user interaction with the virtual world using the user device.

The rendered scene can be presented in various formats such as, for example, two-dimensional or three-dimensional visual displays (including projections), sound, and haptic or tactile feedback. The rendered scene may be interfaced by the user in one or more modes including, for example, augmented reality, virtual reality, and combinations thereof. The format of the rendered scene, as well as the interface modes, may be dictated by one or more of the following: user device, data processing capability, user device connectivity, network capacity and system workload. Having a large number of users simultaneously interacting with the digital worlds, and the real-time nature of the data exchange, is enabled by the computing network 105, servers 110, the gateway component 140 (optionally), and the user device 120.

In one example, the computing network 105 IS comprised of a large-scale computing system having single and/or multi-core servers (i.e., servers 110) connected through high-speed connections (e.g., high bandwidth interfaces 115). The computing network 105 may form a cloud or grid network. Each of the servers includes memory, or is coupled with computer readable memory for storing software for implementing data to create, design, alter, or process objects of a digital world. These objects and their instantiations may be dynamic, come in and out of existence, change over time, and change in response to other conditions. Examples of dynamic capabilities of the objects are generally discussed herein with respect to various embodiments. In some embodiments, each user interfacing the system 100 may also be represented as an object, and/or a collection of objects, within one or more digital worlds.

The servers 110 within the computing network 105 also store computational state data for each of the digital worlds. The computational state data (also referred to herein as state data) may be a component of the object data, and generally defines the state of an instance of an object at a given instance in time. Thus, the computational state data may change over time and may be impacted by the actions of one or more users and/or programmers maintaining the system 100. As a user impacts the computational state data (or other data comprising the digital worlds), the user directly alters or otherwise manipulates the digital world. If the digital world is shared with, or interfaced by, other users, the actions of the user may affect what is experienced by other users interacting with the digital world. Thus, in some embodiments, changes to the digital world made by a user will be experienced by other users interfacing with the system 100.

The data stored in one or more servers 110 within the computing network 105 is, in one embodiment, transmitted or deployed at a high-speed, and with low latency, to one or more user devices 120 and/or gateway components 140. In one embodiment, object data shared by servers may be complete or may be compressed, and contain instructions for recreating the full object data on the user side, rendered and visualized by the user's local computing device (e.g., gateway 140 and/or user device 120). Software running on the servers 110 of the computing network 105 may, in some embodiments, adapt the data it generates and sends to a particular user's device 120 for objects within the digital world (or any other data exchanged by the computing network 105) as a function of the user's specific device and bandwidth. For example, when a user interacts with a digital world through a user device 120, a server 110 may recognize the specific type of device being used by the user, the device's connectivity and/or available bandwidth between the user device and server, and appropriately size and balance the data being delivered to the device to optimize the user interaction. An example of this may include reducing the size of the transmitted data to a low resolution quality, so that the data may be displayed on a particular user device having a low resolution display. In a preferred embodiment, the computing network 105 and/or gateway component 140 deliver data to the user device 120 at a rate sufficient to present an interface operating at 15 frames/second or higher, and at a resolution that is high definition quality or greater.

The gateway 140 provides local connection to the computing network 105 for one or more users. In some embodiments, it may be implemented by a downloadable software application that runs on the user device 120 or another local device, such as that shown in FIG. 2. In other embodiments, it may be implemented by a hardware component (with appropriate software/firmware stored on the component, the component having a processor) that is either in communication with, but not incorporated with or attracted to, the user device 120, or incorporated with the user device 120. The gateway 140 communicates with the computing network 105 via the data network 130, and provides data exchange between the computing network 105 and one or more local user devices 120. As discussed in greater detail below, the gateway component 140 may include software, firmware, memory, and processing circuitry, and may be capable of processing data communicated between the network 105 and one or more local user devices 120.

In some embodiments, the gateway component 140 monitors and regulates the rate of the data exchanged between the user device 120 and the computer network 105 to allow optimum data processing capabilities for the particular user device 120. For example, in some embodiments, the gateway 140 buffers and downloads both static and dynamic aspects of a digital world, even those that are beyond the field of view presented to the user through an interface connected with the user device. In such an embodiment, instances of static objects (structured data, software implemented methods, or both) may be stored in memory (local to the gateway component 140, the user device 120, or both) and are referenced against the local user's current position, as indicated by data provided by the computing network 105 and/or the user's device 120. Instances of dynamic objects, which may include, for example, intelligent software agents and objects controlled by other users and/or the local user, are stored in a high-speed memory buffer. Dynamic objects representing a two-dimensional or three-dimensional object within the scene presented to a user can be, for example, broken down into component shapes, such as a static shape that is moving but is not changing, and a dynamic shape that is changing. The part of the dynamic object that is changing can be updated by a real-time, threaded high priority data stream from a server 110, through computing network 105, managed by the gateway component 140. As one example of a prioritized threaded data stream, data that is within a 60 degree field-of-view of the user's eye may be given higher priority than data that is more peripheral. Another example includes prioritizing dynamic characters and/or objects within the user's field-of-view over static objects in the background.

In addition to managing a data connection between the computing network 105 and a user device 120, the gateway component 140 may store and/or process data that may be presented to the user device 120. For example, the gateway component 140 may, in some embodiments, receive compressed data describing, for example, graphical objects to be rendered for viewing by a user, from the computing network 105 and perform advanced rendering techniques to alleviate the data load transmitted to the user device 120 from the computing network 105. In another example, in which gateway 140 is a separate device, the gateway 140 may store and/or process data for a local instance of an object rather than transmitting the data to the computing network 105 for processing.

Figure 3:
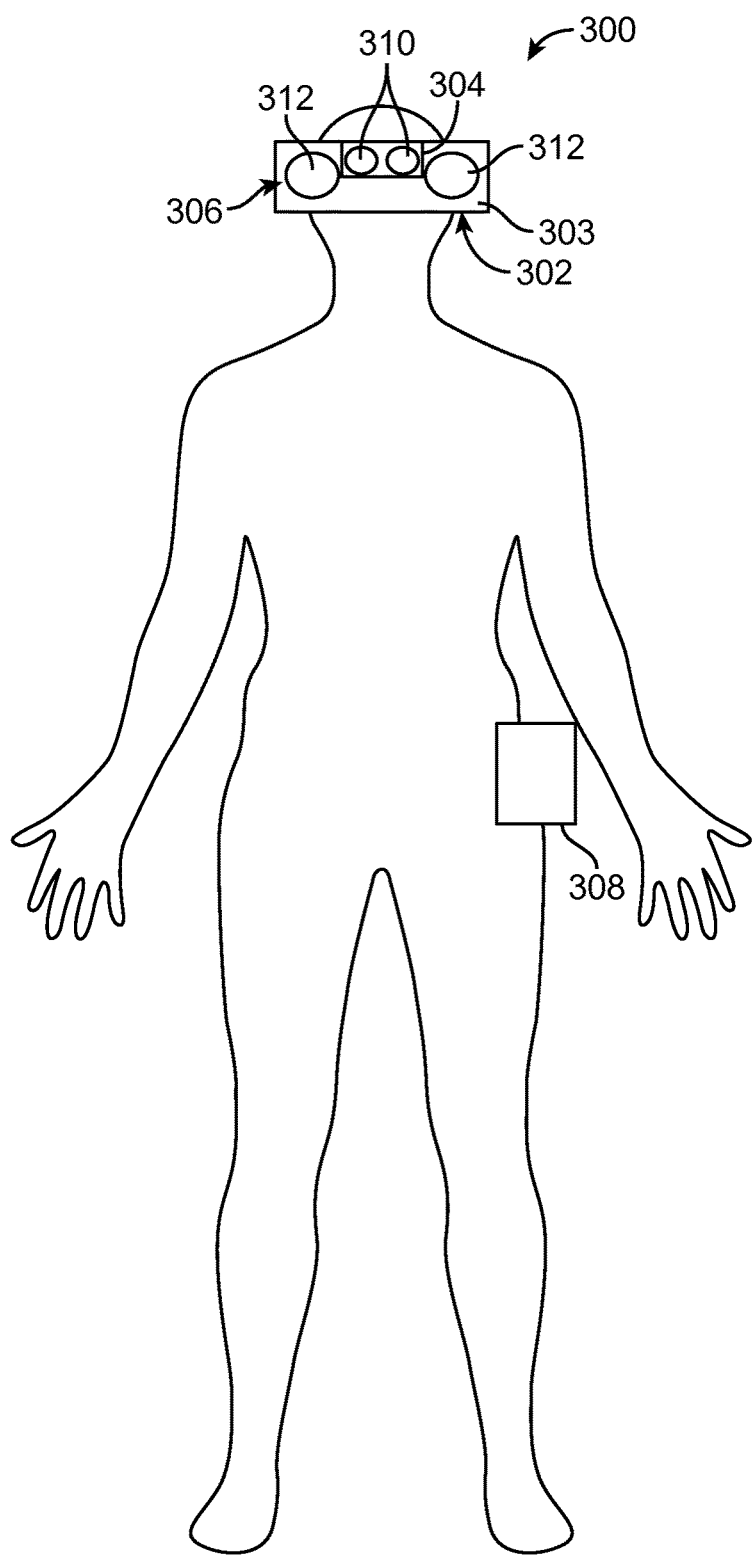
FIG. 3 illustrates an example embodiment of a mobile, wearable user device.

Referring now also to FIG. 3, the digital worlds may be experienced by one or more users in various formats that may depend upon the capabilities of the user's device. In some embodiments, the user device 120 may include, for example, a smart phone, tablet device, heads-up display (HUD), gaming console, or a wearable device. Generally, the user device will include a processor for executing program code stored in memory on the device, coupled with a display, and a communications interface. An example embodiment of a user device is illustrated in FIG. 3, wherein the user device comprises a mobile, wearable device, namely a head-mounted display system 300. In accordance with an embodiment of the present disclosure, the head-mounted display system 300 includes a user interface 302, user-sensing system 304, environment-sensing system 306, and a processor 308. Although the processor 308 is shown in FIG. 3 as an isolated component separate from the head-mounted system 300, in an alternate embodiment, the processor 308 may be integrated with one or more components of the head-mounted system 300, or may be integrated into other system 100 components such as, for example, the gateway 140.

The user device presents to the user an interface 302 for interacting with and experiencing a digital world. Such interaction may involve the user and the digital world, one or more other users interfacing the system 100, and objects within the digital world. The interface 302 generally provides image and/or audio sensory input (and in some embodiments, physical sensory input) to the user. Thus, the interface 302 may include speakers (not shown) and a display component 303 capable, in some embodiments, of enabling stereoscopic 3D viewing and/or 3D viewing which embodies more natural characteristics of the human vision system. In some embodiments, the display component 303 may comprise a transparent interface (such as a clear OLED) which, when in an "off" setting, enables an optically correct view of the physical environment around the user with little-to-no optical distortion or computing overlay. As discussed in greater detail below, the interface 302 may include additional settings that allow for a variety of visual/interface performance and functionality.

The user-sensing system 304 may include, in some embodiments, one or more sensors 310 operable to detect certain features, characteristics, or information related to the individual user wearing the system 300. For example, in some embodiments, the sensors 310 may include a camera or optical detection/scanning circuitry capable of detecting real-time optical characteristics/measurements of the user such as, for example, one or more of the following: pupil constriction/dilation, angular measurement/positioning of each pupil, sphericity, eye shape (as eye shape changes over time) and other anatomic data. This data may provide, or be used to calculate, information (e.g., the user's visual focal point) that may be used by the head-mounted system 300 and/or interface system 100 to optimize the user's viewing experience. For example, in one embodiment, the sensors 310 may each measure a rate of pupil contraction for each of the user's eyes. This data may be transmitted to the processor 308 (or the gateway component 140 or to a server 110), wherein the data is used to determine, for example, the user's reaction to a brightness setting of the interface display 303. The interface 302 may be adjusted in accordance with the user's reaction by, for example, dimming the display 303 if the user's reaction indicates that the brightness level of the display 303 is too high. The user-sensing system 304 may include other components other than those discussed above or illustrated in FIG. 3. For example, in some embodiments, the user-sensing system 304 may include a microphone for receiving voice input from the user. The user sensing system may also include one or more infrared camera sensors, one or more visible spectrum camera sensors, structured light emitters and/or sensors, infrared light emitters, coherent light emitters and/or sensors, gyros, accelerometers, magnetometers, proximity sensors, GPS sensors, ultrasonic emitters and detectors and haptic interfaces.

The environment-sensing system 306 includes one or more sensors 312 for obtaining data from the physical environment around a user. Objects or information detected by the sensors may be provided as input to the user device. In some embodiments, this input may represent user interaction with the virtual world. For example, a user viewing a virtual keyboard on a desk may gesture with his fingers as if he were typing on the virtual keyboard. The motion of the fingers moving may be captured by the sensors 312 and provided to the user device or system as input, wherein the input may be used to change the virtual world or create new virtual objects. For example, the motion of the fingers may be recognized (using a software program) as typing, and the recognized gesture of typing may be combined with the known location of the virtual keys on the virtual keyboard. The system may then render a virtual monitor displayed to the user (or other users interfacing the system) wherein the virtual monitor displays the text being typed by the user.

The sensors 312 may include, for example, a generally outward-facing camera or a scanner for interpreting scene information, for example, through continuously and/or intermittently projected infrared structured light. The environment-sensing system 306 may be used for mapping one or more elements of the physical environment around the user by detecting and registering the local environment, including static objects, dynamic objects, people, gestures and various lighting, atmospheric and acoustic conditions. Thus, in some embodiments, the environment-sensing system 306 may include image-based 3D reconstruction software embedded in a local computing system (e.g., gateway component 140 or processor 308) and operable to digitally reconstruct one or more objects or information detected by the sensors 312. In one exemplary embodiment, the environment-sensing system 306 provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system 306 may include other components other than those discussed above or illustrated in FIG. 3. For example, in some embodiments, the environment-sensing system 306 may include a microphone for receiving audio from the local environment. The user sensing system may also include one or more infrared camera sensors, one or more visible spectrum camera sensors, structure light emitters and/or sensors, infrared light emitters, coherent light emitters and/or sensors gyros, accelerometers, magnetometers, proximity sensors, GPS sensors, ultrasonic emitters and detectors and haptic interfaces.

As mentioned above, the processor 308 may, in some embodiments, be integrated with other components of the head-mounted system 300, integrated with other components of the interface system 100, or may be an isolated device (wearable or separate from the user) as shown in FIG. 3. The processor 308 may be connected to various components of the head-mounted system 300 and/or components of the interface system 100 through a physical, wired connection, or through a wireless connection such as, for example, mobile network connections (including cellular telephone and data networks), Wi-Fi or Bluetooth. The processor 308 may include a memory module, integrated and/or additional graphics processing unit, wireless and/or wired internet connectivity, and codec and/or firmware capable of transforming data from a source (e.g., the computing network 105, the user-sensing system 304, the environment-sensing system 306, or the gateway component 140) into image and audio data, wherein the images/video and audio may be presented to the user via the interface 302.

The processor 308 handles data processing for the various components of the headmounted system 300 as well as data exchange between the head-mounted system 300 and the gateway component 140 and, in some embodiments, the computing network 105. For example, the processor 308 may be used to buffer and process data streaming between the user and the computing network 105, thereby enabling a smooth, continuous and high fidelity user experience. In some embodiments, the processor 308 may process data at a rate sufficient to achieve anywhere between 8 frames/second at 320×240 resolution to 24 frames/second at high definition resolution (1280×720), or greater, such as 60-120 frames/second and 4 k resolution and higher (10 k+ resolution and 50,000 frames/second). Additionally, the processor 308 may store and/or process data that may be presented to the user, rather than streamed in real-time from the computing network 105. For example, the processor 308 may, in some embodiments, receive compressed data from the computing network 105 and perform advanced rendering techniques (such as lighting or shading) to alleviate the data load transmitted to the user device 120 from the computing network 105. In another example, the processor 308 may store and/or process local object data rather than transmitting the data to the gateway component 140 or to the computing network 105.

The head-mounted system 300 may, in some embodiments, include various settings, or modes, that allow for a variety of visual/interface performance and functionality. The modes may be selected manually by the user, or automatically by components of the head-mounted system 300 or the gateway component 140. As previously mentioned, one example of headmounted system 300 includes an "off" mode, wherein the interface 302 provides substantially no digital or virtual content. In the off mode, the display component 303 may be transparent, thereby enabling an optically correct view of the physical environment around the user with little-to-no optical distortion or computing overlay.

In one example embodiment, the head-mounted system 300 includes an "augmented" mode, wherein the interface 302 provides an augmented reality interface. In the augmented mode, the interface display 303 may be substantially transparent, thereby allowing the user to view the local, physical environment. At the same time, virtual object data provided by the computing network 105, the processor 308, and/or the gateway component 140 is presented on the display 303 in combination with the physical, local environment.

Figure 4:
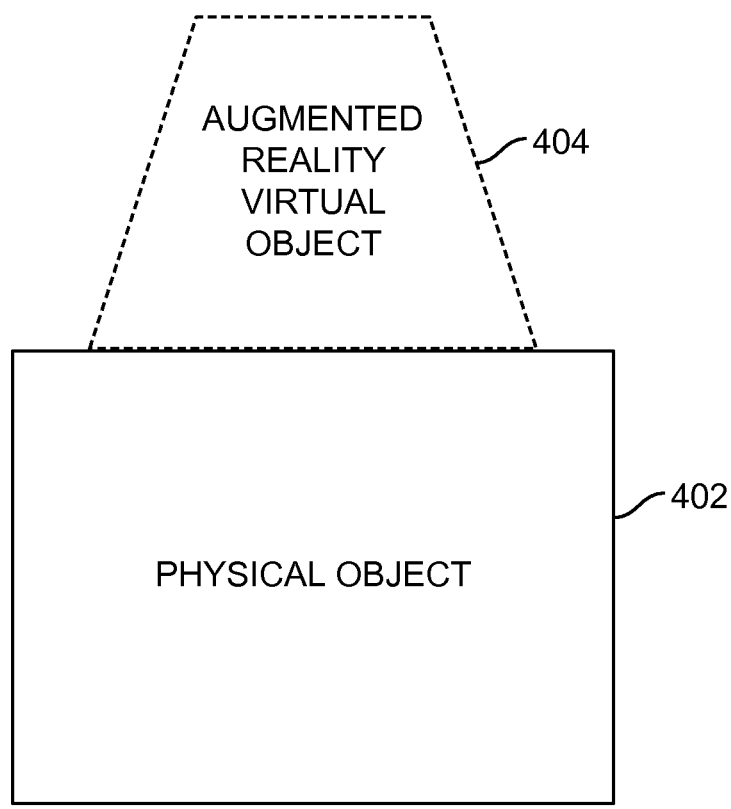
FIG. 4 illustrates an example of objects viewed by a user when the mobile, wearable user device of FIG. 3 is operating in an augmented mode.

FIG. 4 illustrates an example embodiment of objects viewed by a user when the interface 302 is operating in an augmented mode. As shown in FIG. 4, the interface 302 presents a physical object 402 and a virtual object 404. In the embodiment illustrated in FIG. 4, the physical object 402 is a real, physical object existing in the local environment of the user, whereas the virtual object 404 is an object created by the system 100, and displayed via the user interface 302. In some embodiments, the virtual object 404 may be displayed at a fixed position or location within the physical environment (e.g., a virtual monkey standing next to a particular street sign located in the physical environment), or may be displayed to the user as an object located at a position relative to the user interface/display 303 (e.g., a virtual clock or thermometer visible in the upper, left corner of the display 303).

In some embodiments, virtual objects may be made to be cued off of, or trigged by, an object physically present within or outside a user's field of view. Virtual object 404 is cued off, or triggered by, the physical object 402. For example, the physical object 402 may actually be a stool, and the virtual object 404 may be displayed to the user (and, in some embodiments, to other users interfacing the system 100) as a virtual animal standing on the stool. In such an embodiment, the environment-sensing system 306 may use software and/or firmware stored, for example, in the processor 308 to recognize various features and/or shape patterns (captured by the sensors 312) to identify the physical object 402 as a stool. These recognized shape patterns such as, for example, the stool top, may be used to trigger the placement of the virtual object 404. Other examples include walls, tables, furniture, cars, buildings, people, floors, plants, animals—any object which can be seen can be used to trigger an augmented reality experience in some relationship to the object or objects.

In some embodiments, the particular virtual object 404 that is triggered may be selected by the user or automatically selected by other components of the head-mounted system 300 or interface system 100. Additionally, in embodiments in which the virtual object 404 is automatically triggered, the particular virtual object 404 may be selected based upon the particular physical object 402 (or feature thereof) off which the virtual object 404 is cued or triggered. For example, if the physical object is identified as a diving board extending over a pool, the triggered virtual object may be a creature wearing a snorkel, bathing suit, floatation device, or other related items.

In another example embodiment, the head-mounted system 300 may include a "virtual" mode, wherein the interface 302 provides a virtual reality interface. In the virtual mode, the physical environment is omitted from the display 303, and virtual object data provided by the computing network 105, the processor 308, and/or the gateway component 140 is presented on the display 303. The omission of the physical environment may be accomplished by physically blocking the visual display 303 (e.g., via a cover) or through a feature of the interface 302 wherein the display 303 transitions to an opaque setting. In the virtual mode, live and/or stored visual and audio sensory may be presented to the user through the interface 302, and the user experiences and interacts with a digital world (digital objects, other users, etc.) through the virtual mode of the interface 302. Thus, the interface provided to the user in the virtual mode is comprised of virtual object data comprising a virtual, digital world.

Figure 5:
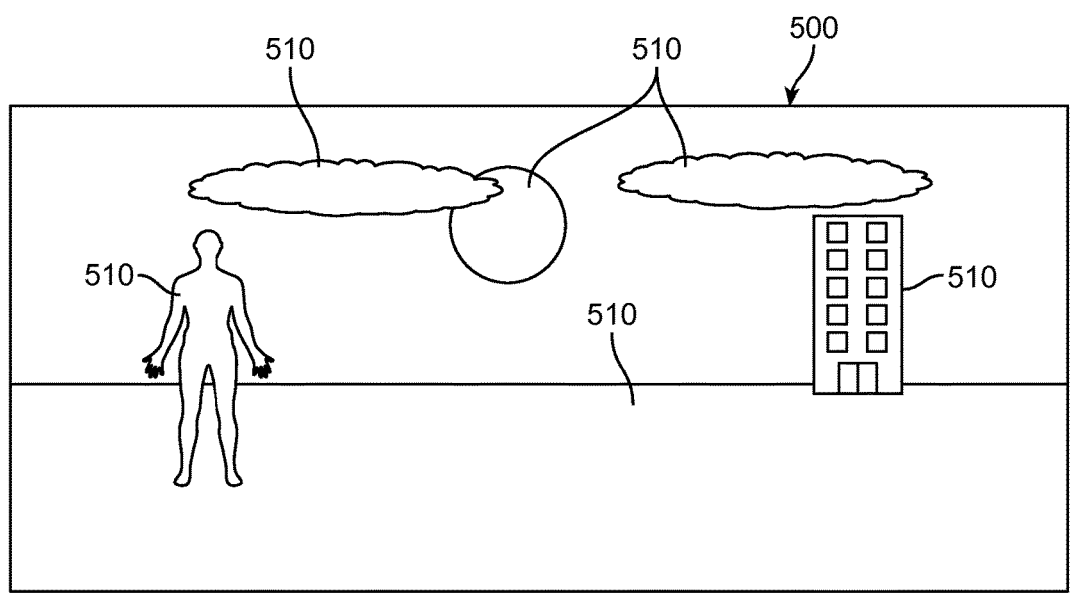
FIG. 5 illustrates an example of objects viewed by a user when the mobile, wearable user device of FIG. 3 is operating in a virtual mode.

FIG. 5 illustrates an example embodiment of a user interface when the headmounted interface 302 is operating in a virtual mode. As shown in FIG. 5, the user interface presents a virtual world 500 comprised of digital objects 510, wherein the digital objects 510 may include atmosphere, weather, terrain, buildings, and people. Although it is not illustrated in FIG. 5, digital objects may also include, for example, plants, vehicles, animals, creatures, machines, artificial intelligence, location information, and any other object or information defining the virtual world 500.

In another example embodiment, the head-mounted system 300 may include a "blended" mode, wherein various features of the head-mounted system 300 (as well as features of the virtual and augmented modes) may be combined to create one or more custom interface modes. In one example custom interface mode, the physical environment is omitted from the display 303, and virtual object data is presented on the display 303 in a manner similar to the virtual mode. However, in this example custom interface mode, virtual objects may be fully virtual (i.e., they do not exist in the local, physical environment) or they may be real, local, physical objects rendered as a virtual object in the interface 302 in place of the physical object. Thus, in this particular custom mode (referred to herein as a blended virtual interface mode), live and/or stored visual and audio sensory may be presented to the user through the interface 302, and the user experiences and interacts with a digital world comprising fully virtual objects and rendered physical objects.

Figure 6:
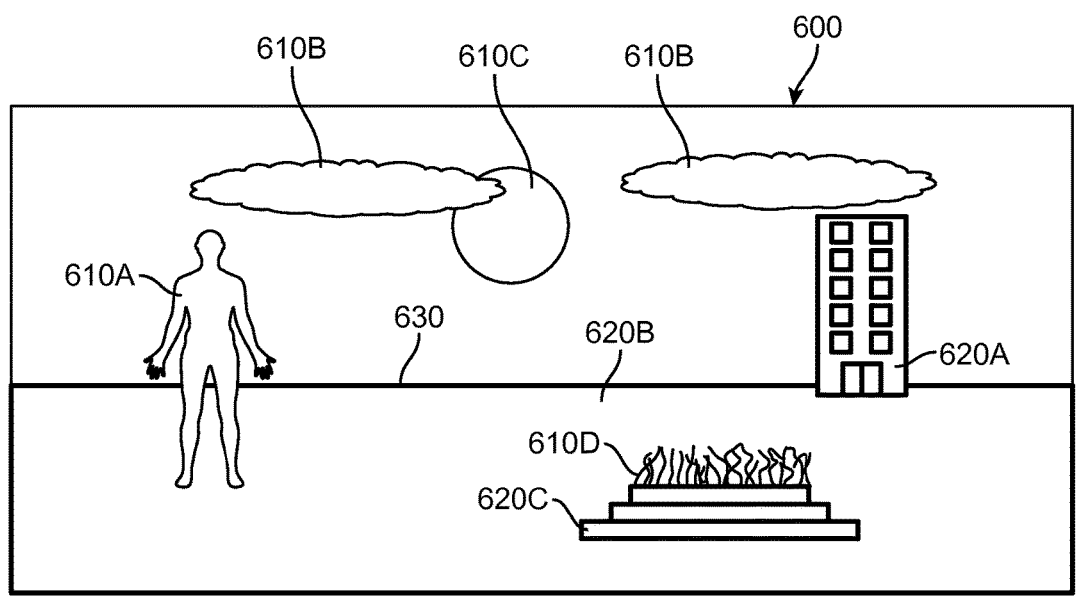
FIG. 6 illustrates an example of objects viewed by a user when the mobile, wearable user device of FIG. 3 is operating in a blended virtual interface mode.

FIG. 6 illustrates an example embodiment of a user interface operating in accordance with the blended virtual interface mode. As shown in FIG. 6, the user interface presents a virtual world 600 comprised of fully virtual objects 610, and rendered physical objects 620 (renderings of objects otherwise physically present in the scene). In accordance with the example illustrated in FIG. 6, the rendered physical objects 620 include a building 620A, ground 620B, and a platform 620C, and are shown with a bolded outline 630 to indicate to the user that the objects are rendered. Additionally, the fully virtual objects 610 include an additional user 610A, clouds 610B, sun 610C, and flames 610D on top of the platform 620C. It should be appreciated that fully virtual objects 610 may include, for example, atmosphere, weather, terrain, buildings, people, plants, vehicles, animals, creatures, machines, artificial intelligence, location information, and any other object or information defining the virtual world 600, and not rendered from objects existing in the local, physical environment. Conversely, the rendered physical objects 620 are real, local, physical objects rendered as a virtual object in the interface 302. The bolded outline 630 represents one example for indicating rendered physical objects to a user. As such, the rendered physical objects may be indicated as such using methods other than those disclosed herein.

In some embodiments, the rendered physical objects 620 may be detected using the sensors 312 of the environment-sensing system 306 (or using other devices such as a motion or image capture system), and converted into digital object data by software and/or firmware stored, for example, in the processing circuitry 308. Thus, as the user interfaces with the system 100 in the blended virtual interface mode, various physical objects may be displayed to the user as rendered physical objects. This may be especially useful for allowing the user to interface with the system 100, while still being able to safely navigate the local, physical environment. In some embodiments, the user may be able to selectively remove or add the rendered physical objects to the interface display 303.

In another example custom interface mode, the interface display 303 may be substantially transparent, thereby allowing the user to view the local, physical environment, while various local, physical objects are displayed to the user as rendered physical objects. This example custom interface mode is similar to the augmented mode, except that one or more of the virtual objects may be rendered physical objects as discussed above with respect to the previous example.

The foregoing example custom interface modes represent a few example embodiments of various custom interface modes capable of being provided by the blended mode of the head-mounted system 300. Accordingly, various other custom interface modes may be created from the various combination of features and functionality provided by the components of the headmounted system 300 and the various modes discussed above without departing from the scope of the present disclosure.

The embodiments discussed herein merely describe a few examples for providing an interface operating in an off, augmented, virtual, or blended mode, and are not intended to limit the scope or content of the respective interface modes or the functionality of the components of the head-mounted system 300. For example, in some embodiments, the virtual objects may include data displayed to the user (time, temperature, elevation, etc.), objects created and/or selected by the system 100, objects created and/or selected by a user, or even objects representing other users interfacing the system 100. Additionally, the virtual objects may include an extension of physical objects (e.g., a virtual sculpture growing from a physical platform) and may be visually connected to, or disconnected from, a physical object.

The virtual objects may also be dynamic and change with time, change in accordance with various relationships (e.g., location, distance, etc.) between the user or other users, physical objects, and other virtual objects, and/or change in accordance with other variables specified in the software and/or firmware of the head-mounted system 300, gateway component 140, or servers 110. For example, in certain embodiments, a virtual object may respond to a user device or component thereof (e.g., a virtual ball moves when a haptic device is placed next to it), physical or verbal user interaction (e.g., a virtual creature runs away when the user approaches it, or speaks when the user speaks to it), a chair is thrown at a virtual creature and the creature dodges the chair, other virtual objects (e.g., a first virtual creature reacts when it sees a second virtual creature), physical variables such as location, distance, temperature, time, etc. or other physical objects in the user's environment (e.g., a virtual creature shown standing in a physical street becomes flattened when a physical car passes).

The various modes discussed herein may be applied to user devices other than the head-mounted system 300. For example, an augmented reality interface may be provided via a mobile phone or tablet device. In such an embodiment, the phone or tablet may use a camera to capture the physical environment around the user, and virtual objects may be overlaid on the phone/tablet display screen. Additionally, the virtual mode may be provided by displaying the digital world on the display screen of the phone/tablet. Accordingly, these modes may be blended as to create various custom interface modes as described above using the components of the phone/tablet discussed herein, as well as other components connected to, or used in combination with, the user device. For example, the blended virtual interface mode may be provided by a computer monitor, television screen, or other device lacking a camera operating in combination with a motion or image capture system. In this example embodiment, the virtual world may be viewed from the monitor/screen and the object detection and rendering may be performed by the motion or image capture system.

Figure 7:
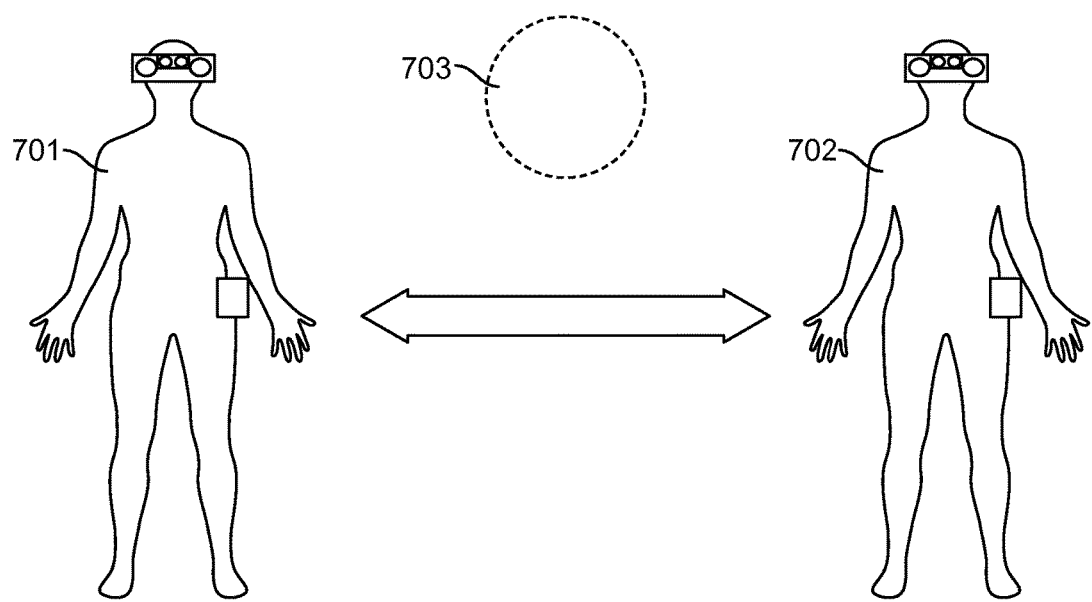
FIG. 7 illustrates an embodiment wherein two users located in different geographical locations each interact with the other user and a common virtual world through their respective user devices.

FIG. 7 illustrates an example embodiment of the present disclosure, wherein two users located in different geographical locations each interact with the other user and a common virtual world through their respective user devices. In this embodiment, the two users 701 and 702 are throwing a virtual ball 703 (a type of virtual object) back and forth, wherein each user is capable of observing the impact of the other user on the virtual world (e.g., each user observes the virtual ball changing directions, being caught by the other user, etc.). Since the movement and location of the virtual objects (i.e., the virtual ball 703) are tracked by the servers 110 in the computing network 105, the system 100 may, in some embodiments, communicate to the users 701 and 702 the exact location and timing of the arrival of the ball 703 with respect to each user. For example, if the first user 701 is located in London, the user 701 may throw the ball 703 to the second user 702 located in Los Angeles at a velocity calculated by the system 100. Accordingly, the system 100 may communicate to the second user 702 (e.g., via email, text message, instant message, etc.) the exact time and location of the ball's arrival. As such, the second user 702 may use his device to see the ball 703 arrive at the specified time and located. One or more users may also use geo-location mapping software (or similar) to track one or more virtual objects as they travel virtually across the globe. An example of this may be a user wearing a 3D head-mounted display looking up in the sky and seeing a virtual plane flying overhead, superimposed on the real world. The virtual plane may be flown by the user, by intelligent software agents (software running on the user device or gateway), other users who may be local and/or remote, and/or any of these combinations.

Figure 8:
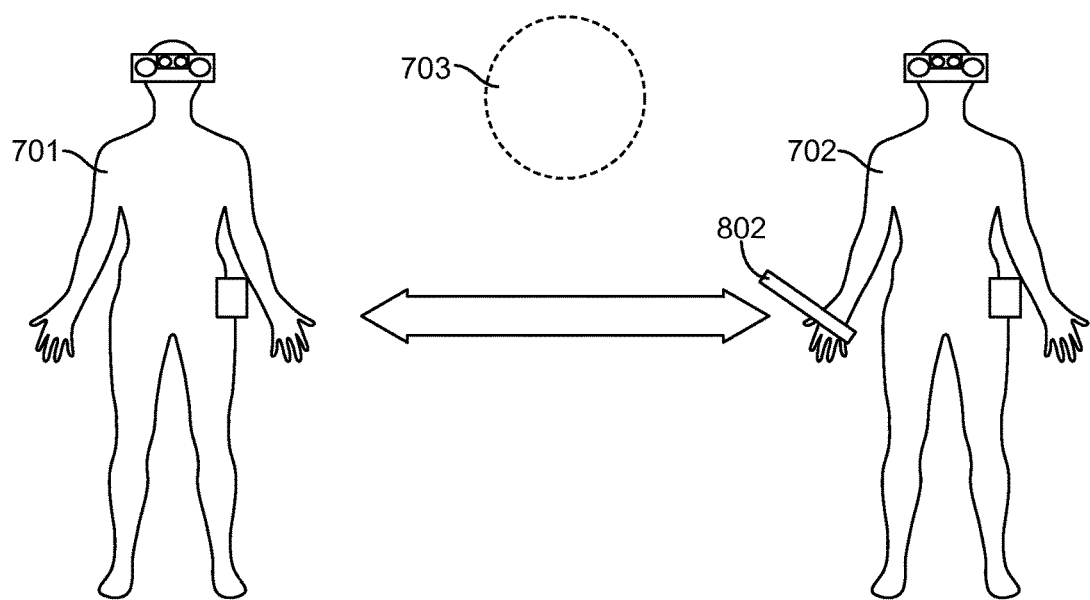
FIG. 8 illustrates an embodiment wherein the embodiment of FIG. 7 is expanded to include the use of a haptic device.

As previously mentioned, the user device may include a haptic interface device, wherein the haptic interface device provides a feedback (e.g., resistance, vibration, lights, sound, etc.) to the user when the haptic device is determined by the system 100 to be located at a physical, spatial location relative to a virtual object. For example, the embodiment described above with respect to FIG. 7 may be expanded to include the use of a haptic device 802, as shown in FIG. 8.

In this example embodiment, the haptic device 802 may be displayed in the virtual world as a baseball bat. When the ball 703 arrives, the user 702 may swing the haptic device 802 at the virtual ball 703. If the system 100 determines that the virtual bat provided by the haptic device 802 made "contact" with the ball 703, then the haptic device 802 may vibrate or provide other feedback to the user 702, and the virtual ball 703 may ricochet off the virtual bat in a direction calculated by the system 100 in accordance with the detected speed, direction, and timing of the ball-to-bat contact.

The disclosed system 100 may, in some embodiments, facilitate mixed mode interfacing, wherein multiple users may interface a common virtual world (and virtual objects contained therein) using different interface modes (e.g., augmented, virtual, blended, etc.). For example, a first user interfacing a particular virtual world in a virtual interface mode may interact with a second user interfacing the same virtual world in an augmented reality mode.

Figure 9A:
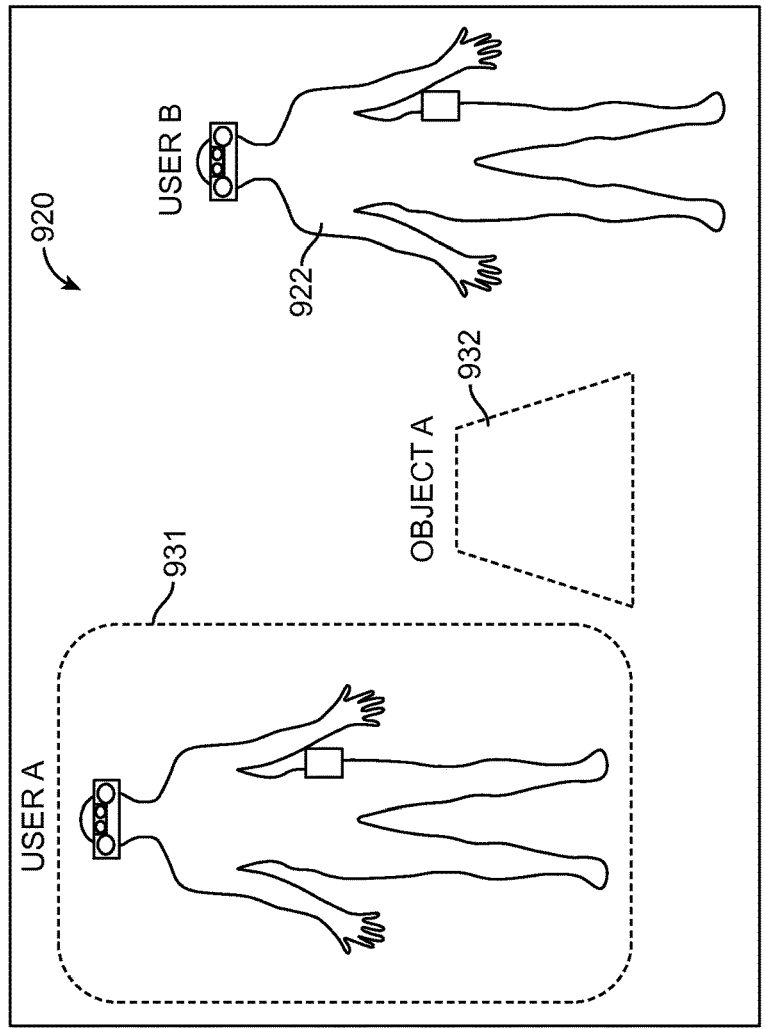
FIG. 9A illustrates an example of mixed mode interfacing, wherein a first user is interfacing a digital world in a blended virtual interface mode and a second user is interfacing the same digital world in a virtual reality mode.
Figure 9A:
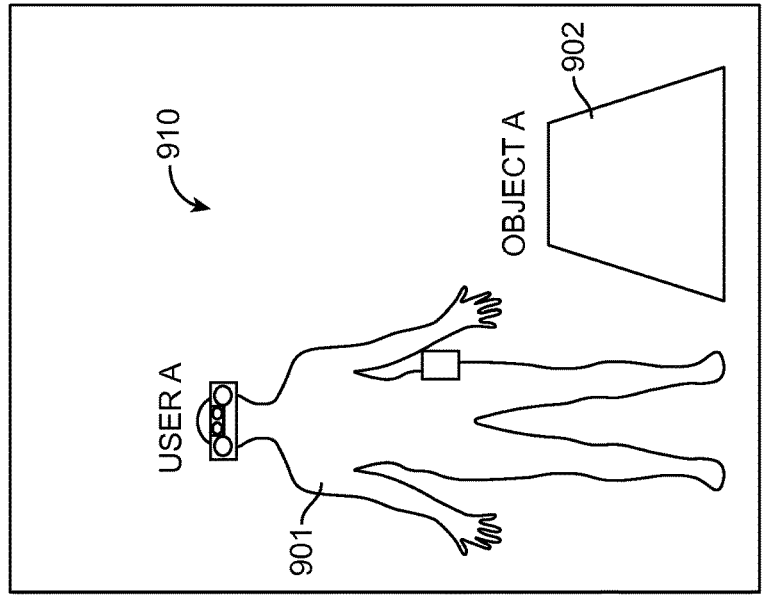

FIG. 9A illustrates an example wherein a first user 901 (interfacing a digital world of the system 100 in a blended virtual interface mode) and first object 902 appear as virtual objects to a second user 922 interfacing the same digital world of the system 100 in a full virtual reality mode. As described above, when interfacing the digital world via the blended virtual interface mode, local, physical objects (e.g., first user 901 and first object 902) may be scanned and rendered as virtual objects in the virtual world. The first user 901 may be scanned, for example, by a motion capture system or similar device, and rendered in the virtual world (by software/firmware stored in the motion capture system, the gateway component 140, the user device 120, system servers 110, or other devices) as a first rendered physical object 931. Similarly, the first object 902 may be scanned, for example, by the environment-sensing system 306 of a head-mounted interface 300, and rendered in the virtual world (by software/firmware stored in the processor 308, the gateway component 140, system servers 110, or other devices) as a second rendered physical object 932. The first user 901 and first object 902 are shown in a first portion 910 of FIG. 9A as physical objects in the physical world. In a second portion 920 of FIG. 9A, the first user 901 and first object 902 are shown as they appear to the second user 922 interfacing the same digital world of the system 100 in a full virtual reality mode: as the first rendered physical object 931 and second rendered physical object 932.

Figure 9B:
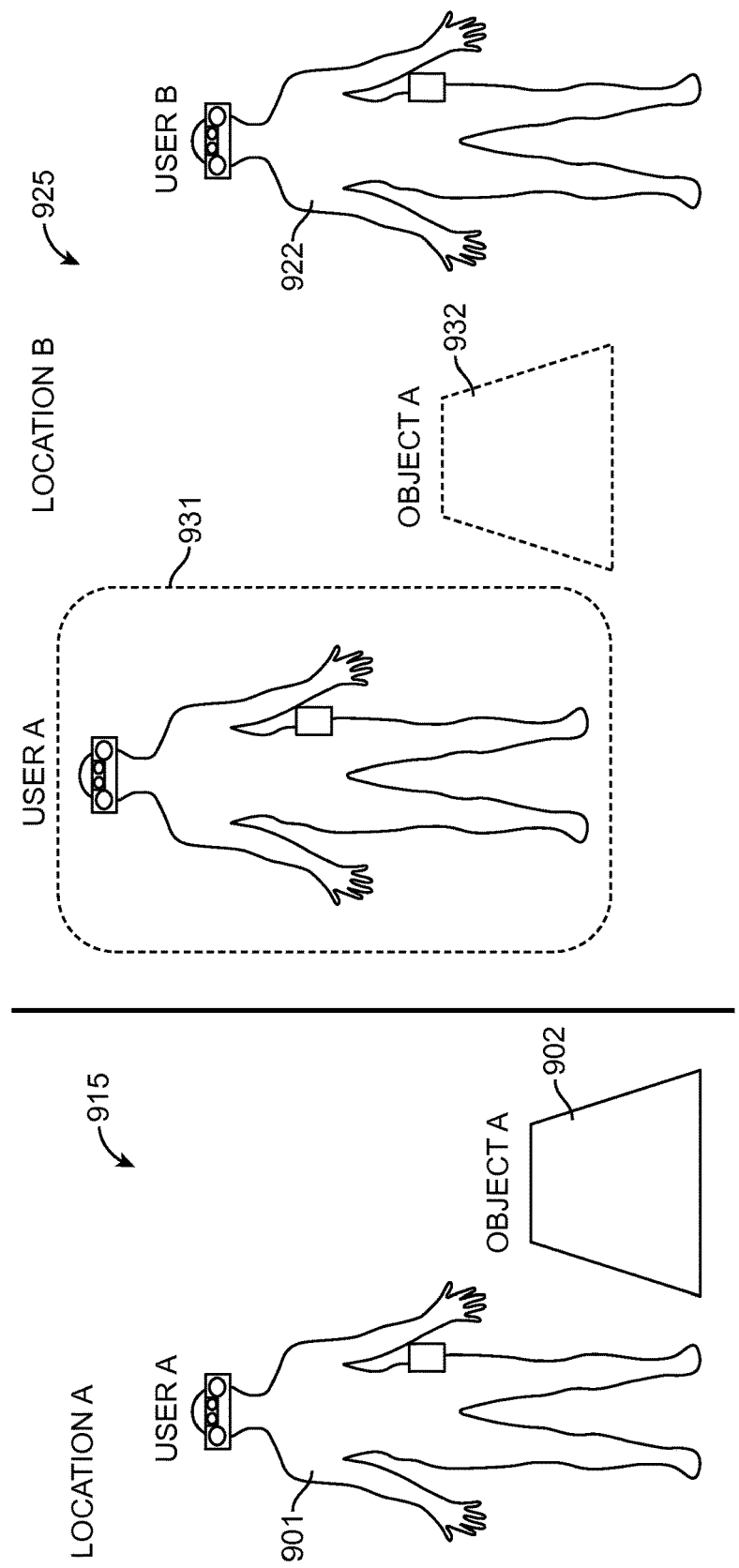
FIG. 9B illustrates another example of mixed mode interfacing, wherein the first user is interfacing a digital world in a blended virtual interface mode and the second user is interfacing the same digital world in an augmented reality mode.

FIG. 9B illustrates another example embodiment of mixed mode interfacing, wherein the first user 901 is interfacing the digital world in a blended virtual interface mode, as discussed above, and the second user 922 is interfacing the same digital world (and the second user's physical, local environment 925) in an augmented reality mode. In the embodiment in FIG. 9B, the first user 901 and first object 902 are located at a first physical location 915, and the second user 922 is located at a different, second physical location 925 separated by some distance from the first location 915. In this embodiment, the virtual objects 931 and 932 may be transposed in realtime (or near real-time) to a location within the virtual world corresponding to the second location 925. Thus, the second user 922 may observe and interact, in the second user's physical, local environment 925, with the rendered physical objects 931 and 932 representing the first user 901 and first object 902, respectively.

Figure 10:
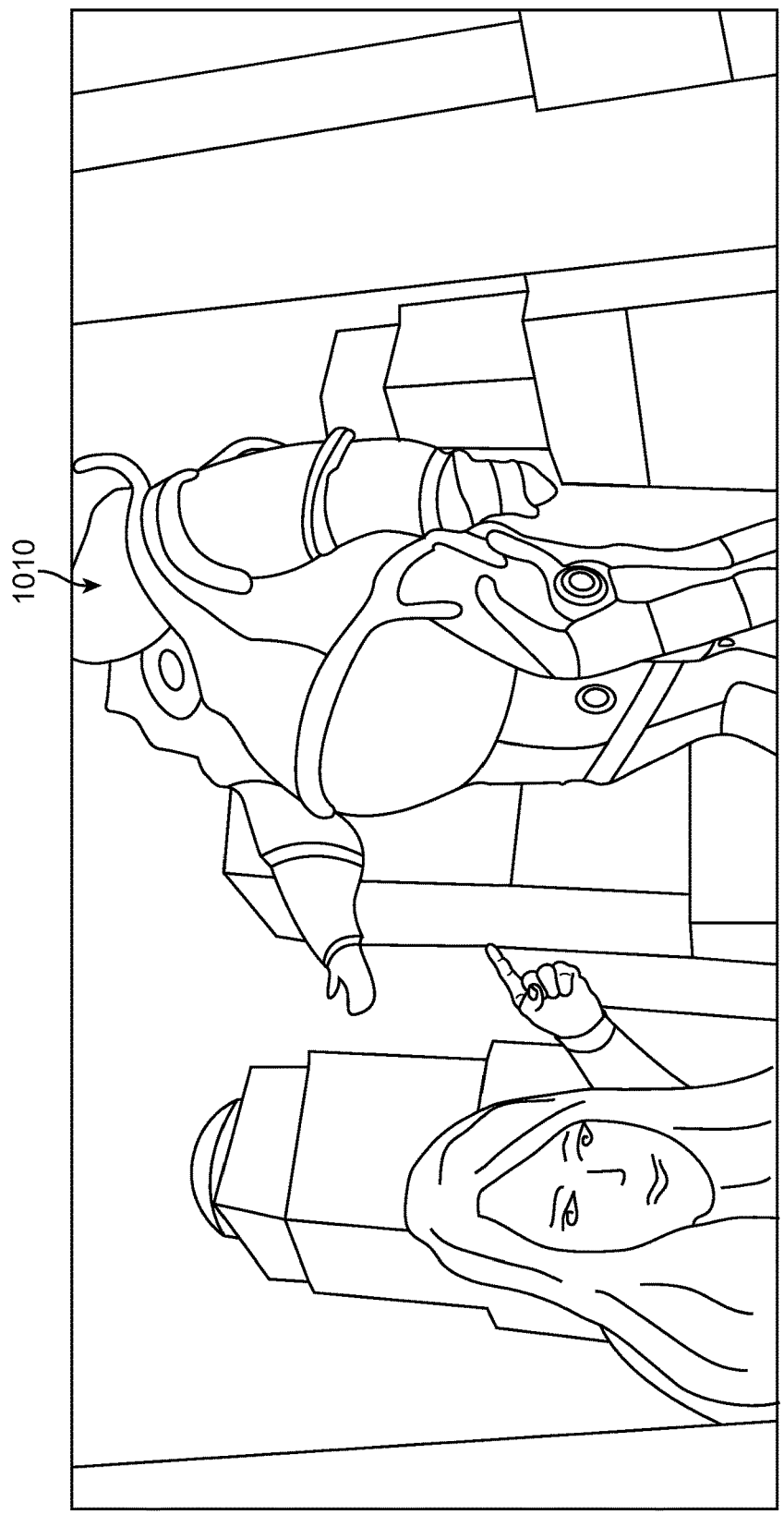
FIG. 10 illustrates an example illustration of a user's view when interfacing the system in an augmented reality mode.

FIG. 10 illustrates an example illustration of a user's view when interfacing the system 100 in an augmented reality mode. As shown in FIG. 10, the user sees the local, physical environment (i.e., a city having multiple buildings) as well as a virtual character 1010 (i.e., virtual object). The position of the virtual character 1010 may be triggered by a 2D visual target (for example, a billboard, postcard or magazine) and/or one or more 3D reference frames such as buildings, cars, people, animals, airplanes, portions of a building, and/or any 3D physical object, virtual object, and/or combinations thereof. In the example illustrated in FIG. 10, the known position of the buildings in the city may provide the registration fiducials and/or information and key features for rendering the virtual character 1010. Additionally, the user's geospatial location (e.g., provided by GPS, attitude/position sensors, etc.) or mobile location relative to the buildings, may comprise data used by the computing network 105 to trigger the transmission of data used to display the virtual character(s) 1010. In some embodiments, the data used to display the virtual character 1010 may comprise the rendered character 1010 and/or instructions (to be carried out by the gateway component 140 and/or user device 120) for rendering the virtual character 1010 or portions thereof. In some embodiments, if the geospatial location of the user is unavailable or unknown, a server 110, gateway component 140, and/or user device 120 may still display the virtual object 1010 using an estimation algorithm that estimates where particular virtual objects and/or physical objects may be located, using the user's last known position as a function of time and/or other parameters. This may also be used to determine the position of any virtual objects should the user's sensors become occluded and/or experience other malfunctions.

Figure 11:
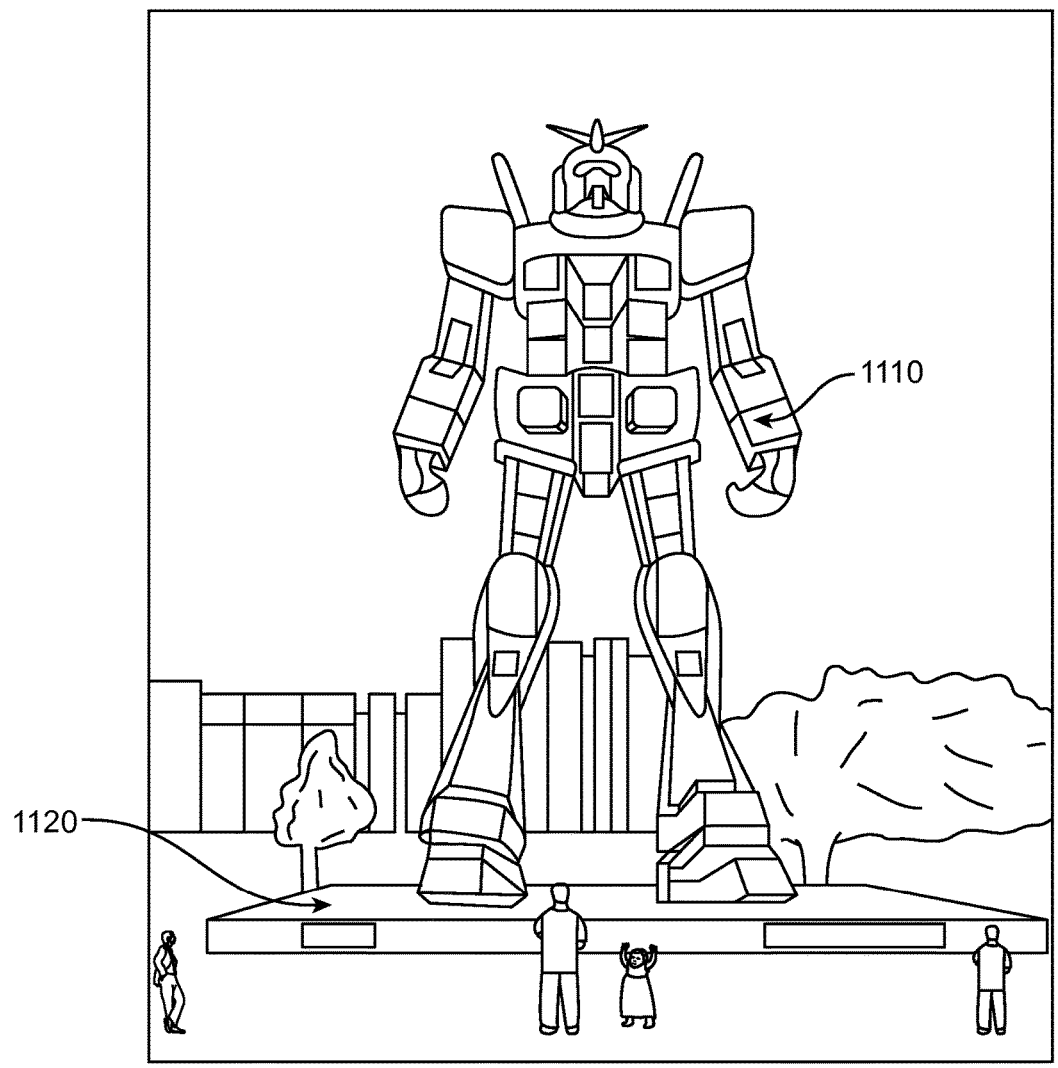
FIG. 11 illustrates an example illustration of a user's view showing a virtual object triggered by a physical object when the user is interfacing the system in an augmented reality mode.

In some embodiments, virtual characters or virtual objects may comprise a virtual statue, wherein the rendering of the virtual statue is triggered by a physical object. For example, referring now to FIG. 11, a virtual statue 1110 may be triggered by a real, physical platform 1120. The triggering of the statue 1110 may be in response to a visual object or feature (e.g., fiducials, design features, geometry, patterns, physical location, altitude, etc.) detected by the user device or other components of the system 100. When the user views the platform 1120 without the user device, the user sees the platform 1120 with no statue 1110. However, when the user views the platform 1120 through the user device, the user sees the statue 1110 on the platform 1120 as shown in FIG. 11. The statue 1110 is a virtual object and, therefore, may be stationary, animated, change over time or with respect to the user's viewing position, or even change depending upon which particular user is viewing the statue 1110. For example, if the user is a small child, the statue may be a dog; yet, if the viewer is an adult male, the statue may be a large robot as shown in FIG. 11. These are examples of user dependent and/or state dependent experiences. This will enable one or more users to perceive one or more virtual objects alone and/or in combination with physical objects and experience customized and personalized versions of the virtual objects. The statue 1110 (or portions thereof) may be rendered by various components of the system including, for example, software/firmware installed on the user device. Using data indicating the location and attitude of the user device, in combination with the registration features of the virtual object (i.e., statue 1110), the virtual object (i.e., statue 1110) forms a relationship with the physical object (i.e., platform 1120). For example, the relationship between one or more virtual objects with one or more physical objects may be a function of distance, positioning, time, geolocation, proximity to one or more other virtual objects, and/or any other functional relationship that includes virtual and/or physical data of any kind. In some embodiments, image recognition software in the user device may further enhance the digital-to-physical object relationship.

The interactive interface provided by the disclosed system and method may be implemented to facilitate various activities such as, for example, interacting with one or more virtual environments and objects, interacting with other users, as well as experiencing various forms of media content, including advertisements, music concerts, and movies. Accordingly, the disclosed system facilitates user interaction such that the user not only views or listens to the media content, but rather, actively participates in and experiences the media content. In some embodiments, the user participation may include altering existing content or creating new content to be rendered in one or more virtual worlds. In some embodiments, the media content, and/or users creating the content, may be themed around a mythopoeia of one or more virtual worlds.

In one example, musicians (or other users) may create musical content to be rendered to users interacting with a particular virtual world. The musical content may include, for example, various singles, EPs, albums, videos, short films, and concert performances. In one example, a large number of users may interface the system 100 to simultaneously experience a virtual concert performed by the musicians.

In some embodiments, the media produced may contain a unique identifier code associated with a particular entity (e.g., a band, artist, user, etc.). The code may be in the form of a set of alphanumeric characters, UPC codes, QR codes, 2D image triggers, 3D physical object feature triggers, or other digital mark, as well as a sound, image, and/or both. In some embodiments, the code may also be embedded with digital media which may be interfaced using the system 100. A user may obtain the code (e.g., via payment of a fee) and redeem the code to access the media content produced by the entity associated with the identifier code. The media content may be added or removed from the user's interface.

In one embodiment, to avoid the computation and bandwidth limitations of passing realtime or near realtime video data from one computing system to another with low latency, such as from a cloud computing system to a local processor coupled to a user, parametric information regarding various shapes and geometries may be transferred and utilized to define surfaces, while textures maybe transferred and added to these surfaces to bring about static or dynamic detail, such as bitmap-based video detail of a person's face mapped upon a parametrically reproduced face geometry. As another example, if a system is configured to recognize a person's face, and knows that the person's avatar is located in an augmented world, the system may be configured to pass the pertinent world information and the person's avatar information in one relatively large setup transfer, after which remaining transfers to a local computing system, such as that 308 depicted in FIG. 1, for local rendering may be limited to parameter and texture updates, such as to motion parameters of the person's skeletal structure and moving bitmaps of the person's face—all at orders of magnitude less bandwidth relative to the initial setup transfer or passing of realtime video. Cloud-based and local computing assets thus may be used in an integrated fashion, with the cloud handling computation that does not require relatively low latency, and the local processing assets handling tasks wherein low latency is at a premium, and in such case, the form of data transferred to the local systems preferably is passed at relatively low bandwidth due to the form an amount of such data (i.e., parametric info, textures, etc. versus realtime video of everything).

Figure 15:
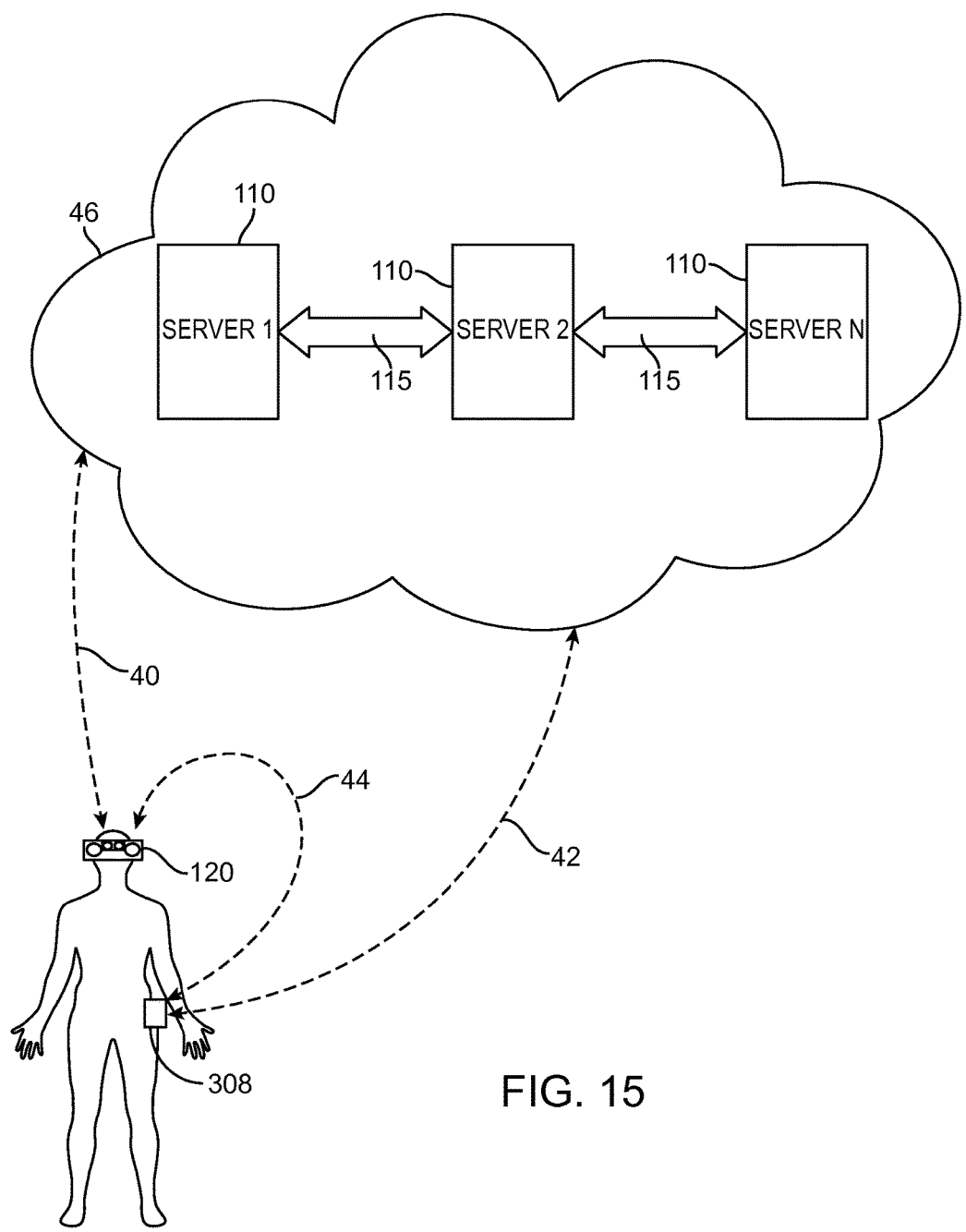
FIG. 15 illustrates one embodiment of local and cloud-based computing coordination.

Referring ahead to FIG. 15, a schematic illustrates coordination between cloud computing assets (46) and local processing assets (308, 120). In one embodiment, the cloud (46) assets are operatively coupled, such as via wired or wireless networking (wireless being preferred for mobility, wired being preferred for certain high-bandwidth or high-data-volume transfers that may be desired), directly to (40, 42) one or both of the local computing assets (120, 308), such as processor and memory configurations which may be housed in a structure configured to be coupled to a user's head (120) or belt (308). These computing assets local to the user may be operatively coupled to each other as well, via wired and/or wireless connectivity configurations (44). In one embodiment, to maintain a low-inertia and small-size head mounted subsystem (120), primary transfer between the user and the cloud (46) may be via the link between the belt-based subsystem (308) and the cloud, with the head mounted subsystem (120) primarily data-tethered to the belt-based subsystem (308) using wireless connectivity, such as ultra-wideband ("UWB") connectivity, as is currently employed, for example, in personal computing peripheral connectivity applications.

With efficient local and remote processing coordination, and an appropriate display device for a user, such as the user interface 302 or user "display device" featured in FIG. 3, the display device 14 described below in reference to FIG. 14, or variations thereof, aspects of one world pertinent to a user's current actual or virtual location may be transferred or "passed" to the user and updated in an efficient fashion. Indeed, in one embodiment, with one person utilizing a virtual reality system ("VRS") in an augmented reality mode and another person utilizing a VRS in a completely virtual mode to explore the same world local to the first person, the two users may experience one another in that world in various fashions. For example, referring to FIG. 12, a scenario similar to that described in reference to FIG. 11 is depicted, with the addition of a visualization of an avatar 2 of a second user who is flying through the depicted augmented reality world from a completely virtual reality scenario. In other words, the scene depicted in FIG. 12 may be experienced and displayed in augmented reality for the first person—with two augmented reality elements (the statue 1110 and the flying bumble bee avatar 2 of the second person) displayed in addition to actual physical elements around the local world in the scene, such as the ground, the buildings in the background, the statue platform 1120. Dynamic updating may be utilized to allow the first person to visualize progress of the second person's avatar 2 as the avatar 2 flies through the world local to the first person.

Figure 12:
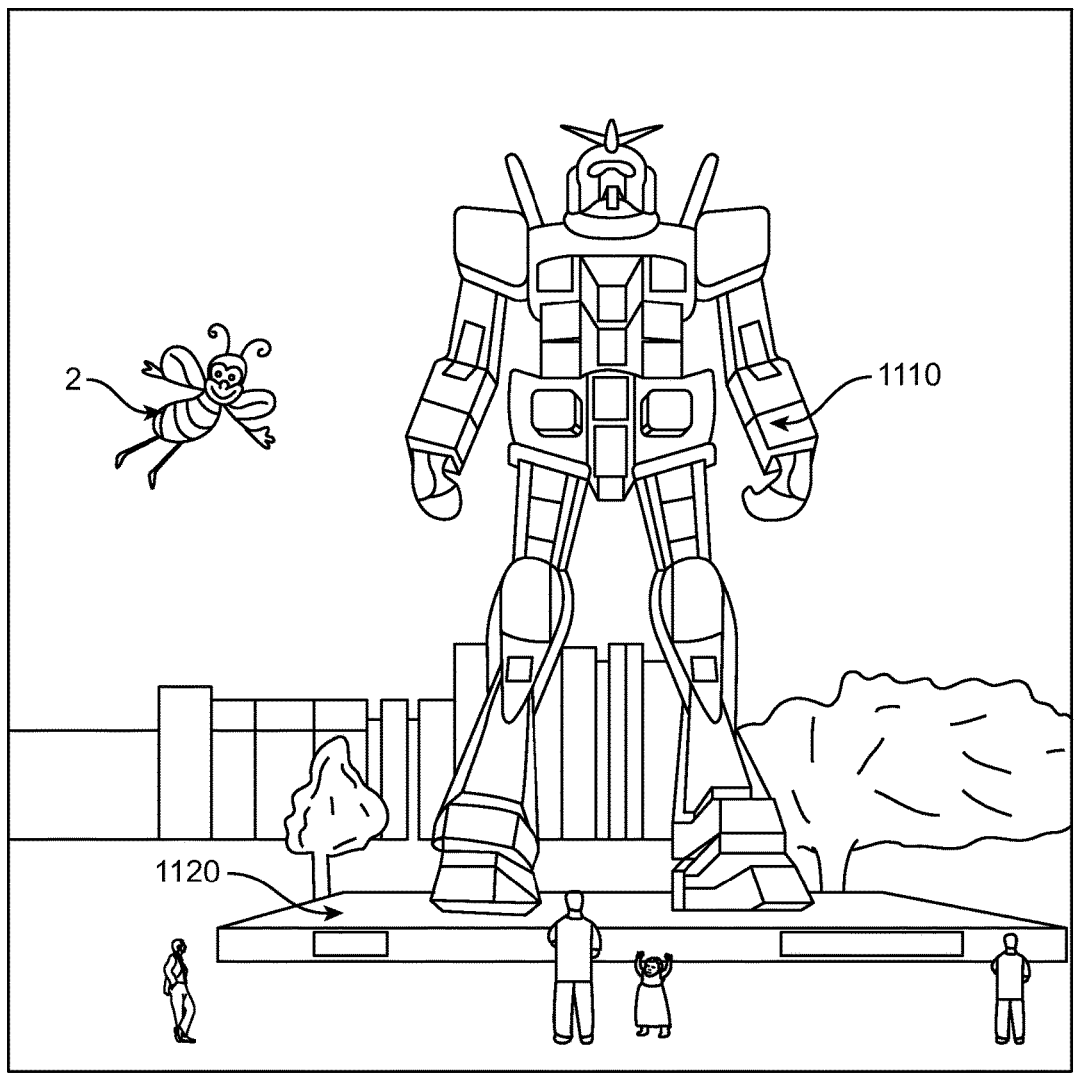
FIG. 12 illustrates one embodiment of an augmented and virtual reality integration configuration wherein one user in an augmented reality experience visualizes the presence of another user in a virtual realty experience.

Again, with a configuration as described above, wherein there is one world model that can reside on cloud computing resources and be distributed from there, such world can be "passable" to one or more users in a relatively low bandwidth form preferable to trying to pass around realtime video data or the like. The augmented experience of the person standing near the statue (i.e., as shown in FIG. 12) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is—but with that information on the cloud, the joining friend can download from the cloud aspects of the scenario, and then start walking along as an augmented reality local relative to the person who is actually in the park.

Figure 13:
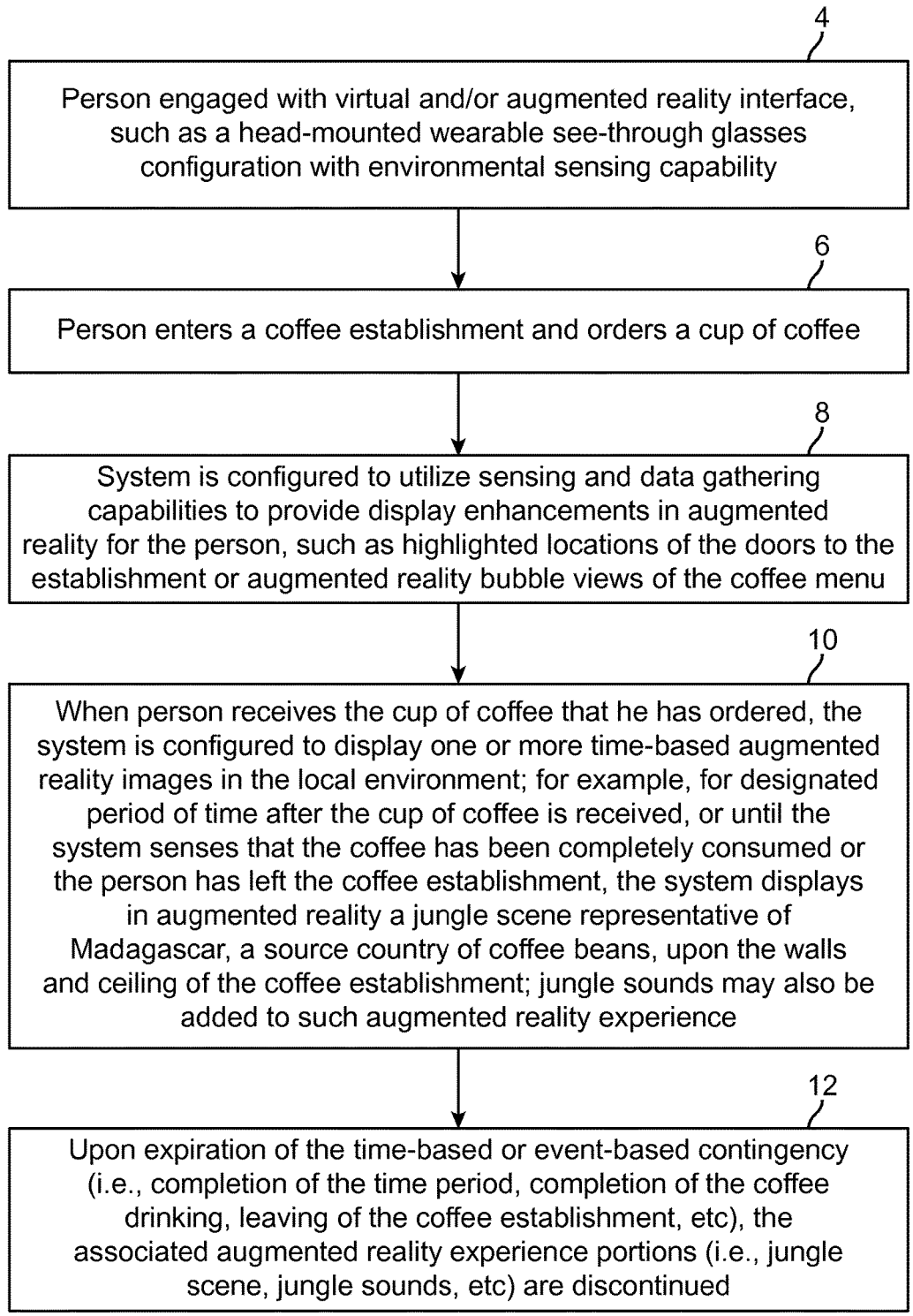
FIG. 13 illustrates one embodiment of a time and/or contingency event based augmented reality experience configuration.

Referring to FIG. 13, a time and/or other contingency parameter based embodiment is depicted, wherein a person is engaged with a virtual and/or augmented reality interface, such as the user interface 302 or user display device featured in FIG. 3, the display device 14 described below in reference to FIG. 14, or variations thereof, is utilizing the system (4) and enters a coffee establishment to order a cup of coffee (6). The VRS may be configured to utilize sensing and data gathering capabilities, locally and/or remotely, to provide display enhancements in augmented and/or virtual reality for the person, such as highlighted locations of doors in the coffee establishment or bubble windows of the pertinent coffee menu (8). When the person receives the cup of coffee that he has ordered, or upon detection by the system of some other pertinent parameter, the system may be configured to display (10) one or more time-based augmented or virtual reality images, video, and/or sound in the local environment with the display device, such as a Madagascar jungle scene from the walls and ceilings, with or without jungle sounds and other effects, either static or dynamic. Such presentation to the user may be discontinued based upon a timing parameter (i.e., 5 minutes after the full coffee cup has been recognized and handed to the user; 10 minutes after the system has recognized the user walking through the front door of the establishment, etc.) or other parameter, such as a recognition by the system that the user has finished the coffee by noting the upside down orientation of the coffee cup as the user ingests the last sip of coffee from the cup—or recognition by the system that the user has left the front door of the establishment (12).

Figure 14:
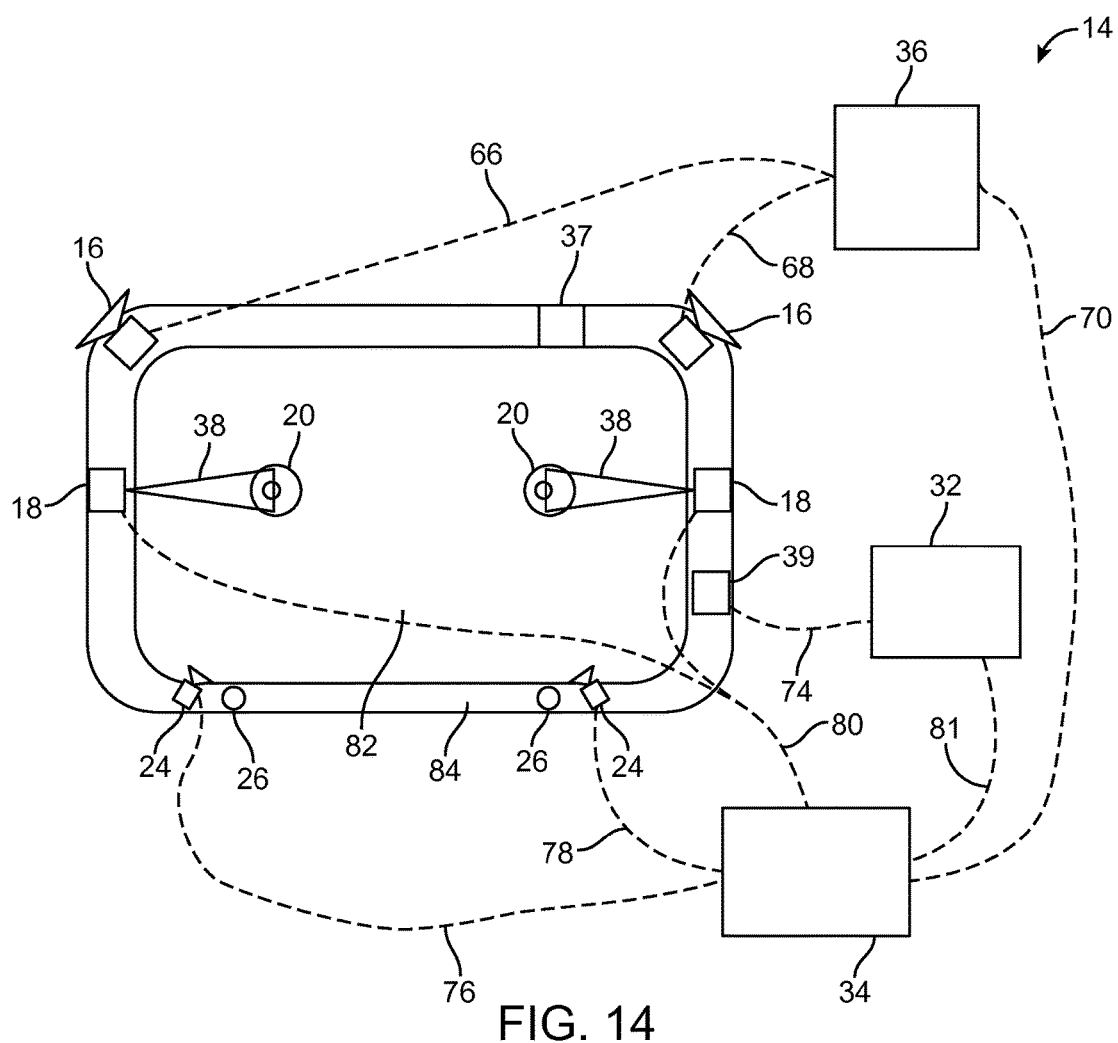
FIG. 14 illustrates one embodiment of a user display configuration suitable for virtual and/or augmented reality experiences.

Referring to FIG. 14, one embodiment of a suitable user display device (14) is shown, comprising a display lens (82) which may be mounted to a user's head or eyes by a housing or frame (84). The display lens (82) may comprise one or more transparent mirrors positioned by the housing (84) in front of the user's eyes (20) and configured to bounce projected light (38) into the eyes (20) and facilitate beam shaping, while also allowing for transmission of at least some light from the local environment in an augmented reality configuration (in a virtual reality configuration, it may be desirable for the display system 14 to be capable of blocking substantially all light from the local environment, such as by a darkened visor, blocking curtain, all black LCD panel mode, or the like). In the depicted embodiment, two wide-field-of-view machine vision cameras (16) are coupled to the housing (84) to image the environment around the user; in one embodiment these cameras (16) are dual capture visible light/infrared light cameras. The depicted embodiment also comprises a pair of scanned-laser shaped-wavefront (i.e., for depth) light projector modules with display mirrors and optics configured to project light (38) into the eyes (20) as shown. The depicted embodiment also comprises two miniature infrared cameras (24) paired with infrared light sources (26, such as light emitting diodes "LED" s), which are configured to be able to track the eyes (20) of the user to support rendering and user input. The system (14) further features a sensor assembly (39), which may comprise X, Y, and Z axis accelerometer capability as well as a magnetic compass and X, Y, and Z axis gyro capability, preferably providing data at a relatively high frequency, such as 200 Hz. The depicted system (14) also comprises a head pose processor (36), such as an ASIC (application specific integrated circuit), FPGA (field programmable gate array), and/or ARM processor (advanced reduced-instruction-set machine), which may be configured to calculate real or near-real time user head pose from wide field of view image information output from the capture devices (16). Also shown is another processor (32) configured to execute digital and/or analog processing to derive pose from the gyro, compass, and/or accelerometer data from the sensor assembly (39). The depicted embodiment also features a GPS (37, global positioning satellite) subsystem to assist with pose and positioning. Finally, the depicted embodiment comprises a rendering engine (34) which may feature hardware running a software program configured to provide rendering information local to the user to facilitate operation of the scanners and imaging into the eyes of the user, for the user's view of the world. The rendering engine (34) is operatively coupled (81, 70, 76/78, 80; i.e., via wired or wireless connectivity) to the sensor pose processor (32), the image pose processor (36), the eye tracking cameras (24), and the projecting subsystem (18) such that light of rendered augmented and/or virtual reality objects is projected using a scanned laser arrangement (18) in a manner similar to a retinal scanning display. The wavefront of the projected light beam (38) may be bent or focused to coincide with a desired focal distance of the augmented and/or virtual reality object. The mini infrared cameras (24) may be utilized to track the eyes to support rendering and user input (i.e., where the user is looking, what depth he is focusing; as discussed below, eye verge may be utilized to estimate depth of focus). The GPS (37), gyros, compass, and accelerometers (39) may be utilized to provide course and/or fast pose estimates. The camera (16) images and pose, in conjunction with data from an associated cloud computing resource, may be utilized to map the local world and share user views with a virtual or augmented reality community. While much of the hardware in the display system (14) featured in FIG. 14 is depicted directly coupled to the housing (84) which is adjacent the display (82) and eyes (20) of the user, the hardware components depicted may be mounted to or housed within other components, such as a belt-mounted component, as shown, for example, in FIG. 3. In one embodiment, all of the components of the system (14) featured in FIG. 14 are directly coupled to the display housing (84) except for the image pose processor (36), sensor pose processor (32), and rendering engine (34), and communication between the latter three and the remaining components of the system (14) may be by wireless communication, such as ultra wideband, or wired communication. The depicted housing (84) preferably is head-mounted and wearable by the user. It may also feature speakers, such as those which may be inserted into the ears of a user and utilized to provide sound to the user which may be pertinent to an augmented or virtual reality experience such as the jungle sounds referred to in reference to FIG. 13, and microphones, which may be utilized to capture sounds local to the user.

Regarding the projection of light (38) into the eyes (20) of the user, in one embodiment the mini cameras (24) may be utilized to measure where the centers of a user's eyes (20) are geometrically verged to, which, in general, coincides with a position of focus, or "depth of focus", of the eyes (20). A 3-dimensional surface of all points the eyes verge to is called the "horopter". The focal distance may take on a finite number of depths, or may be infinitely varying. Light projected from the vergence distance appears to be focused to the subject eye (20), while light in front of or behind the vergence distance is blurred. Further, it has been discovered that spatially coherent light with a beam diameter of less than about 0.7 millimeters is correctly resolved by the human eye regardless of where the eye focuses; given this understanding, to create an illusion of proper focal depth, the eye vergence may be tracked with the mini cameras (24), and the rendering engine (34) and projection subsystem (18) may be utilized to render all objects on or close to the horopter in focus, and all other objects at varying degrees of defocus (i.e., using intentionally-created blurring). A see-through light guide optical element configured to project coherent light into the eye may be provided by suppliers such as Lumus, Inc. Preferably the system (14) renders to the user at a frame rate of about 60 frames per second or greater. As described above, preferably the mini cameras (24) may be utilized for eye tracking, and software may be configured to pick up not only vergence geometry but also focus location cues to serve as user inputs. Preferably such system is configured with brightness and contrast suitable for day or night use. In one embodiment such system preferably has latency of less than about 20 milliseconds for visual object alignment, less than about 0.1 degree of angular alignment, and about 1 arc minute of resolution, which is approximately the limit of the human eye. The display system (14) may be integrated with a localization system, which may involve the GPS element, optical tracking, compass, accelerometer, and/or other data sources, to assist with position and pose determination; localization information may be utilized to facilitate accurate rendering in the user's view of the pertinent world (i.e., such information would facilitate the glasses to know where they are with respect to the real world).

Other suitable display device include but are not limited to desktop and mobile computers, smartphones, smartphones which may be enhanced additional with software and hardware features to facilitate or simulate 3-D perspective viewing (for example, in one embodiment a frame may be removably coupled to a smartphone, the frame featuring a 200 Hz gyro and accelerometer sensor subset, two small machine vision cameras with wide field of view lenses, and an ARM processor—to simulate some of the functionality of the configuration featured in FIG. 14), tablet computers, tablet computers which may be enhanced as described above for smartphones, tablet computers enhanced with additional processing and sensing hardware, head-mounted systems that use smartphones and/or tablets to display augmented and virtual viewpoints (visual accommodation via magnifying optics, mirrors, contact lenses, or light structuring elements), non-see-through displays of light emitting elements (LCDs, OLEDs, vertical-cavity-surface-emitting lasers, steered laser beams, etc.), see-through displays that simultaneously allow humans to see the natural world and artificially generated images (for example, light-guide optical elements, transparent and polarized OLEDs shining into close-focus contact lenses, steered laser beams, etc.), contact lenses with light-emitting elements (such as those available from Innovega, Inc, of Bellevue, Wash., under the tradename Loptik®; they may be combined with specialized complimentary eyeglasses components), implantable devices with light-emitting elements, and implantable devices that stimulate the optical receptors of the human brain.

With a system such as that depicted in FIGS. 3 and 14, 3-D points may be captured from the environment, and the pose (i.e., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered). So at the base level, in one embodiment you have a person-worn system that can be utilized to capture both 3-D points and the 2-D images that produced the points, and these points and images may be sent out to a cloud storage and processing resource. They may also be cached locally with embedded pose information (i.e., cache the tagged images); so the cloud may have on the ready (i.e., in available cache) tagged 2-D images (i.e., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static).

The cloud system may be configured to save some points as fiducials for pose only, to reduce overall pose tracking calculation. Generally it may be desirable to have some outline features to be able to track major items in a user's environment, such as walls, a table, etc., as the user moves around the room, and the user may want to be able to "share" the world and have some other user walk into that room and also see those points. Such useful and key points may be termed "fiducials" because they are fairly useful as anchoring points—they are related to features that may be recognized with machine vision, and that can be extracted from the world consistently and repeatedly on different pieces of user hardware. Thus these fiducials preferably may be saved to the cloud for further use.

In one embodiment it is preferable to have a relatively even distribution of fiducials throughout the pertinent world, because they are the kinds of items that cameras can easily use to recognize a location.

In one embodiment, the pertinent cloud computing configuration may be configured to groom the database of 3-D points and any associated meta data periodically to use the best data from various users for both fiducial refinement and world creation. In other words, the system may be configured to get the best dataset by using inputs from various users looking and functioning within the pertinent world. In one embodiment the database is intrinsically fractal—as users move closer to objects, the cloud passes higher resolution information to such users. As a user maps an object more closely, that data is sent to the cloud, and the cloud can add new 3-D points and image-based texture maps to the database if they are better than what has been previously stored in the database. All of this may be configured to happen from many users simultaneously.

As described above, an augmented or virtual reality experience may be based upon recognizing certain types of objects. For example, it may be important to understand that a particular object has a depth in order to recognize and understand such object. Recognizer software objects ("recognizers") may be deployed on cloud or local resources to specifically assist with recognition of various objects on either or both platforms as a user is navigating data in a world. For example, if a system has data for a world model comprising 3-D point clouds and pose-tagged images, and there is a desk with a bunch of points on it as well as an image of the desk, there may not be a determination that what is being observed is, indeed, a desk as humans would know it. In other words, some 3-D points in space and an image from someplace off in space that shows most of the desk may not be enough to instantly recognize that a desk is being observed. To assist with this identification, a specific object recognizer may be created that will go into the raw 3-D point cloud, segment out a set of points, and, for example, extract the plane of the top surface of the desk. Similarly, a recognizer may be created to segment out a wall from 3-D points, so that a user could change wallpaper or remove part of the wall in virtual or augmented reality and have a portal to another room that is not actually there in the real world. Such recognizers operate within the data of a world model and may be thought of as software "robots" that crawl a world model and imbue that world model with semantic information, or an ontology about what is believed to exist amongst the points in space. Such recognizers or software robots may be configured such that their entire existence is about going around the pertinent world of data and finding things that it believes are walls, or chairs, or other items. They may be configured to tag a set of points with the functional equivalent of, "this set of points belongs to a wall", and may comprise a combination of point-based algorithm and pose-tagged image analysis for mutually informing the system regarding what is in the points.

Object recognizers may be created for many purposes of varied utility, depending upon the perspective. For example, in one embodiment, a purveyor of coffee such as Starbucks may invest in creating an accurate recognizer of Starbucks coffee cups within pertinent worlds of data. Such a recognizer may be configured to crawl worlds of data large and small searching for Starbucks coffee cups, so they may be segmented out and identified to a user when operating in the pertinent nearby space (i.e., perhaps to offer the user a coffee in the Starbucks outlet right around the corner when the user looks at his Starbucks cup for a certain period of time). With the cup segmented out, it may be recognized quickly when the user moves it on his desk. Such recognizers may be configured to run or operate not only on cloud computing resources and data, but also on local resources and data, or both cloud and local, depending upon computational resources available. In one embodiment, there is a global copy of the world model on the cloud with millions of users contributing to that global model, but for smaller worlds or sub-worlds like an office of a particular individual in a particular town, most of the global world will not care what that office looks like, so the system may be configured to groom data and move to local cache information that is believed to be most locally pertinent to a given user.

In one embodiment, for example, when a user walks up to a desk, related information (such as the segmentation of a particular cup on his table) may be configured to reside only upon his local computing resources and not on the cloud, because objects that are identified as ones that move often, such as cups on tables, need not burden the cloud model and transmission burden between the cloud and local resources. Thus the cloud computing resource may be configured to segment 3-D points and images, thus factoring permanent (i.e., generally not moving) objects from movable ones, and this may affect where the associated data is to remain, where it is to be processed, remove processing burden from the wearable/local system for certain data that is pertinent to more permanent objects, allow one-time processing of a location which then may be shared with limitless other users, allow multiple sources of data to simultaneously build a database of fixed and movable objects in a particular physical location, and segment objects from the background to create object-specific fiducials and texture maps.

In one embodiment, the system may be configured to query a user for input about the identity of certain objects (for example, the system may present the user with a question such as, "is that a Starbucks coffee cup?"), so that the user may train the system and allow the system to associate semantic information with objects in the real world. An ontology may provide guidance regarding what objects segmented from the world can do, how they behave, etc. In one embodiment the system may feature a virtual or actual keypad, such as a wirelessly connected keypad, connectivity to a keypad of a smartphone, or the like, to facilitate certain user input to the system.

The system may be configured to share basic elements (walls, windows, desk geometry, etc.) with any user who walks into the room in virtual or augmented reality, and in one embodiment that person's system will be configured to take images from his particular perspective and upload those to the cloud. Then the cloud becomes populated with old and new sets of data and can run optimization routines and establish fiducials that exist on individual objects.

GPS and other localization information may be utilized as inputs to such processing. Further, other computing systems and data, such as one's online calendar or Facebook® account information, may be utilized as inputs (for example, in one embodiment, a cloud and/or local system may be configured to analyze the content of a user's calendar for airline tickets, dates, and destinations, so that over time, information may be moved from the cloud to the user's local systems to be ready for the user's arrival time in a given destination).

In one embodiment, tags such as QR codes and the like may be inserted into a world for use with non-statistical pose calculation, security/access control, communication of special information, spatial messaging, non-statistical object recognition, etc.

In one embodiment, cloud resources may be configured to pass digital models of real and virtual worlds between users, as described above in reference to "passable worlds", with the models being rendered by the individual users based upon parameters and textures. This reduces bandwidth relative to the passage of realtime video, allows rendering of virtual viewpoints of a scene, and allows millions or more users to participate in one virtual gathering without sending each of them data that they need to see (such as video), because their views are rendered by their local computing resources.

The virtual reality system ("VRS") may be configured to register the user location and field of view (together known as the "pose") through one or more of the following: realtime metric computer vision using the cameras, simultaneous localization and mapping techniques, maps, and data from sensors such as gyros, accelerometers, compass, barometer, GPS, radio signal strength triangulation, signal time of flight analysis, LIDAR ranging, RADAR ranging, odometry, and sonar ranging. The wearable device system may be configured to simultaneously map and orient. For example, in unknown environments, the VRS may be configured to collect information about the environment, ascertaining fiducial points suitable for user pose calculations, other points for world modeling, images for providing texture maps of the world. Fiducial points may be used to optically calculate pose. As the world is mapped with greater detail, more objects may be segmented out and given their own texture maps, but the world still preferably is representable at low spatial resolution in simple polygons with low resolution texture maps. Other sensors, such as those discussed above, may be utilized to support this modeling effort. The world may be intrinsically fractal in that moving or otherwise seeking a better view (through viewpoints, "supervision" modes, zooming, etc.) request high-resolution information from the cloud resources. Moving closer to objects captures higher resolution data, and this may be sent to the cloud, which may calculate and/or insert the new data at interstitial sites in the world model.

Figure 16:
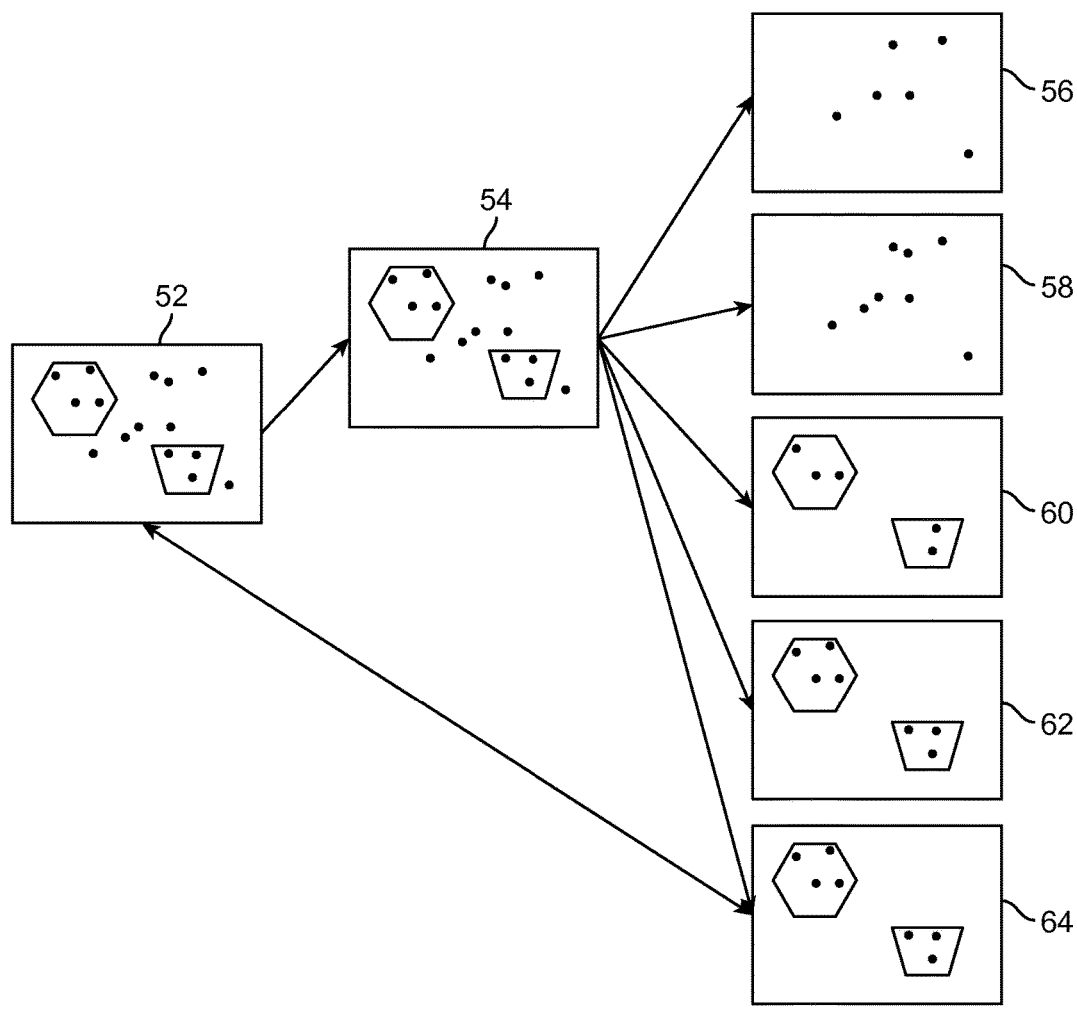
FIG. 16 illustrates various aspects of registration configurations.

Referring to FIG. 16, a wearable system may be configured to capture image information and extract fiducials and recognized points (52). The wearable local system may calculate pose using one of the pose calculation techniques mentioned below. The cloud (54) may be configured to use images and fiducials to segment 3-D objects from more static 3-D background; images provide textures maps for objects and the world (textures may be realtime videos). The cloud resources (56) may be configured to store and make available static fiducials and textures for world registration. The cloud resources may be configured to groom the point cloud for optimal point density for registration. The cloud resources (60) may store and make available object fiducials and textures for object registration and manipulation; the cloud may groom point clouds for optimal density for registration. The could resource may be configured (62) to use all valid points and textures to generate fractal solid models of objects; the cloud may groom point cloud information for optimal fiducial density. The cloud resource (64) may be configured to query users for training on identity of segmented objects and the world; an ontology database may use the answers to imbue objects and the world with actionable properties.

The following specific modes of registration and mapping feature the terms "O-pose", which represents pose determined from the optical or camera system; "s-pose", which represents pose determined from the sensors (i.e., such as a combination of GPS, gyro, compass, accelerometer, etc. data, as discussed above); and "MLC", which represents the cloud computing and data management resource.

The "Orient" mode makes a basic map of a new environment, the purpose of which is to establish the user's pose if the new environment is not mapped, or if the user is not connected to the MLC. In the Orient mode, the wearable system extracts points from an image, tracks the points from frame to frame, and triangulates fiducials using the S-pose (since there are no fiducials extracted from images). The wearable system may also filter out bad fiducials based on persistence of the user. It should be appreciated that the Orient mode is the most basic mode of registration and mapping and will always work even for a low-precision pose. However after the wearable system has been used in relative motion for at least a little time, a minimum fiducial set will have been established such that the wearable system is set for using the O-pose to recognize objects and to map the environment. As soon as the O-pose is reliable (with the minimum fiducial set) the wearable set is configured to jump out of the Orient mode. The "Map and O-pose" mode is used to map an environment. The purpose of the map and o-pose mode is to establish high-precisions poses, map the environment and provide the map and images to the MLC. In this mode, the O-pose is calculated from mature world fiducials downloaded from the MLC and/or determined locally. It should be appreciated, however, that the S-pose may be used as a check of the calculated o-pose, and may also be used to speed up computation of the O-pose. Similar to above, the wearable system extracts points from images, and tracks the points from frame to frame, triangulates fiducials using the O-pose, and filters out bad fiducials based on persistence. The remaining fiducials and pose-tagged images are then provided to the MLC cloud. It should be appreciated that the these functions (extraction of points, filtering out bad fiducials and providing the fiducials and pose-tagged images) need not be performed in real-time and may be performed at a later time to preserve bandwidth.

The O-pose is used to determine the user's pose (user location and field of view). The purpose of the O-pose is to establish a high-precision pose in an already mapped environment using minimum processing power. Calculating the o-pose involves several steps. To estimate a pose at n, the wearable system is configured to use historical data gathered from S-poses and O-poses (n−1, n−2, n−3, etc.). The pose at n is then used to project fiducials into the image captured at n to create an image mask from the projection. The wearable system extracts points from the masked regions and calculates the O-pose from the extracted points and mature world fiducials. It should be appreciated that processing burden is greatly reduced by only searching/extracting points from the masked subsets of a particular image. Going one step further, the calculated o-pose at n, and the s-pose at n may be used to estimate a pose at n+1. The pose-tagged images and/or video may be transmitted to the MLC cloud.

The "Super-res" mode may be used to create super resolution imagery and fiducials. Composite pose-tagged images may be used to create super-resolution images, which may in turn be used to enhance fiducial position estimation. It should be appreciated that iterate O-pose estimates from super-resolution fiducials and imagery. The above steps may be performed real-time on the wearable device or may be transmitted to the MLC cloud and performed at a later time.

In one embodiment, the VRS system may be configured to have certain base functionality, as well as functionality facilitated by "apps" or applications that may be distributed through the VRS to provide certain specialized functionalities. For example, the following apps may be installed to the subject VRS to provide specialized functionality:

A "painterly-renderings" app may be used by artists to create image transformations that represent the world as they seen it. Users may then enable these transformations on their user devices so that they can view the world "through the artists' eyes". A "table top modeling" app may enable users to build objects from physical objects put on a table. A "virtual presence" app may be used to pass virtual models of space to another user, who may then move around that space using a virtual avatar.

An "avatar emotion" app may be used to measure aspects such as subtle voice inflection, minor head movement, body temperature, heart rate, etc. to animate subtle effects on virtual-presence avatars. Digitizing human state information and passing that to remote avatar uses less bandwidth then video. Additionally, such data is map-able to non-human avatars capable of emotion. For example, a dog avatar can show excitement by wagging its tail based on excited vocal inflections.

An efficient mesh type network may be desirable for moving data, as opposed to sending everything back to a server. Many mesh networks, however, have suboptimal performance because positional information and topology is not well characterized. In one embodiment, the system may be utilized to determine the location of all users with relatively high precision, and thus a mesh network configuration may be utilized for high performance.

In one embodiment the system may be utilized for searching. With augmented reality, for example, users will generate and leave content related to many aspects of the physical world. Much of this content is not text, and thus is not easily searched by typical methods. The system may be configured to provide a facility for keeping track of personal and social network content for searching and reference purposes.

In one embodiment, if the display device tracks 2-D points through successive frames, then fits a vector-valued function to the time evolution of those points, it is possible to sample the vector valued function at any point in time (e.g. between frames) or at some point in the near future (by projecting the vector-valued function forward in time. This allows creation of high-resolution post-processing, and prediction of future pose before the next image is actual captured (e.g., doubling the registration speed is possible without doubling the camera frame rate).

For body-fixed rendering (as opposed to head-fixed or world-fixed renderings) an accurate view of body is desired. Rather than measuring the body, in one embodiment is possible to derive its location through the average position of a user's head. If the user's face points forward most of the time, a multi-day average of head position will reveal that direction. In conjunction with the gravity vector, this provides a reasonably stable coordinate frame for body-fixed rendering. Using current measures of head position with respect to this long-duration coordinate frame allows consistent rendering of objects on/around a user's body—with no extra instrumentation. For implementation of this embodiment, single register averages of head direction-vector may be started, and a running sum of data divided by delta-t will give current average head position. Keeping five or so registers, started on day n−5, day n−4, day n−3, day n−2, day n−1 allows use of rolling averages of only the past "n" days.

In one embodiment, a scene may be scaled down and presented to a user in a smaller-than-actual space. For example, in a situation wherein there is a scene that must be rendered in a huge space (i.e., such as a soccer stadium), there may be no equivalent huge space present, or such a large space may be inconvenient to a user. In one embodiment the system may be configured to reduce the scale of the scene, so that the user may watch it in miniature. For example, one could have a gods-eye-view video game, or a world championship soccer game, play out in an unscaled field—or scaled down and presented on a living room floor. The system may be configured to simply shift the rendering perspective, scale, and associated accommodation distance.

The system may also be configured to draw a user's attention to specific items within a presented scene by manipulating focus of virtual or augmented reality objects, by highlighting them, changing the contrast, brightness, scale, etc.

Preferably the system may be configured to accomplish the following modes:

In open-space-rendering mode, the system is configured to grab key points from a structured environment, and fill in the space between with renderings. This mode may be used to create potential venues, like stages, output space, large indoor spaces, etc.

In object-wrapping mode, the system is configured to recognize a 3D object in the real world, and then augment it. "Recognition" in this context may mean identifying the 3D object with high enough precision to anchor imagery to the 3D object. It should be appreciated that recognition, in this context, may either mean classifying the type of an object (e.g., a face of a person), and/or classifying a particular instance of an object (e.g., Joe, a person). Using these principles in mind, the recognizer software can be used to recognize various things, like walls, ceilings, floors, faces, roads, the sky, skyscrapers, ranch houses, tables, chairs, cars, road signs, billboards, doors, windows, bookshelves, etc. Some recognizer software programs may be Type I, and have generic functionality (e.g., "put my video on that wall", "that is a dog", etc.), while other recognizer software programs may be Type II, and have specific functionality (my TV is on_my_ living room wall 3.2 feet from the ceiling", "that is Fido", etc.)

In body-centered rendering, any rendered virtual objects are fixed to the user's body. For example, some objects may float around the user's body (e.g., a user's belt). Accomplishing this requires knowing the position of the body, and not just the head. However, the position of the body may be estimated by the position of the head. For example, heads usually point forward parallel to the ground. Also, the position of the body may become more accurate with time by using data acquired by a long-term average of users' head positions.

For Type II recognized objects (specific functionality), cut-aways of the objects are typically shown. Furthermore, Type II recognized objects may be linked to an online database of various 3D models. When starting the recognition process, it is ideal to start with objects that have commonly available 3D models, like cars or public utilities.

The system may also be used for virtual presence, i.e., enabling a user to paint a remote person's avatar into a particular open space. This may be considered a subset of "open space rendering," discussed above. The user may create a rough geometry of a local environment and iteratively send both geometry and texture maps to others. The user must grant permission for others to enter their environment, however. Subtle voice cues, hand tracking, and head motion may be sent to the remote avatar. Based on the above information, the avatar may be animated. It should be appreciated that creating virtual presence minimizes bandwidth and may be used sparingly.

The system may also be configured for making an object "a portal" to another room. In other words, instead of showing an avatar in a local room, a recognized object (e.g. a wall) may be used as a portal to another's user's environments. Thus, multiple users may be sitting in their own rooms, looking "through" walls into the environments of other users.

The system may also be configured for creating a dense digital model of an area when a group of cameras (people) view a scene from different perspectives. This model may be renderable from any vantage point as long as the area is viewed through at least one camera. For example, a wedding scene, may be rendered through vantage points of multiple users. It should be appreciated that recognizers may differentiate and map stationary objects differently from moving objects (e.g. walls have stable texture maps, while people have higher frequency moving texture maps).

With rich digital model updated in real time, scenes may be rendered from any perspective. Going back to the wedding example, an attendee in the back may fly in the air to the front row for a better view. Or an off-site attendee can find a "seat" either with an avatar, or invisible, if permitted by an organizer. Attendees can show their moving avatar, or may have it hidden. It should be appreciated that this aspect likely requires extremely high bandwidth. High-frequency data may be streamed through the crowd on a high-speed local wireless connection, while low frequency data may come from the MLC cloud. In the above example, because all attendees of the wedding have high precision position information, making an optimal routing path for local networking may be trivial.

For communication to the system, or between users, simple silent messaging is often desirable. For example, a finger chording keyboard may be used. In an optional embodiment, tactile glove solutions may offer enhanced performance.

To give a full virtual reality experience to users, the vision system is darkened and the user is shown a view that is not over-layed with the real world. Even in this mode, a registration system may still be necessary to track a user's head position. There may be several modes that may be used to experience full virtual reality. For example, in the "couch" mode, the users may be able to fly. In the "walking" mode, objects of the real world may be re-rendered as virtual objects so that the user does not collide with the real world.

As a general rule, rendering body parts is essential for the user's suspension of disbelief in navigating through the virtual world. This requires having a method for tracking and rendering body parts in the user's field of vision (FOV). For example, an opaque visor may be a form of virtual reality with many image-enhancement possibilities. In another example, a wide field of vision may give the user a rear view. In yet another example, the system may include various forms of "super vision," like telescope vision, see-through vision, infrared vision, God's vision, etc.

In one embodiment a system for virtual and/or augmented user experience is configured such that remote avatars associated with users may be animated based at least in part upon data on a wearable device with input from sources such as voice inflection analysis and facial recognition analysis, as conducted by pertinent software modules. For example, referring back to FIG. 12, the bee avatar (2) may be animated to have a friendly smile based upon facial recognition of a smile upon the user's face, or based upon a friendly tone of voice or speaking, as determined by software configured to analyze voice inputs to microphones which may capture voice samples locally from the user. Further, the avatar character may be animated in a manner in which the avatar is likely to express a certain emotion. For example, in an embodiment wherein the avatar is a dog, a happy smile or tone detected by system local to the human user may be expressed in the avatar as a wagging tail of the dog avatar.

Figure 17:
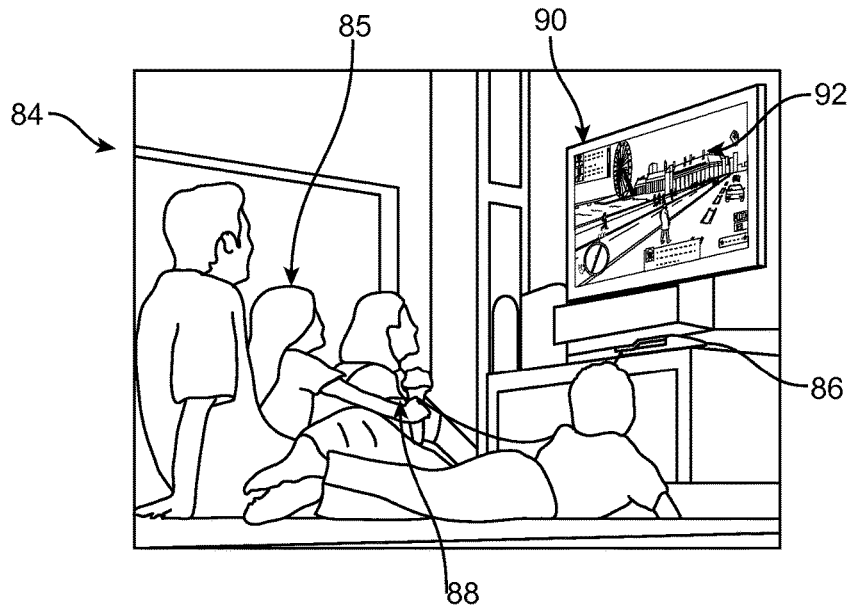
FIG. 17 illustrates an example of a family interacting with a digital world of the virtual and/or augmented reality system according to one gaming embodiment.
Figure 18:
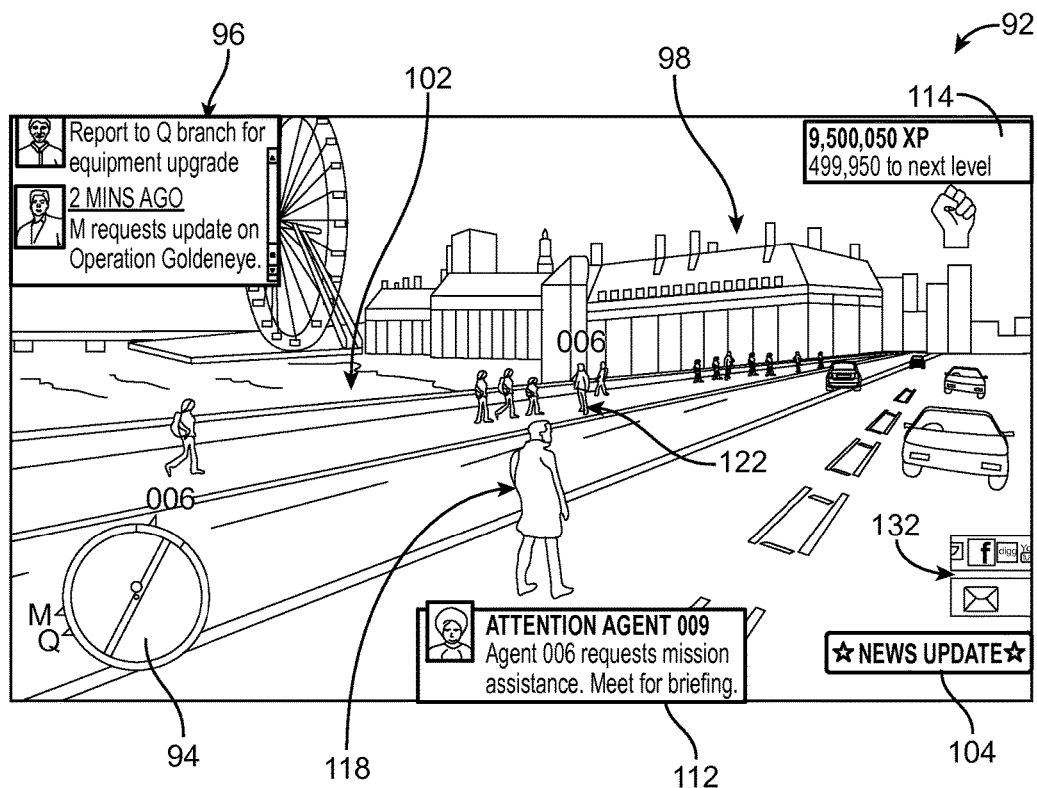
FIG. 18 illustrates an example illustration of a user's view of an environment of the digital world as seen by the users of FIG. 17.

Referring to FIGS. 17-22, various aspects of complex gaming embodiments are illustrated in the context of a spy type game which may be thematically oriented with some of the spy themes presented in relation to the character promoted under the tradename "James Bond 007"®. Referring to FIG. 17, an illustration of a family (84) is depicted, with one member of the family (85) piloting a character in the game by operating an input device (88), such as a gaming joystick or controller, which is operatively coupled to a gaming computer or console (86), such as those based upon personal computers or dedicated gaming systems such as those marketed under the tradename "PlayStation"®. The gaming console (86) is operatively coupled to a display (92) that is configured to show a user interface view (92) to the pilot/operator (85) and others who may be nearby. FIG. 18 illustrates one example of such a user interface view (92), wherein the subject game is being conducted on or near a bridge within the city of London, England. The user interface view (92) for this particular player (85) is purely virtual reality, in that all elements of the displayed user interface are not actually there in the players (85) living room—they are virtual elements displayed using the monitor or display (element 90 in FIG. 17). Referring again to FIG. 18, the depicted virtual reality view (92) features a view of the city of London featuring a bridge (102) and various buildings (98) and other architectural features, with a depiction of the gaming character (118—also referred to as "agent 009" in this illustrative example) operated by the subject player (85) from a perspective view as shown in the user interface view (92) of FIG. 18. Also displayed from the player (85) are a communications display (96), a compass indicator (94), a character status indicator (114), a news tool user interface (104), a social networking tool user interface (132), and a messaging user interface (112). Further shown is the representative of another character in the game (122—also referred to as "agent 006" in this illustrative example). As shown in the user interface view (92), the system may be configured to present information deemed relevant to the scene presented, such as a message through the messaging interface (112) that agent 006 is approaching, along with visually-presented highlighting around the agent 006 character. The system may be configured such that the operator (85) may change the perspective of the view he or she is utilizing at any time; for example, rather than the helicopter-like perspective view shown in FIG. 18 (92) with the player's own character (118) shown ahead and below, the player may decide to select a view from the perspective of the eyes of such character, or one of many other possible views which may be calculated and presented.

Figure 19:
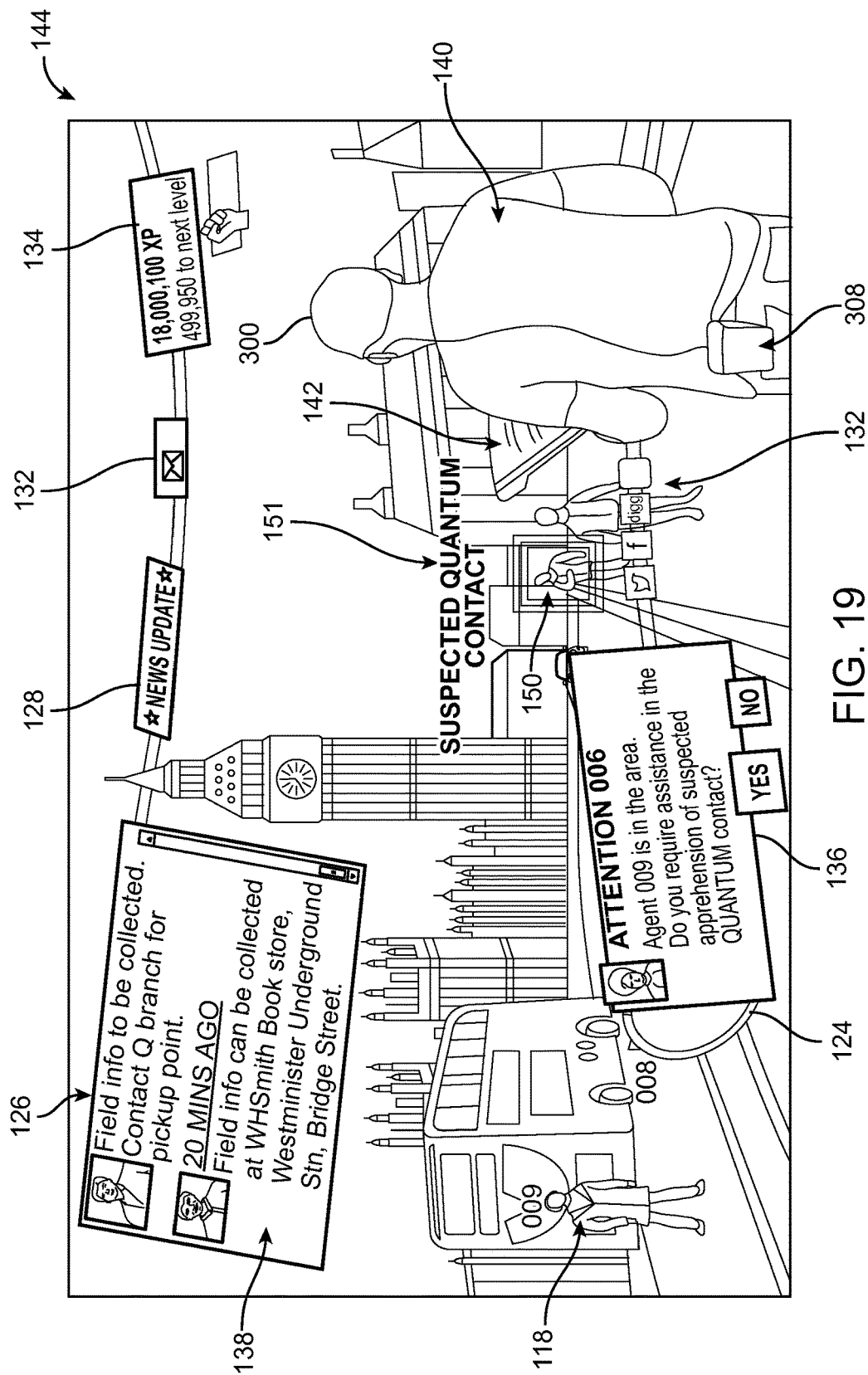
FIG. 19 illustrates a user present in the physical environment viewed by the users of FIG. 17 interacting with the same digital world through a wearable user device.
Figure 20:
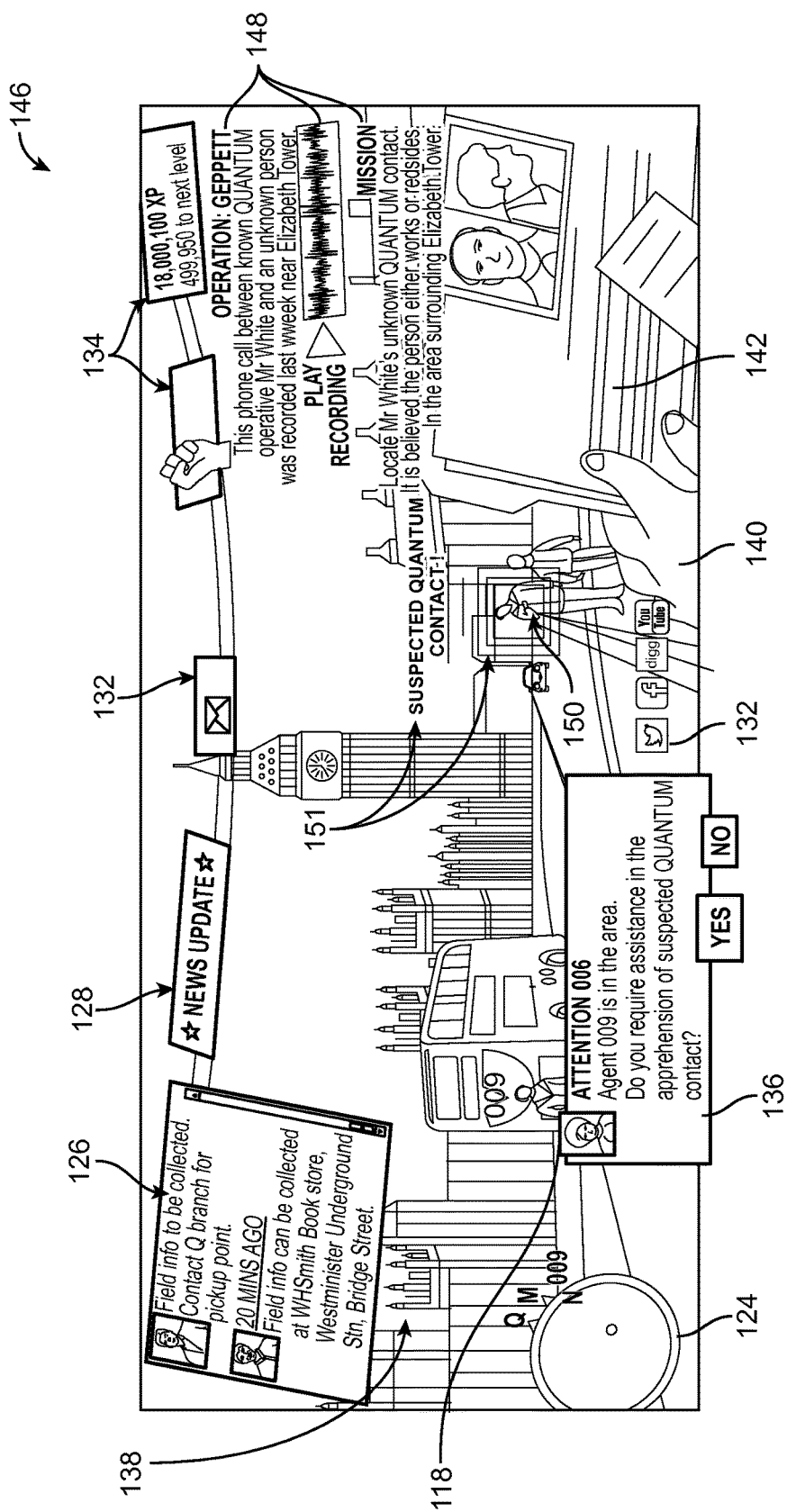
FIG. 20 illustrates an example illustration of a user's view of the user of FIG. 19.

Referring to FIG. 19, another illustrative view (144) shows an actual human player operating as character "agent 006" (140) wearing a head mounted display system (300) and associated local processing system (308) while he participates in the same game that is being played by the operator at home in her living room (player 85 in FIG. 17, for example), and while he actually walks through the real city of London for his blended or augmented reality experience. In the depicted embodiment, while the player (140) walks along the bridge wearing his augmented reality head mounted display (300), his local processing system (308) is feeding his display with various virtual reality elements as depicted, which are overlaid upon his view of actual reality (i.e., such as the actual skyline and structures of London 138). He is carrying one or more actual documents (142) in his hands, which, in one embodiment, were previously electronically communicated to him for printout and use in the gaming scenario. FIG. 20 shows an illustration of the view (146) from the player's (140) eye perspective, looking out over his actual documents (142) to see the actual London skyline (138), while also being presented with a variety of virtual elements for an augmented reality view through his head mounted display (300). The virtual elements may include, for example, a communications display (126), a news display (128), one or more electronic communications or social networking tool displays (132), one or more player status indicators (134), a messaging interface (136), a compass orientation indicator (124), and one or more displays of content (148), such as textual, audio, or video content, which may be retrieved and presented in accordance with other displayed or captured information, such as the text or photographs featured in the actual documents (142) carried by the player (140). Nearby other character "agent 009", who only exists in virtual reality, is presented into the augmented reality view (146) of the player (140) operating as character "agent 006", and may be labeled as such in the user interface for easy identification, as shown in FIG. 20.

Figure 21:
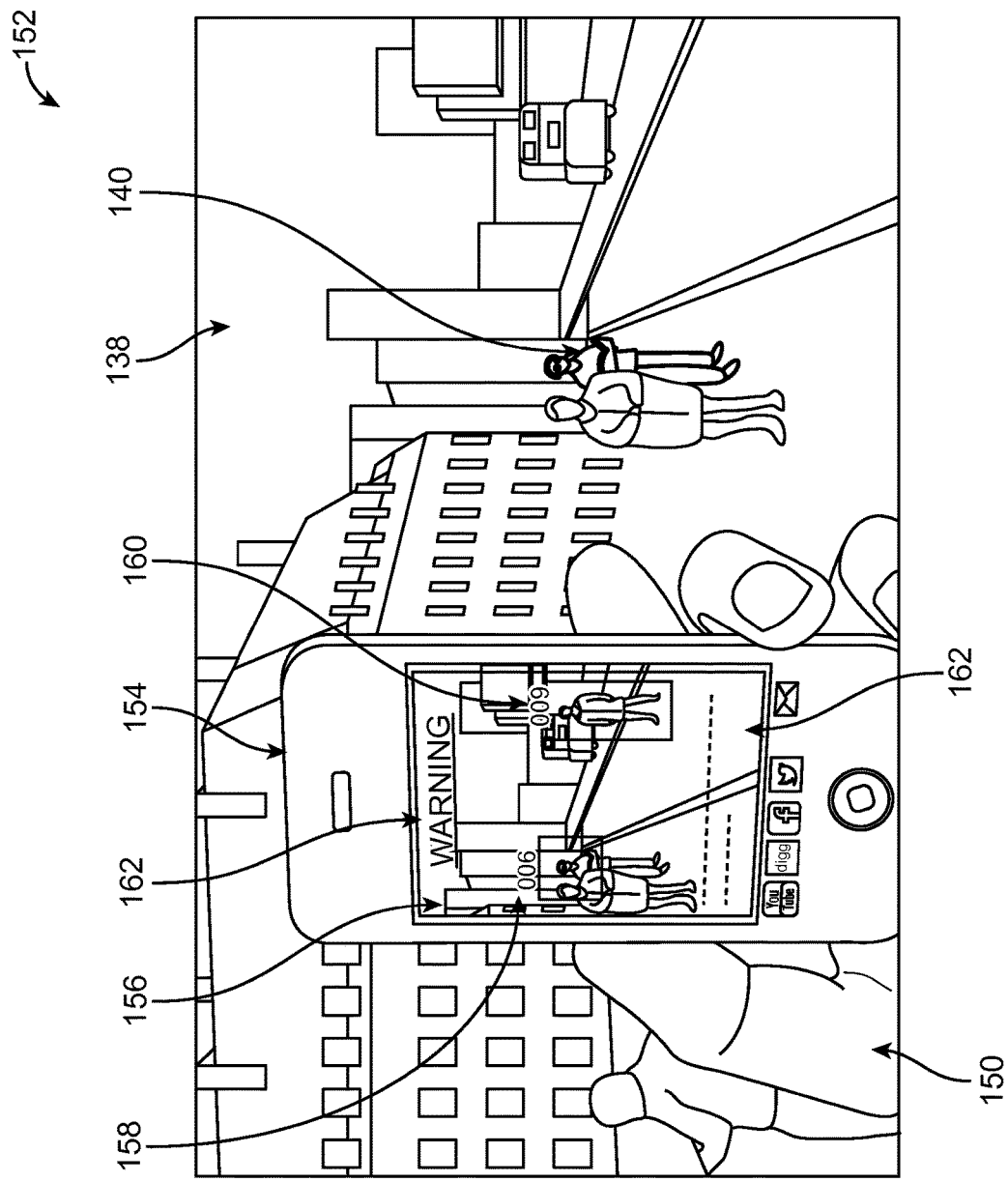
FIG. 21 illustrates an example illustration of another user's view, the other user also present in the physical environment viewed by the users of FIG. 17, interacting with the same digital world of the users of FIG. 17 and FIG. 19 through a mobile device.

Referring to FIG. 21, a player's eye view (152) of another player (150) who also happens to be actually present in London (138) and walking across the same bridge toward the "agent 006" player (140), but without an augmented reality head mounted display (element 300 of FIG. 19, for example), is presented. This player (150) may not have a head mounted augmented reality display, but he is carrying a mobile communication device (154) such as a tablet or smartphone, which in this embodiment, may be wirelessly connected with the larger system and utilized as a "window" into the augmented reality world of the subject game and configured to present in the limited user interface (156) of the device augmented reality information regarding one or two other nearby players who may be actually there (158) or virtual (160), along with other augmented reality display information (162) such as warnings or character information.

Figure 22:
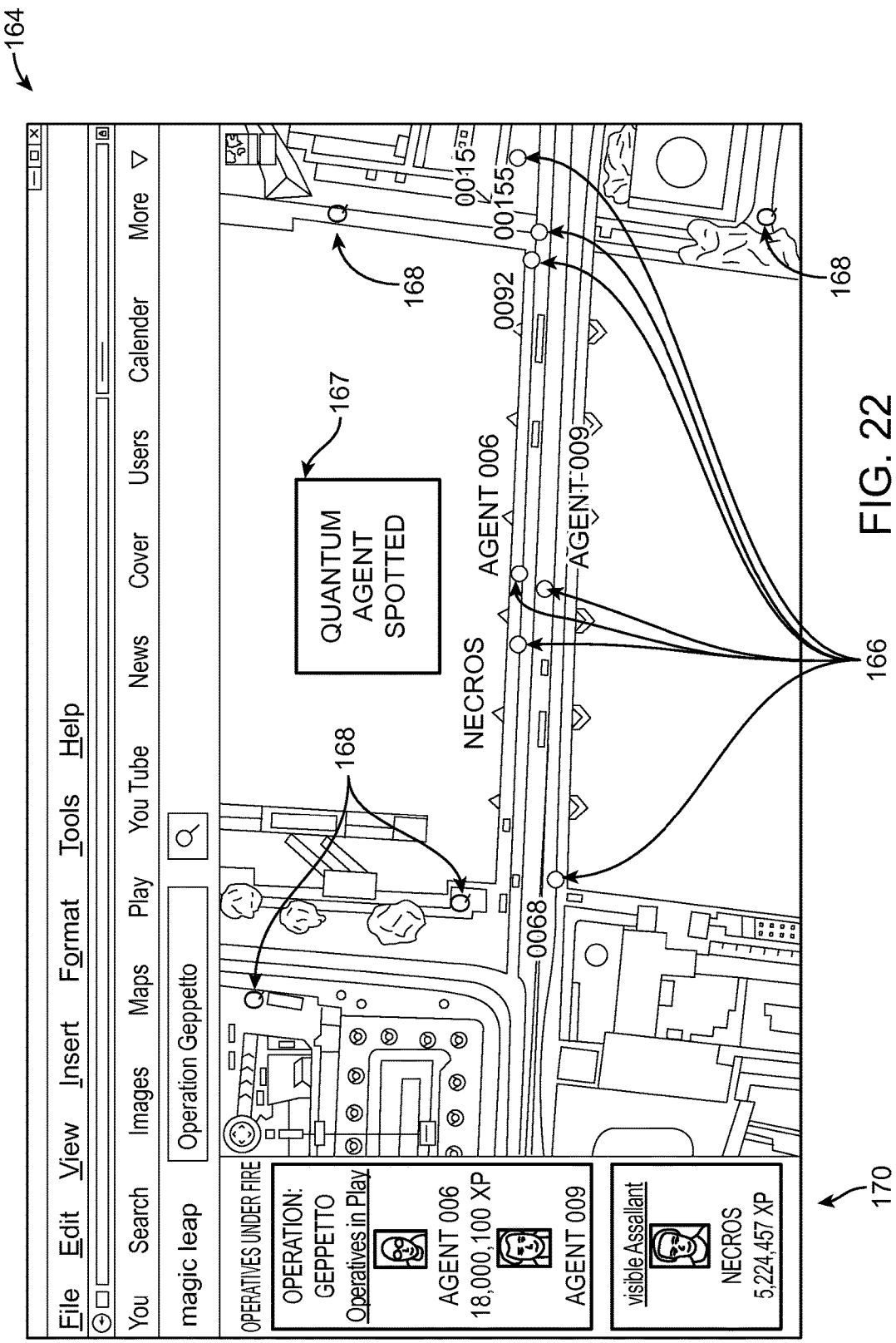
FIG. 22 illustrates an example illustration of a user's bird-eye view of the environment of FIGS. 17-21.

Referring to FIG. 22, a "bird's eye" or manned or unmanned aerial vehicle (or "UAV") view is presented (164). In one embodiment, the view (164) may be based upon a virtual UAV operated by another player, or one of the aforementioned players. The depicted view (164) may be presented in full virtual mode to a player, for example, who may be sitting on a couch at home with a large computer display (90) or a head mounted display (300); alternatively, such view may be presented as an augmented reality view to a player who happens to be in an airplane or other flying vehicle (i.e., "augmented" or blended because to a person in such a position, at least portions of the view would be actual reality). The illustrated view (164) contains an interface area for an information dashboard (170) featuring pertinent information, such as information regarding an identified counterparty spotted in the view. The depicted view (164) also features virtual highlighting information such as sites of interest of information (168), locations and/or statuses of other players or characters (166), and/or other information presentations (167).

Figure 23:
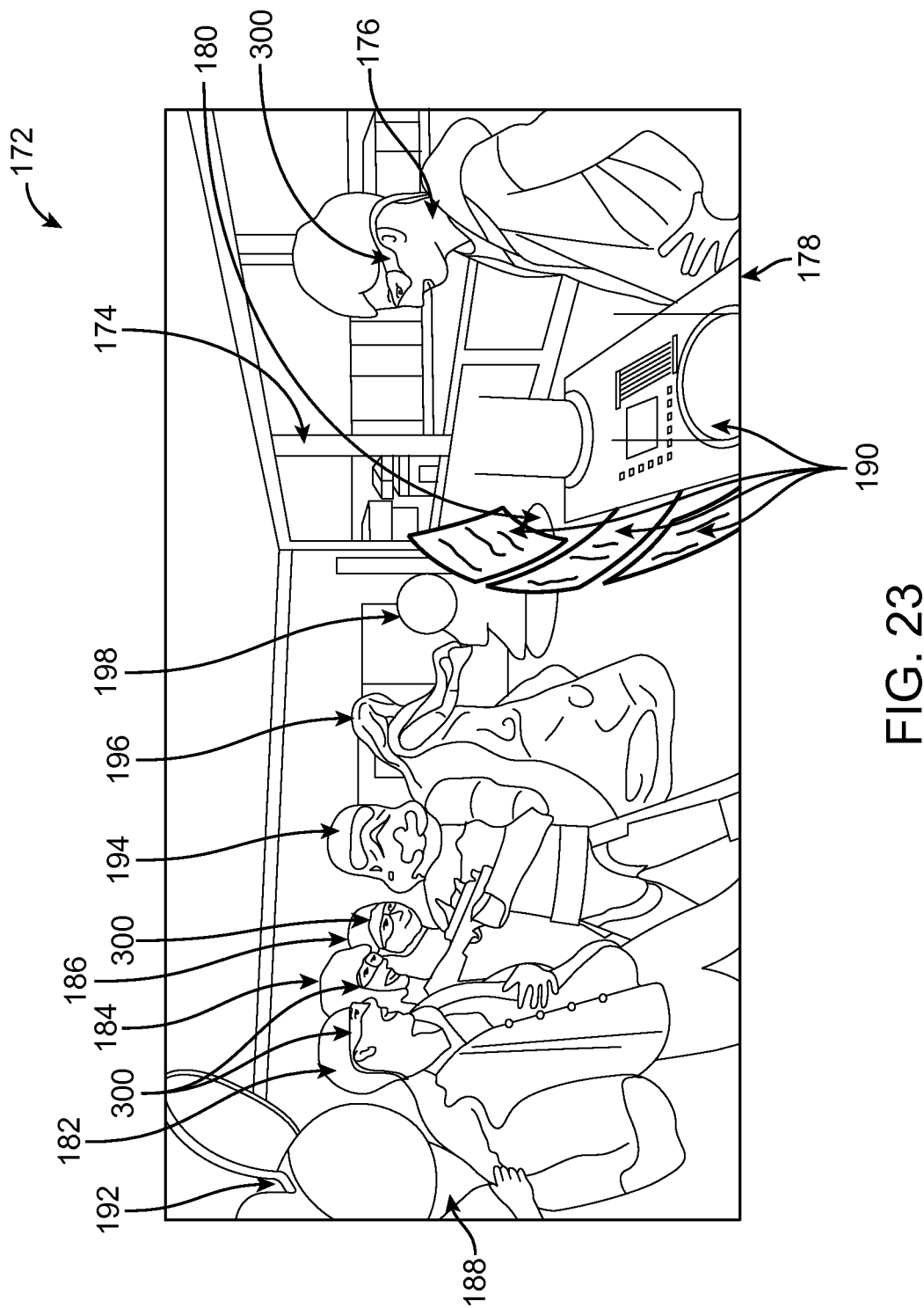
FIG. 23 illustrates an example scenario of multiple users interacting with the virtual and/or augmented reality system.

Referring to FIG. 23, for illustrative purposes, another augmented reality scenario is presented with a view (172) featuring certain actual reality elements, such as: the architecture of the room (174), a coffee table (180), a DJ table (178), and five actual people (176, 188, 182, 184, 186), each of whom is wearing head mounted augmented reality interface hardware (300) so that they may experience their own augmented reality views of things around them, such as a virtual reality cartoon character (198), a virtual reality Spanish dancer character (196), a stormtrooper character (194), and a globe-rabbit-eared head covering (192) for one of the actual people (188). Without the augmented reality interface hardware, the room would look to the five actual people like a room with furniture, a DJ table, and nothing out of the ordinary; with the augmented reality interface hardware, the system is configured such that the engaged players or participants may experience the person who decided to show up virtually as a stormtrooper, the person who decided to show up virtually as a Spanish dancer, the person who decided to show up virtually as the cartoon character, and the person who decided to show up actually wearing normal clothing, but has decided that she wants her head to be visualized with the globe-rabbit-eared head covering (192). The system may also be configured to show certain virtual features associated with the actual DJ table (178), such as virtual music documentation pages (190) which may be only visible to the DJ (176) through his augmented reality interface hardware (300), or DJ table lighting features which may be visible to anyone around using their augmented reality interface hardware (300).

Figure 24B:
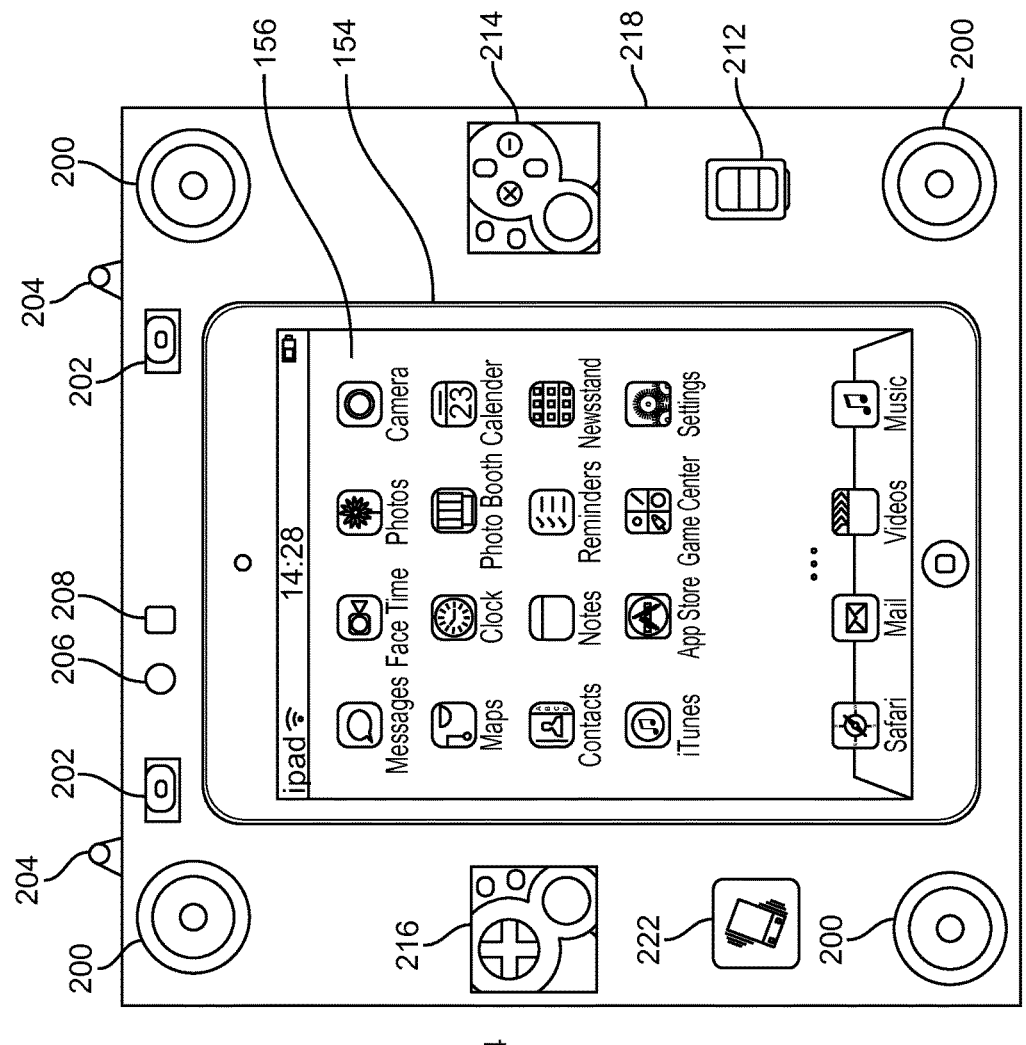
FIG. 24B illustrates an example embodiment of the mobile communication device of FIG. 24A removable and operatively coupled into an enhancement console.
Figure 24A:
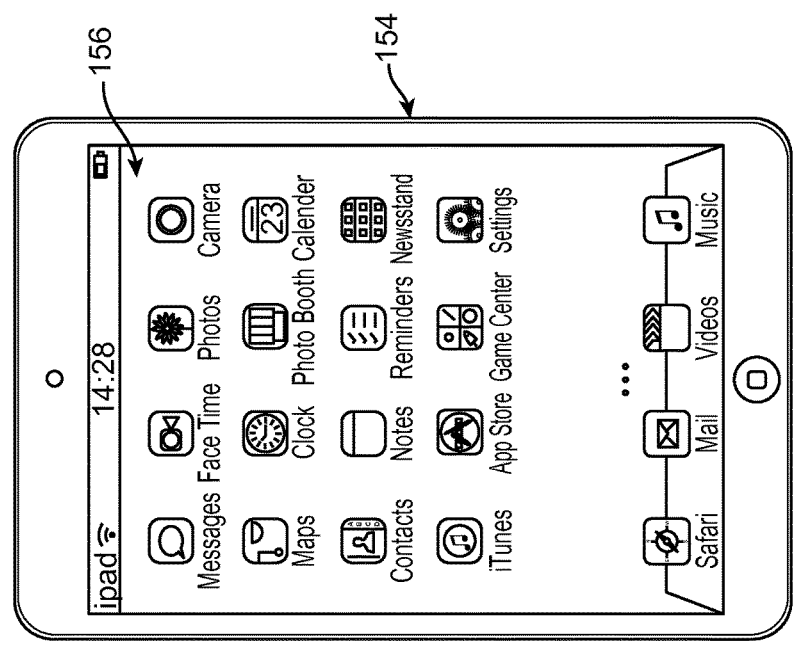
FIG. 24A illustrates an example embodiment of a mobile communications device for interacting with the system illustrated in FIG. 1.

Referring to FIGS. 24A and 24B, an adaptation of a mobile communications device such as a tablet computer or smartphone may be utilized to experience augmented reality as a modified "window" into the augmented reality world of the subject game or experience being created using the subject system. Referring to FIG. 24A, a typical smartphone or tablet computing system mobile device (154) features a relatively simple visual user interface (156) and typically has a simple camera or two. Referring to FIG. 24B, the mobile computing device has been removably and operatively coupled into an enhancement console (218) configured to increase the augmented reality participation capabilities of the mobile computing device. For example, the depicted embodiment features two player-oriented cameras (202) which may be utilized for eye tracking; four speakers (200) which may be utilized for simple high-quality audio and/or directional sound shaping; two forward-oriented cameras (204) for machine vision, registration, and/or localization; an added battery or power supply capability (212); one or more input interfaces (214, 216) which may be positioned for easy utilization by a player grasping the coupled system; a haptic feedback device (222) to provide feedback to the user who is grasping the coupled system (in one embodiment, the haptic feedback device may be configured to provide two axes of feedback, in + or − directions for each axis, to provide directional feedback; such configuration may be utilized, for example, to assist the operator in keeping the system aimed at a particular target of interest, etc.); one or more GPS or localizing sensors (206); and/or one or more accelerometers, inertial measurement units, and/or gyros (208).

Figure 25:
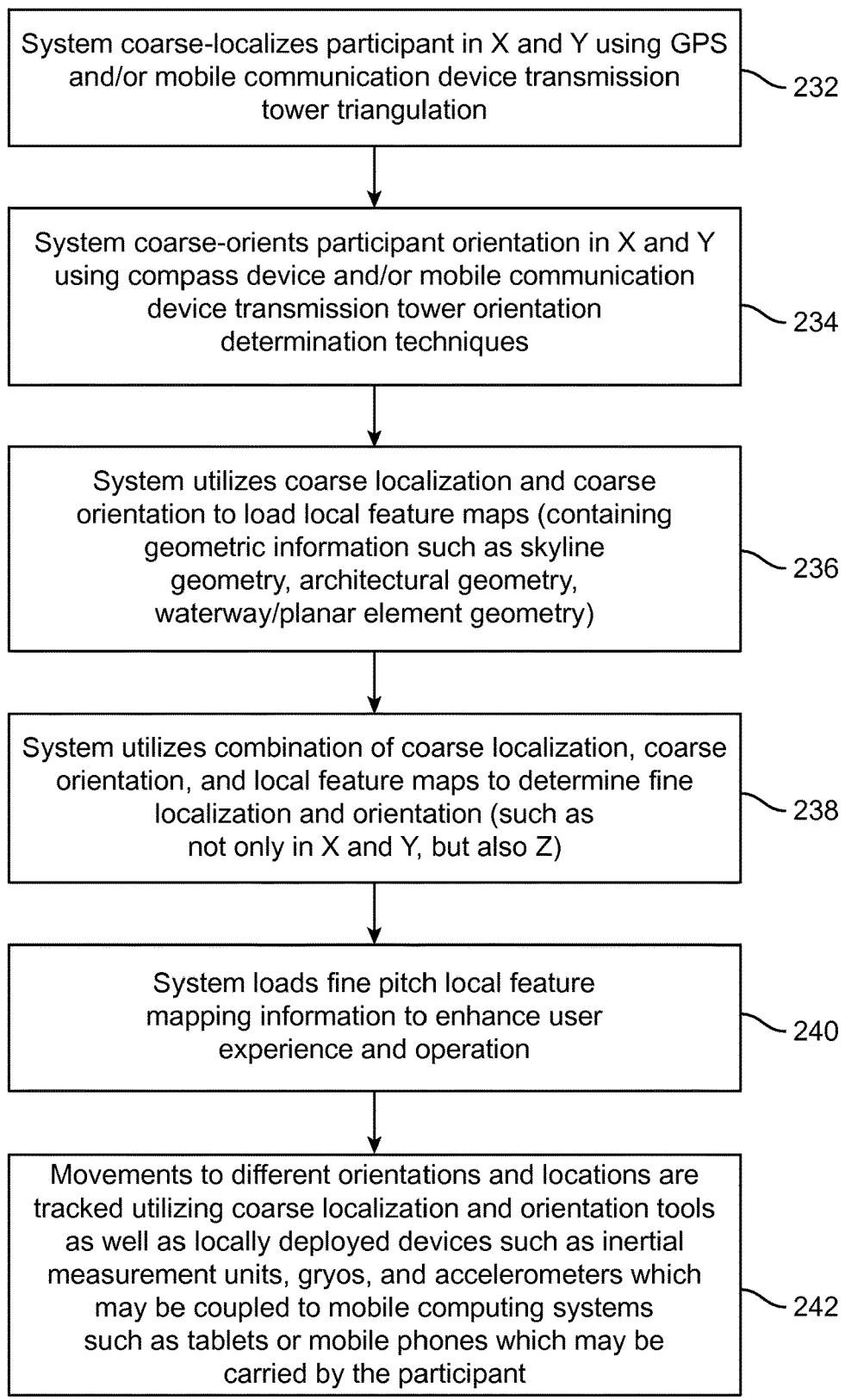
FIG. 25 illustrates one embodiment of coarse localization.

Referring to FIG. 25, in one embodiment, a system such as that depicted in FIG. 24B may be utilized to coarse-localize a participant in X and Y (akin to latitude and longitude earth coordinates) Cartesian directions using a GPS sensor and/or wireless triangulation (232). Coarse orientation may be achieved using a compass and/or wireless orientation techniques (234). With coarse localization and orientation determined, the distributed system may be configured to load (i.e., via wireless communication) local feature mapping information to the local device (i.e., such as the intercoupled mobile communication system 154 and enhancement console 218). Such information may comprise, for example, geometric information, such as skyline geometry, architectural geometry, waterway/planar element geometry, landscape geometry, and the like (236). The local and distributed systems may utilize the combination of coarse localization, coarse orientation, and local feature map information to determine fine localization and orientation characteristics (such as X, Y, and Z {akin to altitude} coordinates and 3-D orientation) (238), which may be utilized to cause the distributed system to load fine pitch local feature mapping information to the local system (i.e., such as the intercoupled mobile communication system 154 and enhancement console 218) to enhance the user experience and operation. Movements to different orientations and locations may be tracked utilizing coarse localization and orientation tools as well as locally deployed devices such as inertial measurement units, gryos, and accelerometers which may be coupled to mobile computing systems such as tablets or mobile phones which may be carried by the participant (242).

The head mounted display componentry in various of the aforementioned embodiments may comprise monocular or binocular display technology, transparent video configurations. Further, such componentry may comprise wearable or head-mounted light field display systems in monocular or binocular form, including laser projection systems wherein an image is projected upon the user's retina and focal depth information is provided per voxel and/or per frame. The number of depth planes preferably ranges from two to an infinite or very large number; in one embodiment between 4 and 36 depth planes may be presented for 3-D effect.

Actual objects, such as the DJ table (178) featured in FIG. 23, may be extended with virtual reality surfaces, shapes, and or functionality. For example, in one embodiment, a real button on such device may be configured to open a virtual panel which is configured to interact with the actual device and/or other devices, people, or objects.

Room such as the party room (174) depicted in FIG. 23 may be extrapolated to be any room or space. The system may have anywhere from some known data (such as existing two or three dimensional data regarding the room other associated structures or things)—or may have nearly zero data, and machine vision configurations utilizing cameras such as those (204) mounted upon the controller console (218) of FIG. 24B can be utilized to capture additional data; further, the system may be configured such that groups of people may crowd source useable two or three dimensional map information.

In a configuration wherein existing map information is available, such as three-dimensional map data of the city of London, a user wearing a head mounted display or "sensory ware" configuration (300) may be roughly located using GPS, compass, and/or other means (such as additional fixed tracking cameras, devices coupled to other players, etc.). Fine registration may be accomplished from the user's sensors then using the known geometry of the physical location as fiducials for such registration. For example, in a London-specific building when viewed at distance X, when the system has located the user within Y feet from GPS information and direction C from the compass and map M, the system may be configured to implement registration algorithms (somewhat akin to techniques utilized in robotic or computer-assisted surgery) to "lock in" the three-dimensional location of the user within some error E.

Fixed cameras may also be utilized along with head mounted or sensory ware systems. For example, in party room such as that depicted in FIG. 23, fixed cameras mounted to certain aspects of the room (174) may be configured to provide live, ongoing views of the room and moving people, giving remote participants a "live" digital remote presence view of the whole room, such that their social interactions with both virtual and physical people in the room is much richer. In such an embodiment a few rooms may be mapped to each other: the physical room and virtual room geometries may be mapped to each other; additional extensions or visuals may be created which map it equally to, less than, or larger than the physical room, with objects moving about through both the physical and virtual "meta" rooms, and then visually customized, or "skinned", versions of the room may be made available to each user or participant (i.e., while they may be in the exact same physical or virtual room, the system may allow for custom views by users; for example, the virtual stormtrooper (194) of FIG. 23 can be at the party, but have the environment mapped with a "Death Star" motif or skin, while the DJ (176) may have the room skinned as it is shown in FIG. 23 with the party environment; thus the notion of "shared cinematic reality", wherein each user has a consensus view of some aspects of the room, but also can modify certain variables (color, shape, etc.) to their personal liking, all simultaneously.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method, comprising:
   tracking a movement of a first user's eye using a first head mounted display device;
   estimating a depth of focus of the first user's eye based on the tracked eye movement;
   modifying a light beam associated with a display object based on the estimated depth of focus such that the display object appears in focus;
   projecting the light beam toward a display lens of the first head mounted display device;
   directing the light beam into the first user's eye using the display lens;

selectively allowing a transmission of light from a local environment of the first user based on at least a selection of an augmented reality mode of the first head mounted display device;

capturing a field-of-view image by the first head mounted display device at the local environment of the first user;

generating a rendered physical object using the field-of-view image, the rendered physical object corresponding to a physical object present in the local environment of the first user, and the rendered physical object representing the physical object as it appears in the local environment; and transmitting at least a portion of virtual world data associated with the display object and the rendered physical object to a second head mounted display device associated with a second user at a second location, the second head mounted display device projects the display object and the rendered physical object at the second location based at least in part on the virtual world data, wherein the first user and the second user interface with a shared virtual reality, the first head mounted display device of the first user operates in an augmented reality mode and the second head mounted display device of a second user operates in a virtual reality mode, and the second head mounted display device displaying the rendered physical object as the physical object appears in the local environment of the first user.

2. The method of claim 1, wherein the field-of-view image corresponds to a field-of-view for each of the user's eyes.

3. The method of claim 2, further comprising:
estimating a head pose of the user based on the field-of-view image of the user's eyes.

4. The method of claim 2, further comprising:
converting a second physical object in the captured field-of-view image to a physically rendered virtual object; and
displaying the physically rendered virtual object to the user.

5. The method of claim 2, further comprising:
extracting a set of points in the captured field-of-view image; and
creating a fiducial for a second physical object in the captured field-of-view image based on the extracted set of points.

6. The method of claim 5, further comprising:
transmitting at least one of the extracted set of points and the fiducial to a cloud computer; and
tagging at least one of the extracted set of points and the fiducial to a type of object.

7. The method of claim 6, further comprising:
recognizing a different physical object as belonging to the type of object based on at least one of the tagged set of points associated with the type of object and the fiducial associated with the type of object.

8. The method of claim 1, wherein the projected light is a light beam having a diameter less than 0.7 mm.

9. The method of claim 1, further comprising:
sensing, by at least one sensor, at least one of a movement of the user, a location of the user, a direction of the user, and an orientation of the user; and
calculating a pose of the user based on the at least one sensed movement, sensed location, sensed direction, and sensed orientation.

10. The method of claim 9, wherein the at least one sensor is at least one of an accelerometer, a compass and a gyroscope.

11. The method of claim 1, further comprising:
processing the virtual world data associated with the display object using a computer network; and
transmitting at least a portion of the virtual world data associated with the display object to a second user located at a second location such that the second user may experience the portion of the virtual world data associated with the display object at the second location.

12. The method of claim 11, further comprising:
sensing a second physical object; and
modifying, based on a predetermined relationship with the sensed second physical object, at least a portion of the virtual world data associated with the display object.

13. The method of claim 12, presenting the modified virtual world data to the second user.

14. The method of claim 1, further comprising:
modifying another light associated with another object that is not the display object such that the other object appears blurred.

15. The method of claim 1, further comprising;
receiving user input through a user interface; and
modifying the display object based on the received user input.

16. The method of claim 15, wherein the user interface is at least one of a haptic interface device, a keyboard, a mouse, a joystick, a motion capture controller, an optical tracking device and an audio input device.

17. The method of claim 1, wherein the display object is at least one of a virtual object, a rendered physical object, an image and a video.

18. The method of claim 1, wherein the selectively allowing the transmission of light from the local environment of the user further comprises blocking, with a cover, a lens of a head-mounted display device to selectively allow the transmission of light from the local environment.

19. The method of claim 1, wherein the selectively allowing a transmission of light from the local environment of the user is based on a visualization mode of the display object, and
wherein the visualization mode is one of an augmented reality mode, a virtual reality mode, or a combination of augmented and virtual reality modes.

20. A computer program product embodied in a non-transitory computer readable medium, the computer readable medium having stored thereon a sequence of instructions which, when executed by a processor causes the processor to execute a method, the method comprising:
tracking a movement of a first user's eye using a first head mounted display device;
estimating a depth of focus of the first user's eye based on the tracked eye movement;
modifying a light beam associated with a display object based on the estimated depth of focus such that the display object appears in focus;
projecting the light beam toward a display lens of the first head mounted display device;
directing the light beam into the first user's eye using the display lens;
selectively allowing a transmission of light from a local environment of the first user based on at least a selection of an augmented reality mode of the first head mounted display device;
capturing a field-of-view image by the first head mounted display device at the local environment of the first user;

generating a rendered physical object using the field-of-view image, the rendered physical object corresponding to a physical object present in the local environment of the first user, and the rendered physical object representing the physical object as it appears in the local environment; and transmitting at least a portion of virtual world data associated with the display object and the rendered physical object to a second head mounted display device associated with a second user at a second location, the second head mounted display device projects the display object and the rendered physical object at the second location based at least in part on the virtual world data, wherein the first user and the second user interface with a shared virtual reality, the first head mounted display device of the first user operates in an augmented reality mode and the second head mounted display device of a second user operates in a virtual reality mode, and the second head mounted display device displaying the rendered physical object as the physical object appears in the local environment of the first user.

\* \* \* \* \*